US012739401B2

(12) United States Patent
Zhang et al.

(10) Patent No.: US 12,739,401 B2
(45) **Date of Patent: *Sep. 15, 2026**

(54) AFFINE PREDICTION IMPROVEMENTS FOR VIDEO CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Yuwen He, San Diego, CA (US); Li Zhang, San Diego, CA (US); Hongbin Liu, Beijing (CN); Tianliang Fu, Beijing (CN); Junru Li, Beijing (CN); Siwei Ma, Beijing (CN)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/511,582

(22) Filed: Nov. 16, 2023

(65) Prior Publication Data

US 2024/0129489 A1 Apr. 18, 2024

Related U.S. Application Data

(63) Continuation of application No. 18/076,869, filed on Dec. 7, 2022, now Pat. No. 11,956,448, and a (Continued)

(51) Int. Cl.
*H04N 19/157* (2014.01)
*H04N 19/176* (2014.01)
*H04N 19/186* (2014.01)

(52) U.S. Cl.
CPC ......... *H04N 19/157* (2014.11); *H04N 19/176* (2014.11); *H04N 19/186* (2014.11)

(58) Field of Classification Search
CPC ............... H04N 19/172; H04N 19/176; H04N 19/503; H04N 19/593
See application file for complete search history.

(56) References Cited

U.S. PATENT DOCUMENTS 11,956,448 B2 * 4/2024 Zhang .................. H04N 19/176
11,979,564 B2 * 5/2024 Bokov ................ H04N 19/593
(Continued)

FOREIGN PATENT DOCUMENTS

CN 102186081 A 9/2011
CN 107408400 A 11/2017
(Continued)

OTHER PUBLICATIONS

Document: JVET-K1001-v6, Bross, B., et al., "Versatile Video Coding (Draft 2)," Joint Video Experts Team (JVET) of ITU-T SG 16 WP 3 and ISO/IEC JTC 1/SC 29/WG 11 11th Meeting: Ljubljana, SI, Jul. 10-18, 2018, 141 pages.
(Continued)

*Primary Examiner* — Tsion B Owens
(74) *Attorney, Agent, or Firm* — Conley Rose, P.C.

(57) ABSTRACT

Examples of video encoding methods and apparatus and video decoding methods and apparatus are described. An example method of processing video data includes determining, for a conversion between a video block of a video and a bitstream of the video, a gradient of a prediction vector at a sub-block level for the video block according to a rule, wherein the rule specifies to use a same gradient value is assigned for all samples within a sub-block of the video block; and performing the conversion based on the determining.

19 Claims, 46 Drawing Sheets

Related U.S. Application Data continuation-in-part of application No. PCT/CN2021/098811, filed on Jun. 8, 2021.

(60) Provisional application No. 63/046,634, filed on Jun. 30, 2020.

(56) References Cited

U.S. PATENT DOCUMENTS

| | | | | |
|---|---|---|---|---|
| 11,985,330 | B2 * | 5/2024 | Lai | H04N 19/52 |
| 2018/0332283 | A1 * | 11/2018 | Liu | H04N 19/11 |
| 2019/0110064 | A1 | 4/2019 | Zhang | |
| 2019/0149838 | A1 | 5/2019 | Zhang | |
| 2020/0099949 | A1 | 3/2020 | Xu | |
| 2021/0084309 | A1 * | 3/2021 | Zhao | H04N 19/186 |
| 2021/0409753 | A1 * | 12/2021 | Rufitskiy | H04N 19/513 |
| 2022/0182678 | A1 * | 6/2022 | Solovyev | H04N 19/54 |
| 2024/0267514 | A1 * | 8/2024 | Bokov | H04N 19/117 |

FOREIGN PATENT DOCUMENTS

| | | | |
|---|---|---|---|
| CN | 110476424 | A | 11/2019 |
| CN | 110891175 | A | 3/2020 |
| CN | 110933427 | A | 3/2020 |
| WO | 2020098647 | A1 | 5/2020 |

OTHER PUBLICATIONS

Bossen, F., Retrieved from the internet: https://vcgit.hhi.fraunhofer.de/jvet/VVCSoftware_VTM/tags/VTM-2.1, Mar. 1, 2023, 1 page.

Document: JVET-L0646-v1, Su, Y., et al., "CE4-related: Generalized bi-prediction improvements combined from JVET-L0197 and JVET-L0296," Joint Video Experts Team (JVET) of ITU-T SG 16 WP 3 and ISO/IEC JTC 1/SC 29/WG 11 12th Meeting: Macao, CN, Oct. 3-12, 2018, 5 pages.

Document: JVET-C0047, Chen, C., et al., "Generalized bi-prediction for inter coding," Joint Video Exploration Team (JVET) of ITU-T SG 16 WP 3 and ISO/IEC JTC 1/SC 29/WG 11 3rd Meeting: Geneva, CH, May 26-Jun. 1, 2016, 4 pages.

Document: JVET-K0248-v1, Su, Y., et al., "CE4.4.1: Generalized bi-prediction for inter coding," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.

Document: JVET-L0197, Su, Y., et al., "CE4-Related: Generalized bi-prediction improvements," Joint Video Experts Team (JVET) of ITU-T SG 16 WP 3 and ISO/IEC JTC 1/SC 29/WG 11 12th Meeting: Macao, CN, Oct. 3-12, 2018, 3 pages.

Document: JVET-L0296, He, Y., et al., "CE4-related: Encoder speed-up and bug fix for generalized bi-prediction in BMS-2.1," Joint Video Experts Team (JVET) of ITU-T SG 16 WP 3 and ISO/IEC JTC 1/SC 29/WG 11 12th Meeting: Macao, CN, Oct. 3-12, 2018, 5 pages.

Document: JVET-L0256_v2, Xiu, X., et al., "CE9-related: Complexity reduction and bit-width control for bi-directional optical flow (BIO)," Joint Video Experts Team (JVET) of ITU-T SG 16 WP 3 and ISO/IEC JTC 1/SC 29/WG 11 12th Meeting: Macao, CN, Oct. 3-12, 2018, 15 pages.

Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 25 pages.

Document: JVET-N0510-v1, Chuang, T., et al., "CE2-related: Phase-variant affine subblock motion compensation," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

Document: JVET-K0102-v1, Zhang, K., et al., "CE4-related: Interweaved Prediction for Affine Motion Compensation," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

"Information Technology—High efficiency coding and media delivery in heterogeneous environments—Part 2: High efficiency video coding," Rec. ITU-T H.265 | ISO/IEC 23008-2:201x (4th Ed.) (in force edition), Apr. 20, 2018, 8 pages.

Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Retrieved from the internet: JEM-7.0: https://jvet.hhi.fraunhofer.de/svn/svn_HMJEMSoftware/tags/ HM-16.6-JEM-7.0, Mar. 1, 2023, 1 pages.

Document: JVET-J0024_v2, Akula, S., et al., "Description of SDR, HDR and 360° video coding technology proposal by Samsung, Huawei, GoPro, and HiSilicon—mobile application scenario," Joint Video Exploration Team (JVET) of ITU-T SG 16 WP 3 and ISO/IEC JTC 1/SC 29/WG 11 10th Meeting: San Diego, US, Apr. 10-20, 2018, 139 pages.

Document: JVET-L1001-v9, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 235 pages.

Foreign Communication From a Related Counterpart Application, PCT Application No. PCT/CN2021/098811, International Search Report dated Sep. 2, 2021, 10 pages.

Non-Final Office Action from U.S. Appl. No. 18/076,869 dated Apr. 11, 2023, 13 pages.

Final Office Action from U.S. Appl. No. 18/076,869 dated Aug. 1, 2023, 9 pages.

Notice of Allowance from U.S. Appl. No. 18/076,869 dated Dec. 28, 2023, 9 pages.

Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

Chinese Office Action from Chinese Patent Application No. 202180041405.8 dated Jan. 1, 2026, 12 pages.

* cited by examiner (b)second PU of 2NxN (a) second PU of Nx2N

Original Merge candidate list

| Merge_idx | L0 | L1 |
| --- | --- | --- |
| 0 | mvL0_A, ref0 | - |
| 1 | - | mvL1_B, ref0 |
| 2 | | |
| 3 | | |
| 4 | | |

Merge candidate list after adding combined candidates

| Merge_idx | L0 | L1 |
| --- | --- | --- |
| 0 | mvL0_A, ref0 | |
| 1 | | mvL1_B, ref0 |
| 2 | mvL0_A, ref0 | mvL1_B, ref0 |
| 3 | | |
| 4 | | |

combine combine

FIG. 7

| | | | |
|---|---|---|---|
| 1 | 1 | 1 | 1 |
| 1 | 3 | 3 | 1 |
| 1 | 3 | 3 | 1 |
| 1 | 1 | 1 | 1 |

FIG. 30

| | | | |
|---|---|---|---|
| 1 | 1 | 1 | 1 |
| 1 | 3 | 3 | 1 |
| 1 | 3 | 3 | 1 |
| 1 | 1 | 1 | 1 |

AFFINE PREDICTION IMPROVEMENTS FOR VIDEO CODING

CROSS REFERENCE TO RELATED APPLICATIONS

This application is a continuation of U.S. application Ser. No. 18/076,869, filed on Dec. 7, 2022, which is a continuation of International Patent Application No. PCT/CN2021/098811, filed on Jun. 8, 2021, which claims the priority to and benefits of International Patent Application No. PCT/CN2020/094839, filed on Jun. 8, 2020; U.S. Provisional Patent Application No. 63/046,634, filed on Jun. 30, 2020; and International Patent Application No. PCT/CN2020/110663, filed on Aug. 22, 2020. All the aforementioned patent applications are hereby incorporated by reference in their entireties.

TECHNICAL FIELD

This patent document relates to image and video processing.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by image and video encoders and decoders to perform image or video encoding or decoding.

In one example aspect, a video processing method is disclosed. The method includes determining, for a conversion between a video block of a video and a bitstream of the video, a gradient of a prediction vector at a sub-block level for the video block according to a rule, wherein the rule specifies to use a same gradient value is assigned for all samples within a sub-block of the video block; and performing the conversion based on the determining.

In another example aspect, a video processing method is disclosed. The method includes determining, for a conversion between a current video block of a video and a bitstream of the video, to use a prediction refinement with optical flow technique after a bi-prediction technique is performed to obtain motion information of the current video block; and performing the conversion based on the determining.

In another example aspect, a video processing method is disclosed. The method includes determining, for a conversion between a current video block of a video and a bitstream of the video, whether to apply a coding tool related to an affine prediction to the current video block based on whether the current video block satisfies a condition; and performing the conversion based on the determining, wherein the condition relates to one or more control point motion vectors for the current video block, or a first size of the current video block, or a second size of a sub-block of the current video block, or one or more motion vectors derived for one or more sub-blocks of the current video block, or a prediction mode of the current video block.

In another example aspect, a video processing method is disclosed. The method includes determining, for a conversion between a current video block of a video and a bitstream of the video, according to a rule, whether and how to apply motion compensation on a sub-block at a sub-block index based on: (1) whether an affine mode is applied to the current video block, wherein an affine motion indication is included in the bitstream indicative of whether the affine mode is applied, (2) a color component to which the current video block belongs, and (3) a color format of the video; and performing the conversion based on the determining.

In another example aspect, a video processing method is disclosed. The method includes determining, for a conversion between a current video block of a video and a bitstream of the video, according to a rule, whether and how to use weighted prediction for calculating a prediction of a sub-block of the current video block based on: (1) whether an affine mode is applied to the current video block, wherein an affine motion indication is included in the bitstream indicative of whether the affine mode is applied, (2) a color component to which the current video block belongs, and (3) a color format of the video; and performing the conversion based on the determining.

In another example aspect, a video processing method is disclosed. The method includes determining, for a conversion between a current video block of a video and a bitstream of the video, a value for a first syntax element in the bitstream according to a rule, wherein the value of the first syntax element indicates whether an affine mode is applied to the current video block, and wherein the rule specifies that the value of the first syntax element is based on: (1) a second syntax element in the bitstream that indicates whether an affine model based motion compensation is used to generate prediction samples of the current video block, or (2) a third syntax element in the bitstream that indicates whether a 6-parameter affine model based motion compensation is enabled for a coded layer video sequence (CLVS); and performing the conversion based on the determining.

In another example aspect, a video processing method is disclosed. The method includes determining, for a conversion between a current video block of a video and a bitstream of the video, whether an interleaved prediction tool is enabled for the current video block based on a relationship between a first motion vector of a first sub-block of a first pattern of the current video block and a second motion vector of a second sub-block of a second pattern of the current video block; and performing the conversion based on the determining.

In another example aspect, another video processing method is disclosed. The method includes determining, for a conversion between a video block of a video and a coded representation of the video, to use a gradient of a prediction vector at a sub-block level for the video block according to a rule that specifies to use a same gradient value for all samples in each sub-block, and performing the conversion based on the determining.

In another example aspect, another video processing method is disclosed. The method includes determining, for a conversion between a current video block of a video and a bitstream representation of the video, to use a prediction refinement of motion information using an optical flow technique according to a rule; and performing the conversion based on the determining, wherein the rule specifies that the prediction refinement is performed after a bi-prediction is performed to obtain the motion information.

In another example aspect, another video processing method is disclosed. The method includes determining, for a conversion between a current video block of a video and a bitstream representation of the video, that a coding tool is enabled for the current video block because the current video block satisfies a condition; and performing the conversion based on the determining, wherein the condition relates to a control point motion vectors for the current video block or a size of the current video block or a prediction mode of the current video block.

In another example aspect, another video processing method is disclosed. The method includes determining, for a conversion between a video block of a video and a coded representation of the video, whether and how to use weighted prediction for calculating a prediction of a sub-block of the video block according to a rule; and performing the conversion based on the determining, wherein the rule is based on one or more of whether affine mode is enabled for the video block or a color component to which the video block belongs or a color format of the video.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIG. 7 shows an example of combined bi-predictive merge candidate.

FIG. 30 shows examples of weighting values in a sub-block.

DETAILED DESCRIPTION

Figure 1:
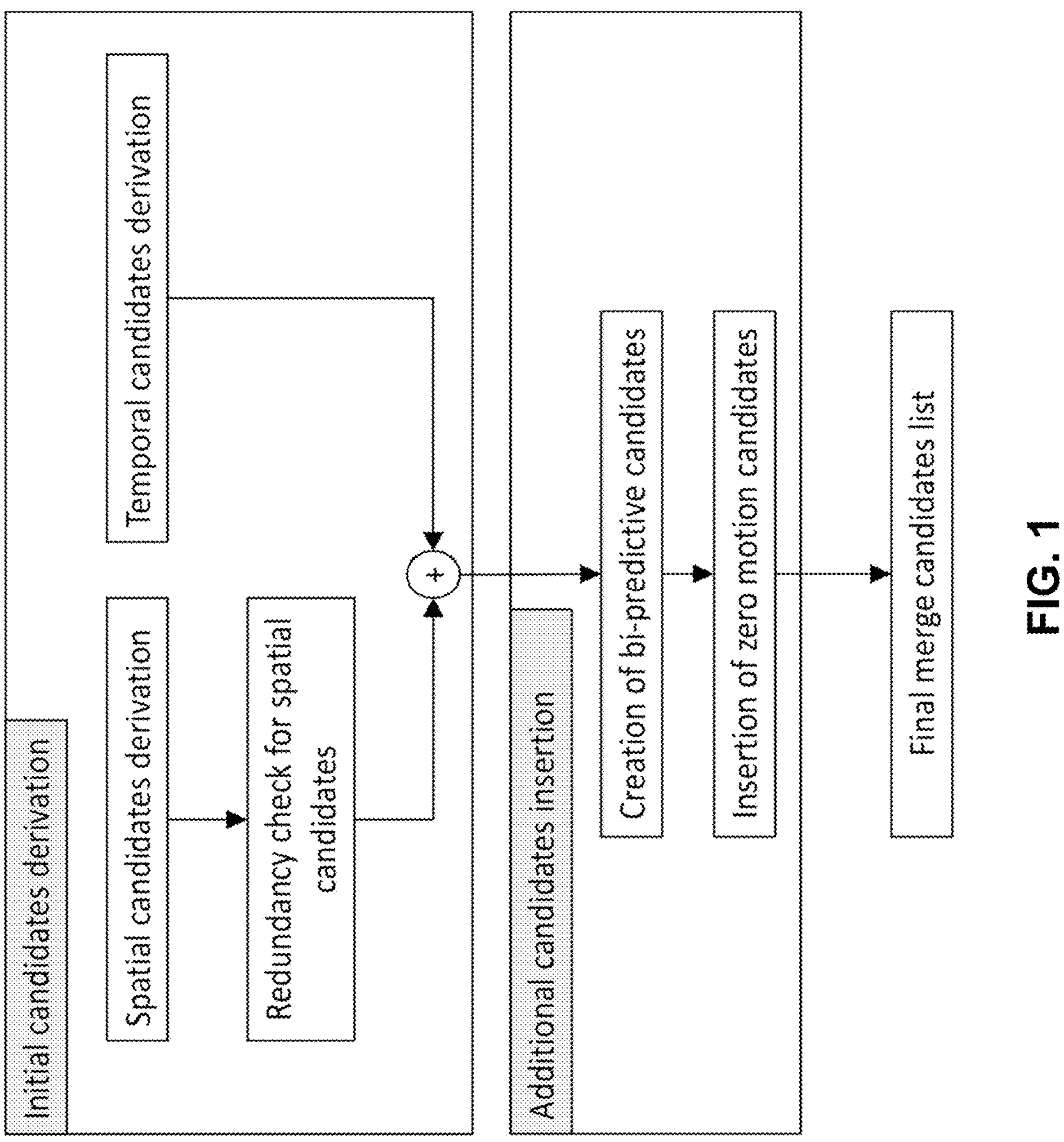
FIG. 1 shows an example derivation process for merge candidates list construction.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This document is related to video coding technologies. Specifically, it is related to motion compensation in video coding. It may be applied to the existing video coding standard like High Efficiency Video Coding (HEVC), or the standard (Versatile Video Coding) to be finalized. It may be also applicable to future video coding standards or video codec.

2. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

The latest version of VVC draft, i.e., Versatile Video Coding (Draft 2) could be found at:

http://phenix.it-sudparis.eu/jvet/doc_end_user/documents/11_Ljubljana/wg11/JVET-K1001-v7.zip The latest reference software of VVC, named VVC test model (VTM), could be found at:

https://vcgit.hhi.fraunhofer.de/jvet/VVCSoftware_VTM/tags/VTM-2.1

2.1. Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Merge Mode 2.1.1.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

- Step 1: Initial candidates derivation
  - Step 1.1: Spatial candidates derivation
  - Step 1.2: Redundancy check for spatial candidates
  - Step 1.3: Temporal candidates derivation
- Step 2: Additional candidates insertion
  - Step 2.1: Creation of bi-predictive candidates
  - Step 2.2: Insertion of zero motion candidates These steps are also schematically depicted in FIG. 1 For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed. FIG. 1 shows an example derivation process for merge candidates list construction.

2.1.1.2. Spatial Candidates Derivation

Figure 3:
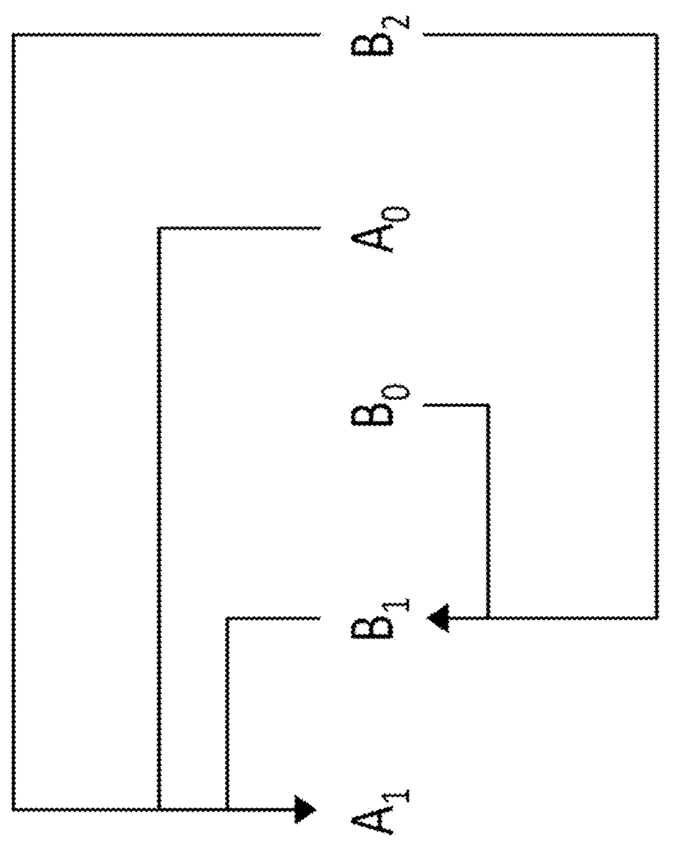
FIG. 3 shows candidate pairs considered for redundancy check of spatial merge candidates.
Figure 2:
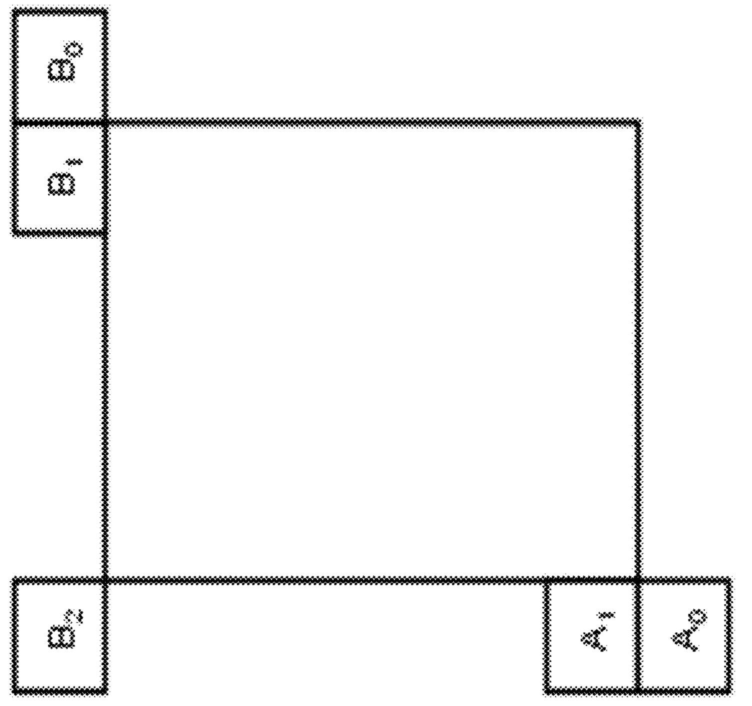
FIG. 2 shows example positions of spatial merge candidates.
Figure 4B:
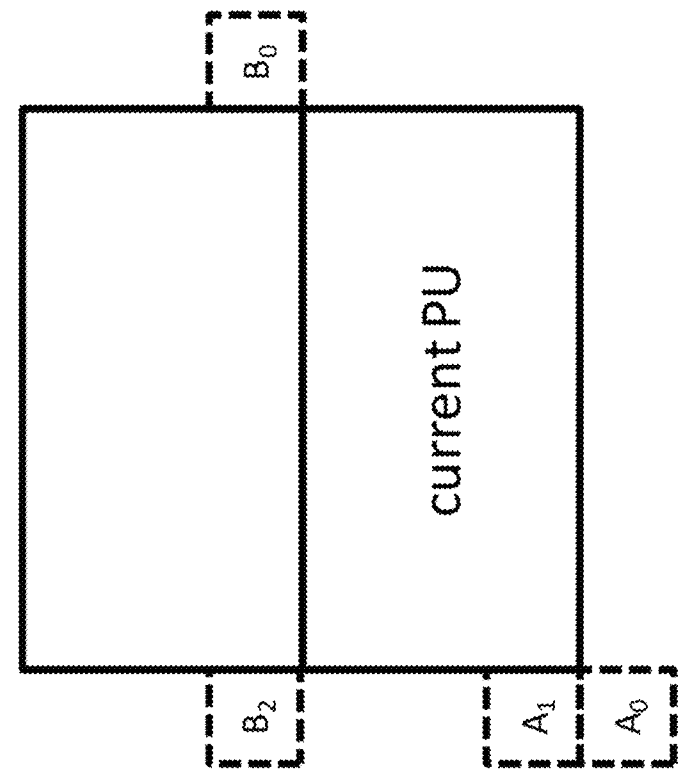
FIG. 4A-4B show examples of positions for the second prediction unit (PU) of N×2N and 2N×N partitions.
Figure 4A:
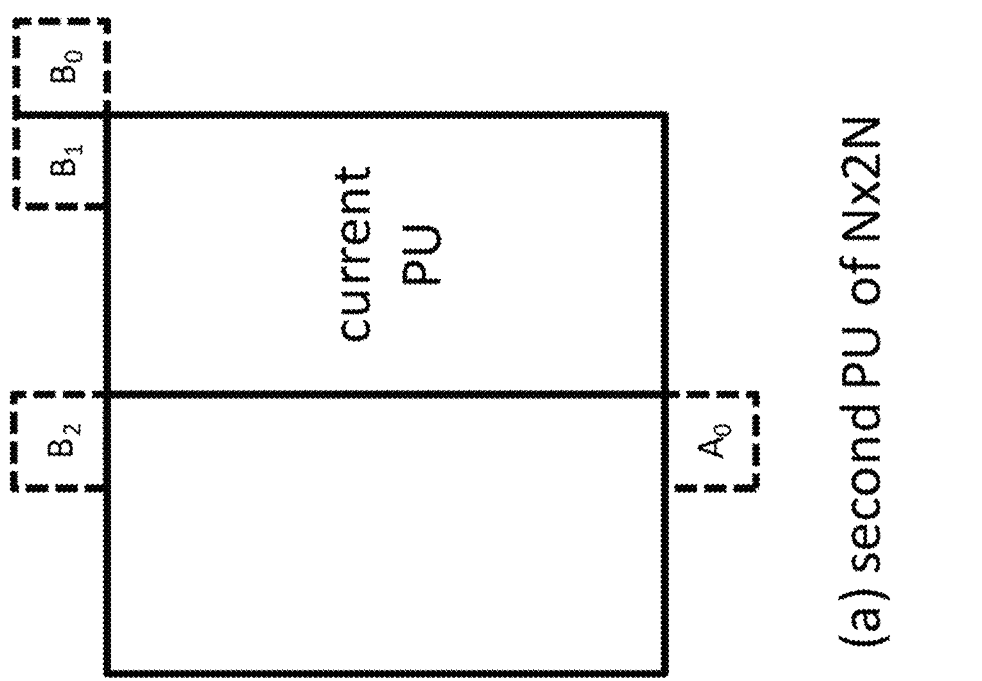

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and FIG. 4B depict the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows example positions of spatial merge candidates.

FIG. 3 shows candidate pairs considered for redundancy check of spatial merge candidates.

FIG. 4A-4B show examples of positions for the second PU of N×2N and 2N×N partitions.

2.1.1.3. Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5 which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
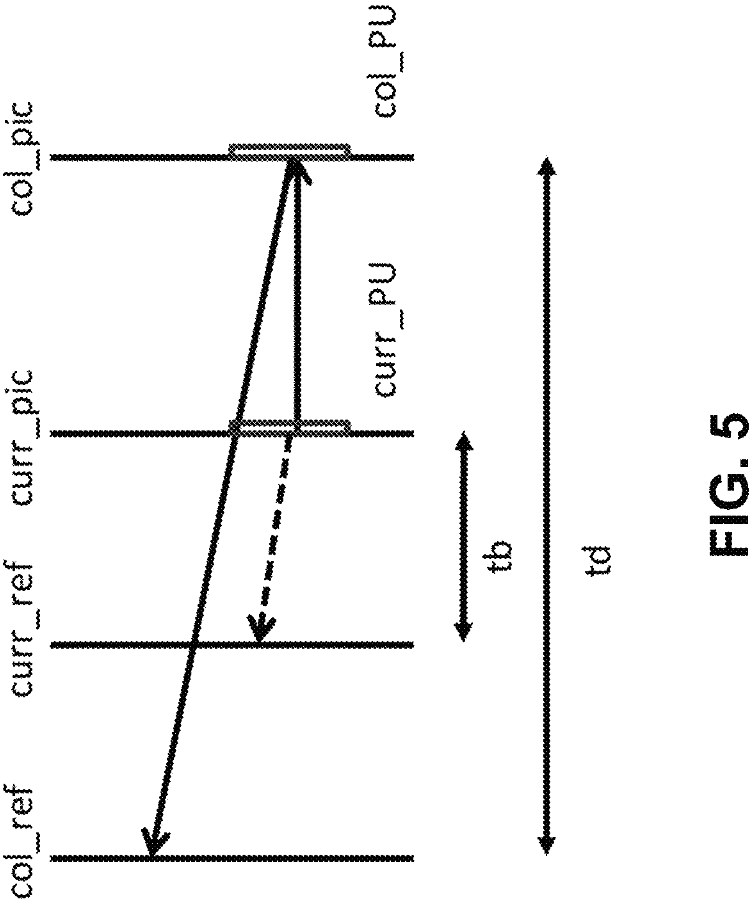
FIG. 5 is an illustration of motion vector scaling for temporal merge candidate.

FIG. 5 is an illustration of motion vector scaling for temporal merge candidate.

Figure 6:
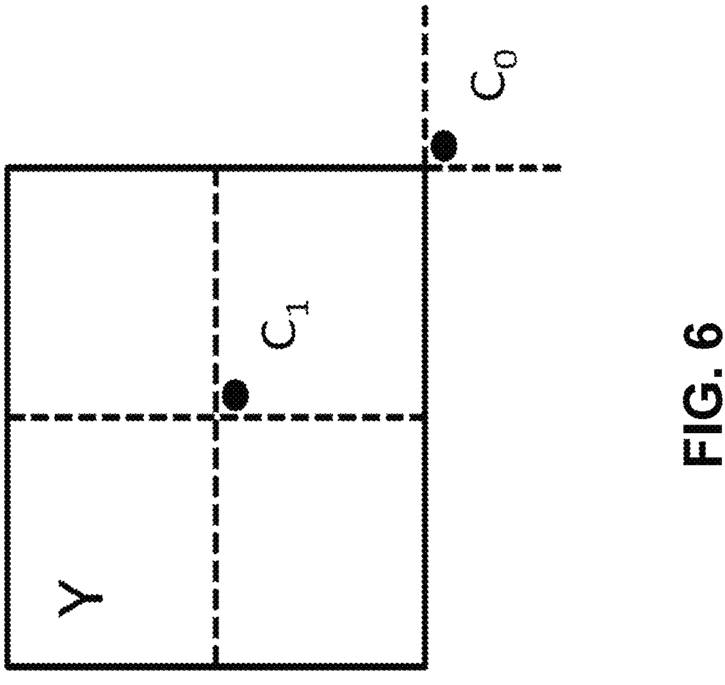
FIG. 6 shows example candidate positions for temporal merge candidate, candidate zero (C0) and candidate one (C1).

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU) row, position $C_1$ is used. Otherwise, position $C_0$ is used in the derivation of the temporal merge candidate.

FIG. 6 shows example candidate positions for temporal merge candidate, C0 and C1.

2.1.1.4. Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1. Derivation of AMVP Candidates

Figure 8:
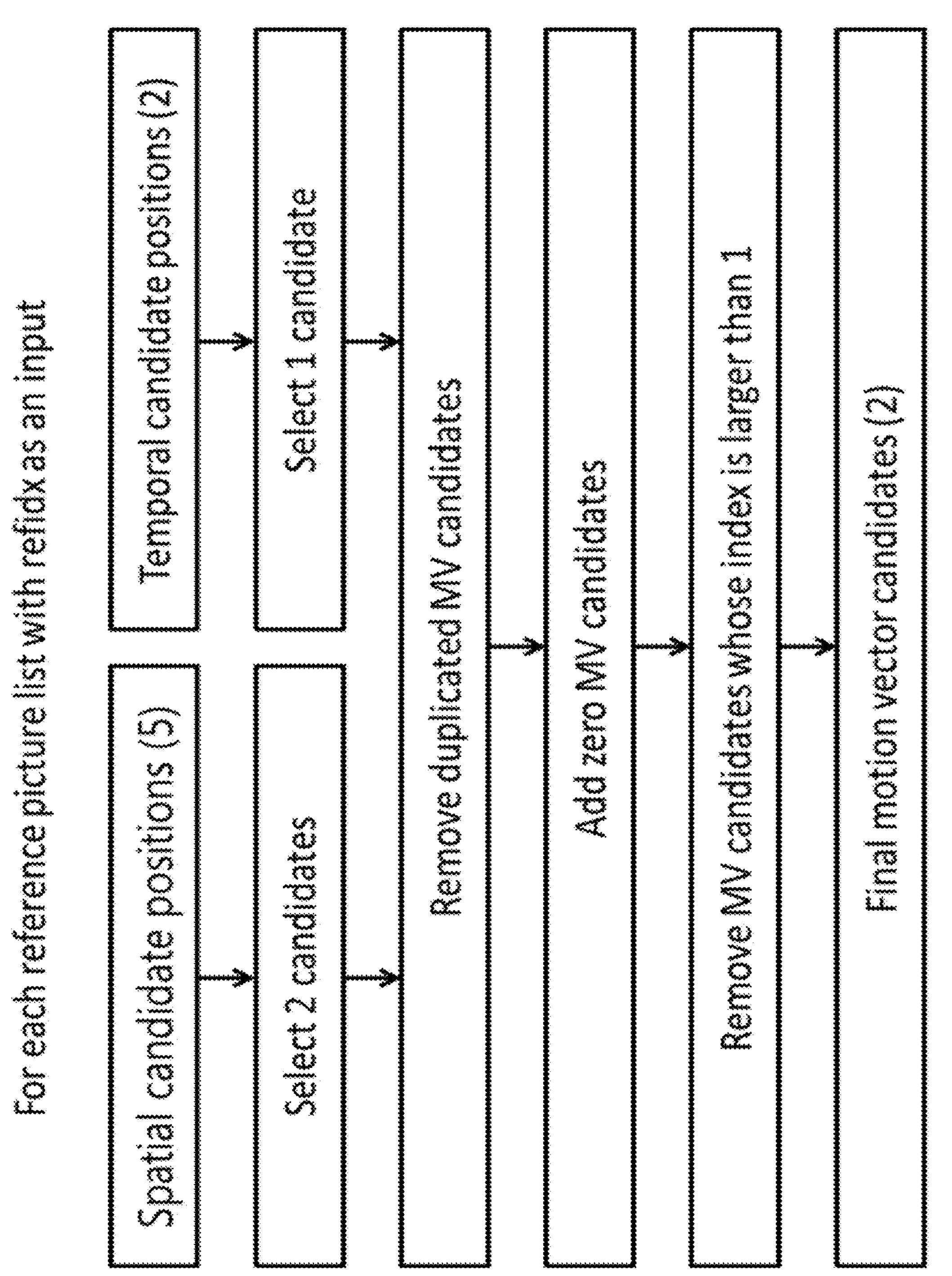
FIG. 8 shows examples of derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No spatial scaling (1) Same reference picture list, and same reference picture index (same POC)

(2) Different reference picture list, but same reference picture (same POC)

Spatial scaling (3) Same reference picture list, but different reference picture (different POC)

(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
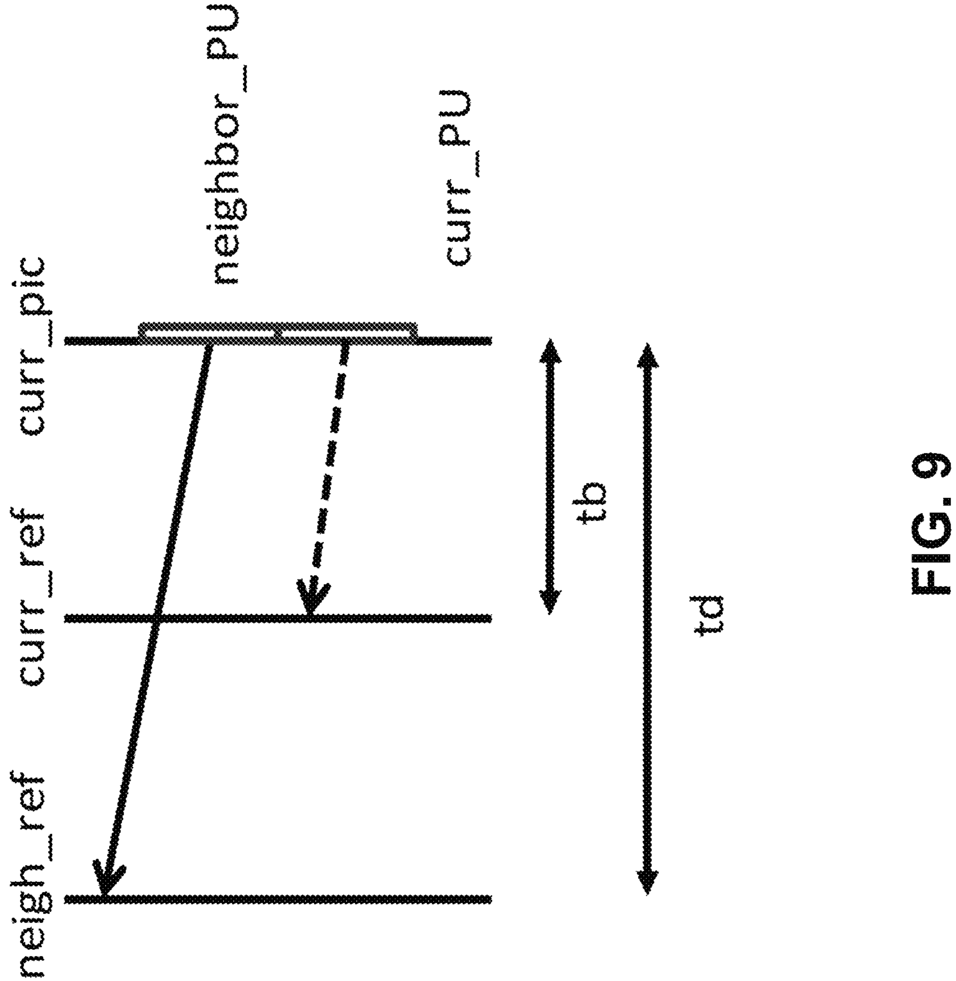
FIG. 9 shows an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. New Inter Prediction Methods in JEM 2.2.1. Sub-CU Based Motion Vector Prediction In the JEM with quad tree binary tree (QTBT), each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
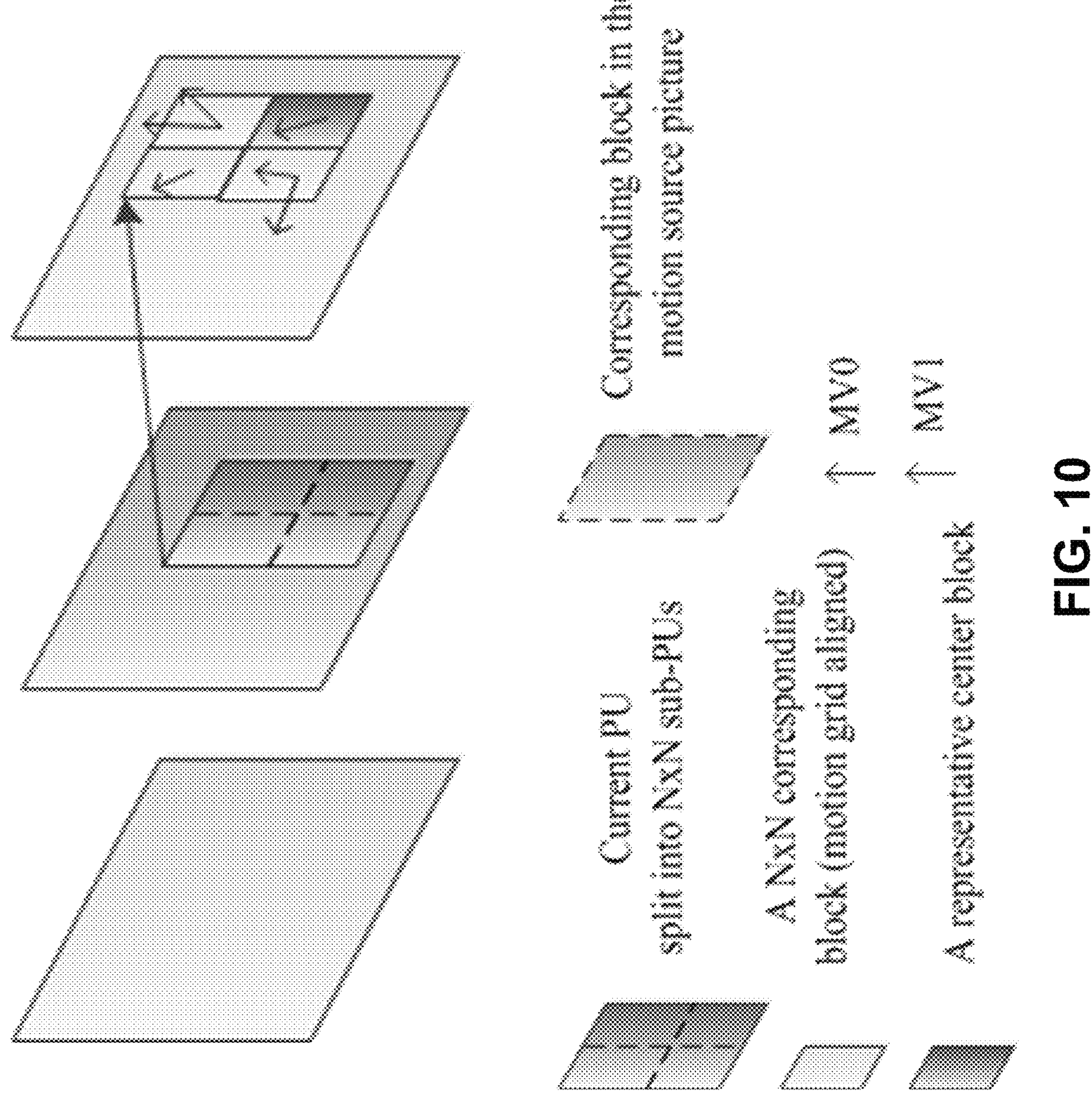
FIG. 10 shows an example of Alternative temporal motion vector prediction (ATMVP) motion prediction for a coding unit (CU).

FIG. 10 shows an example of ATMVP motion prediction for a CU.

2.2.1.1. Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector MVx (the motion vector corresponding to reference picture list X) to predict motion vector MVy (with X being equal to 0 or 1 and Y being equal to 1−X) for each sub-CU.

2.2.1.2. Spatial-Temporal Motion Vector Prediction

Figure 11:
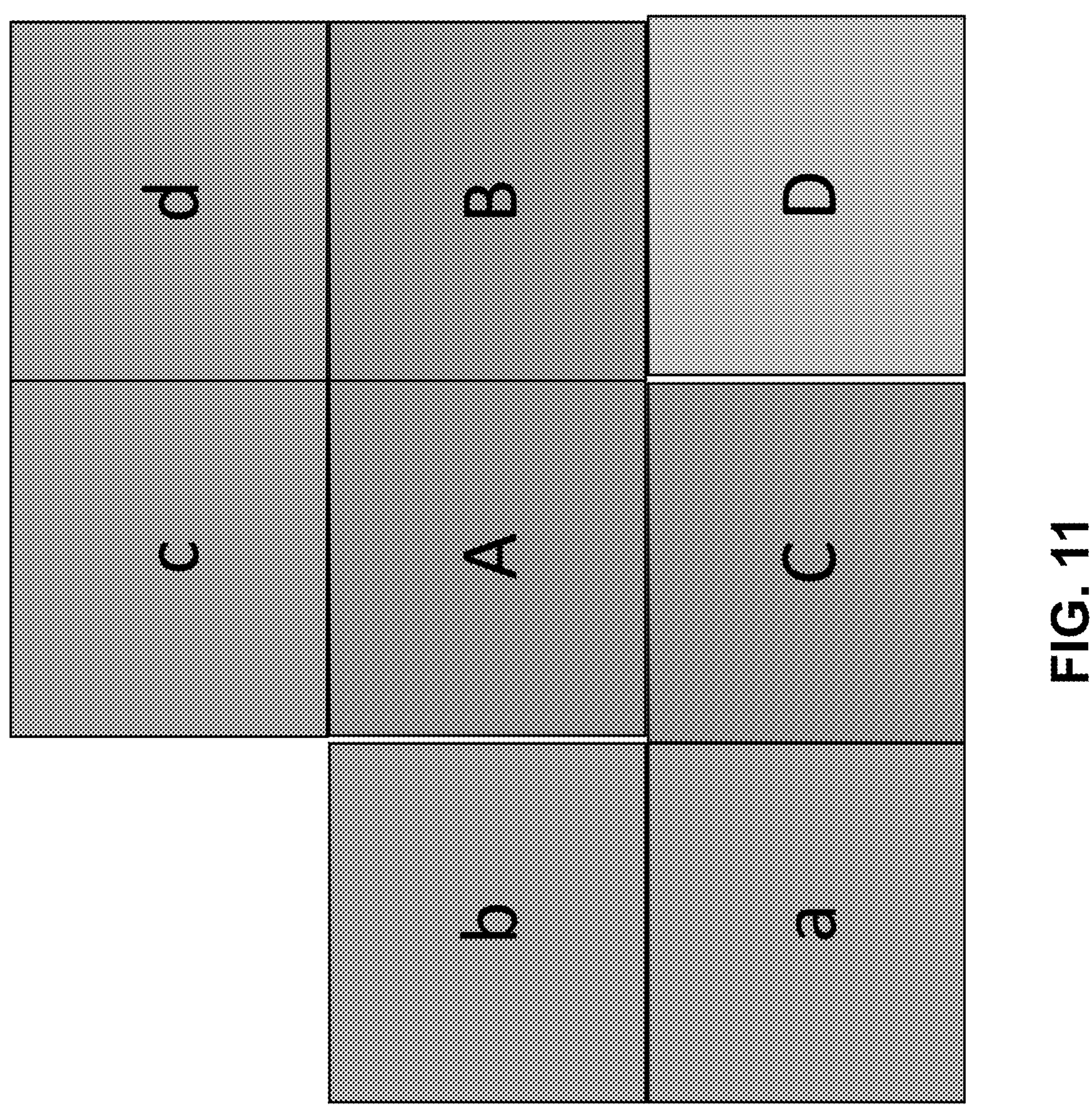
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 11 shows an example of one CU with four sub-blocks (A-D) and its neighbouring blocks (a-d).

2.2.1.3. Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by Context-based Adaptive Binary Arithmetic Coding (CABAC). While in HEVC, only the first bin is context coded and the remaining bins are context by-pass coded.

2.2.2. Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

- During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.
- RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2.3. Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in section 2.2.2.

Scalable HEVC (SHVC) upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.2.4. Overlapped Block Motion Compensation

Figure 12:
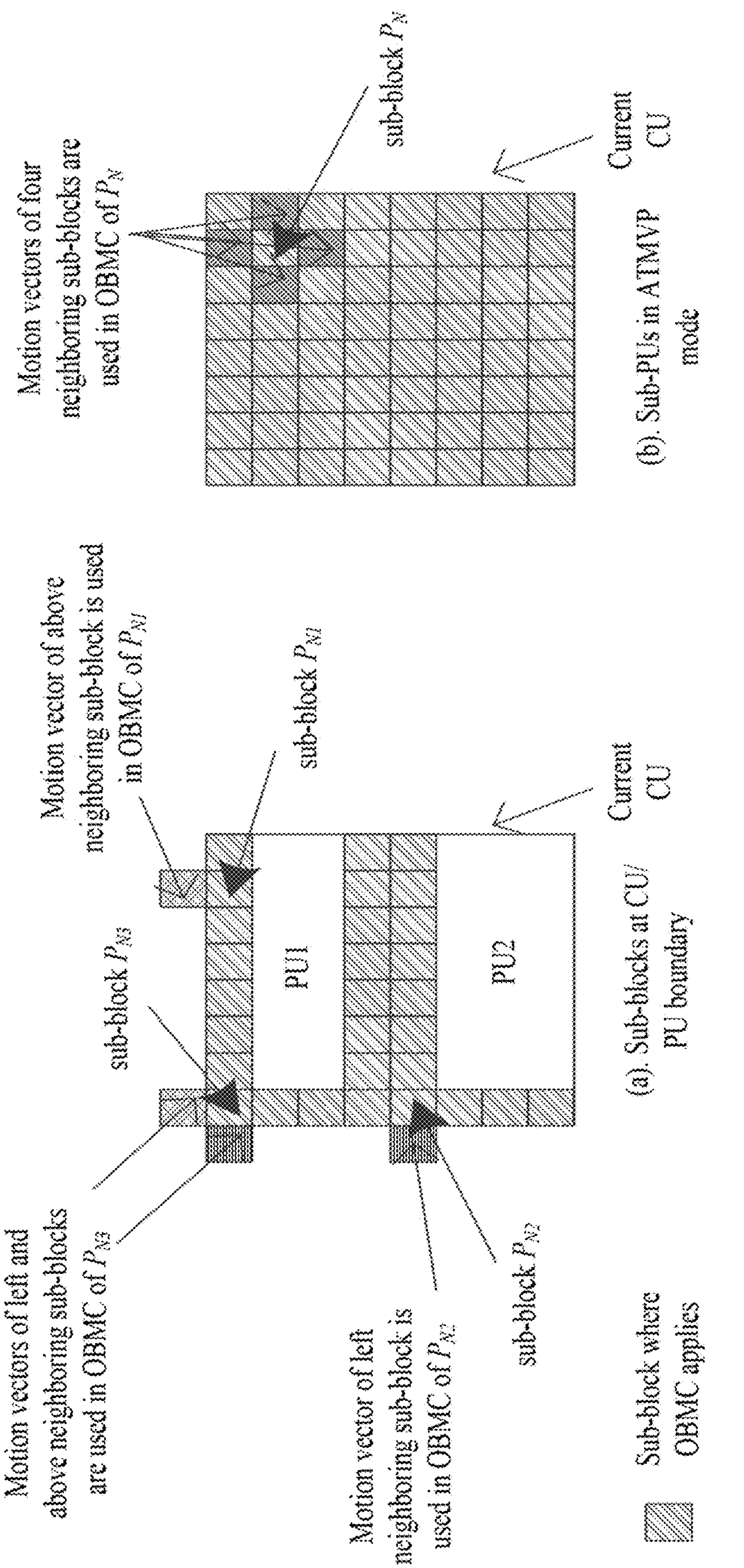
FIG. 12 is an example illustration of sub-blocks where Overlapped Block Motion Compensation (OBMC) applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 12.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5. Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 13:
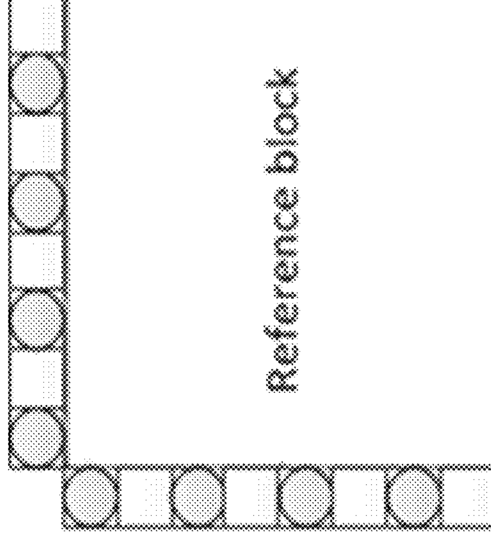
FIG. 13 shows examples of neighbouring samples used for deriving IC parameters.
Figure 13:
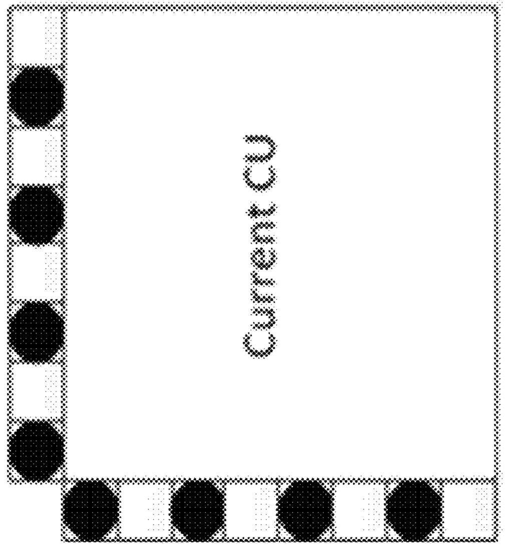
Figure 13:
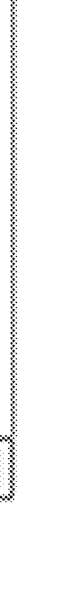
Figure 13:
Figure 13:
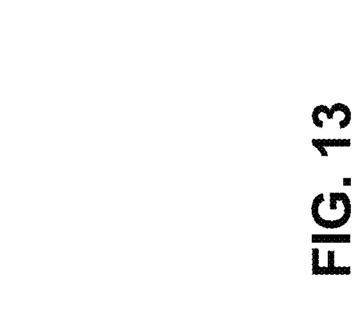

When LIC applies for a CU, a least square error method is employed to derive the parameters a and b by using the neighbouring samples of the current CU and their corresponding reference samples. More specifically, as illustrated in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6. Affine Motion Compensation Prediction

Figure 14:
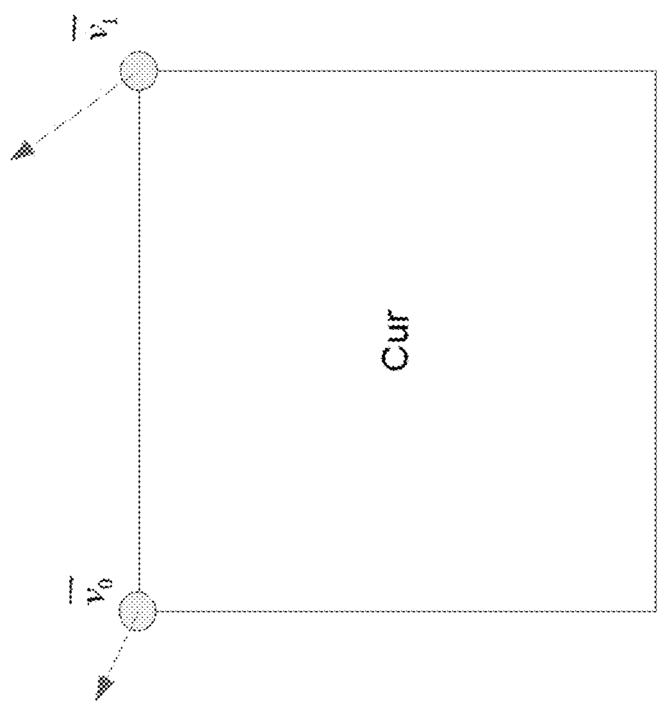
FIG. 14 shows an example of a simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 14 the affine motion field of the block is described by two control point motion vectors.

The motion vector field (MVF) of a block is described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 15:
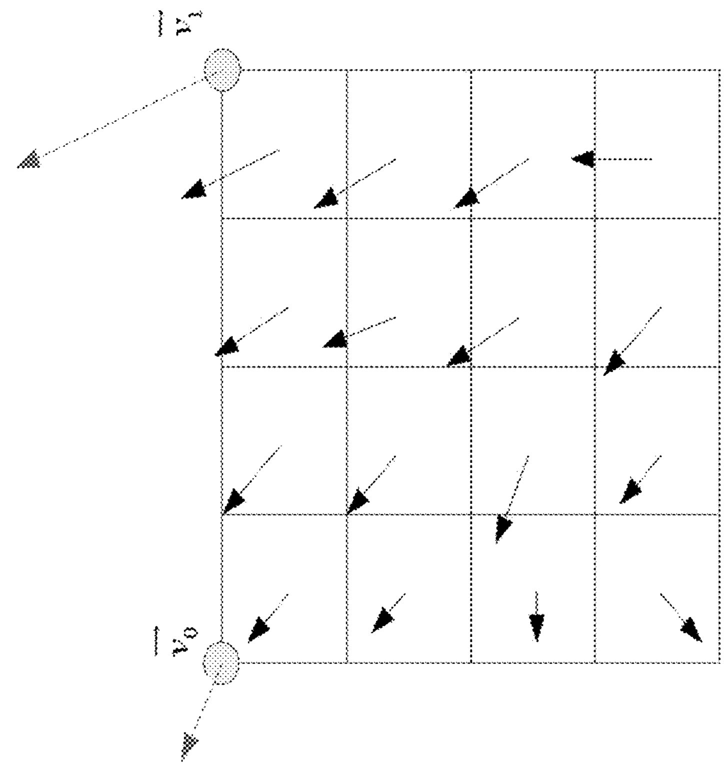
FIG. 15 shows an example of affine motion vector field (MVF) per sub-block.

To derive motion vector of each M×N sub-block, the motion vector of the center sample of each sub-block, as shown in FIG. 15, is calculated according to Equation 1, and rounded to 1/16 fraction accuracy. Then the motion compensation interpolation filters mentioned in section 2.2.3 are applied to generate the prediction of each sub-block with derived motion vector.

After MCP, the high accuracy motion vector of each sub-block is rounded and saved as the same accuracy as the normal motion vector.

Figure 16:
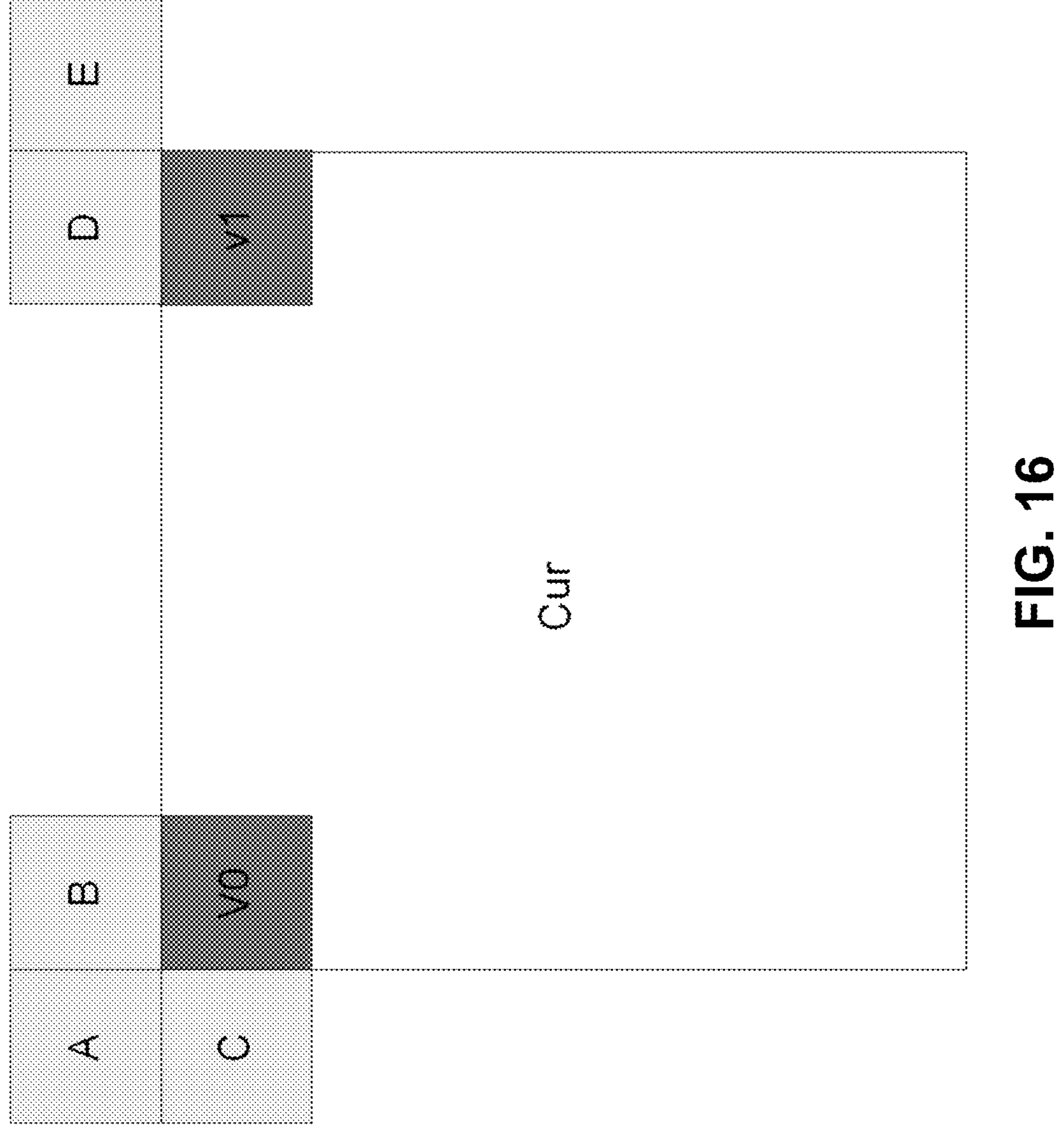
FIG. 16 shows an example of motion vector prediction (MVP) for affine inter prediction (AF_INTER).

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIG. 16, $v_0$ is selected from the motion vectors of the block A, B or C. The motion vector from the neighbour block is scaled according to the reference list and the relationship among the picture order count (POC) of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 17:
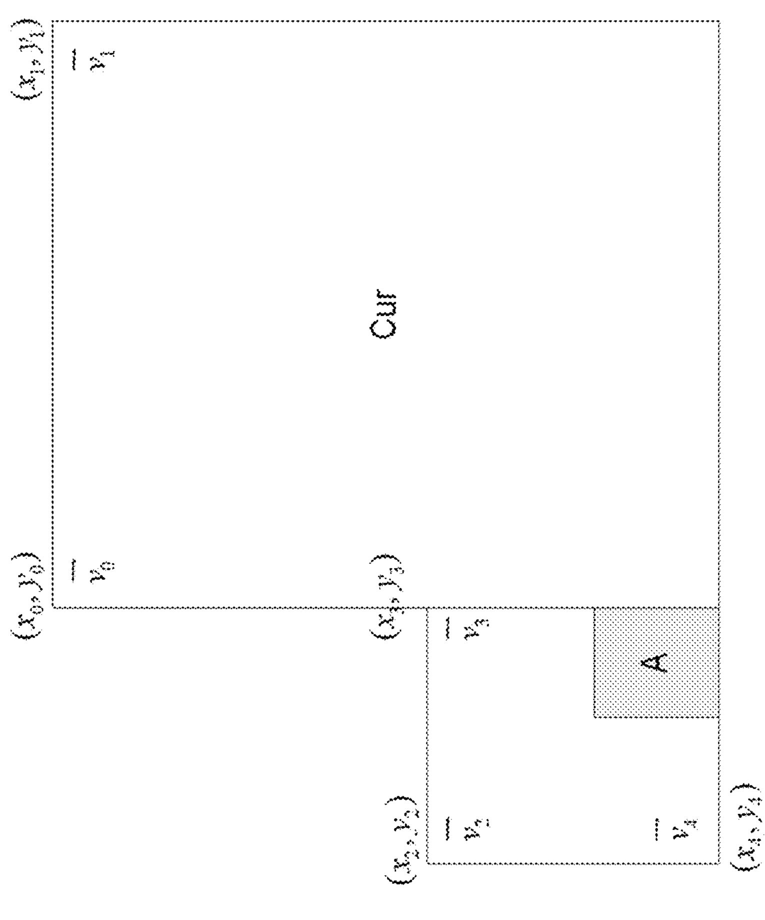
FIG. 17 show example candidates for affine merge (AF_MERGE).

When a CU is applied in AF_MERGE mode, it gets the first block coded with affine mode from the valid neighbour reconstructed blocks. And the selection order for the candidate block is from left, above, above right, left bottom to above left as shown in FIG. 17. If the neighbour left bottom block A is coded in affine mode as shown in FIG. 17, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

2.2.7. Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (3)$$

Figure 18:
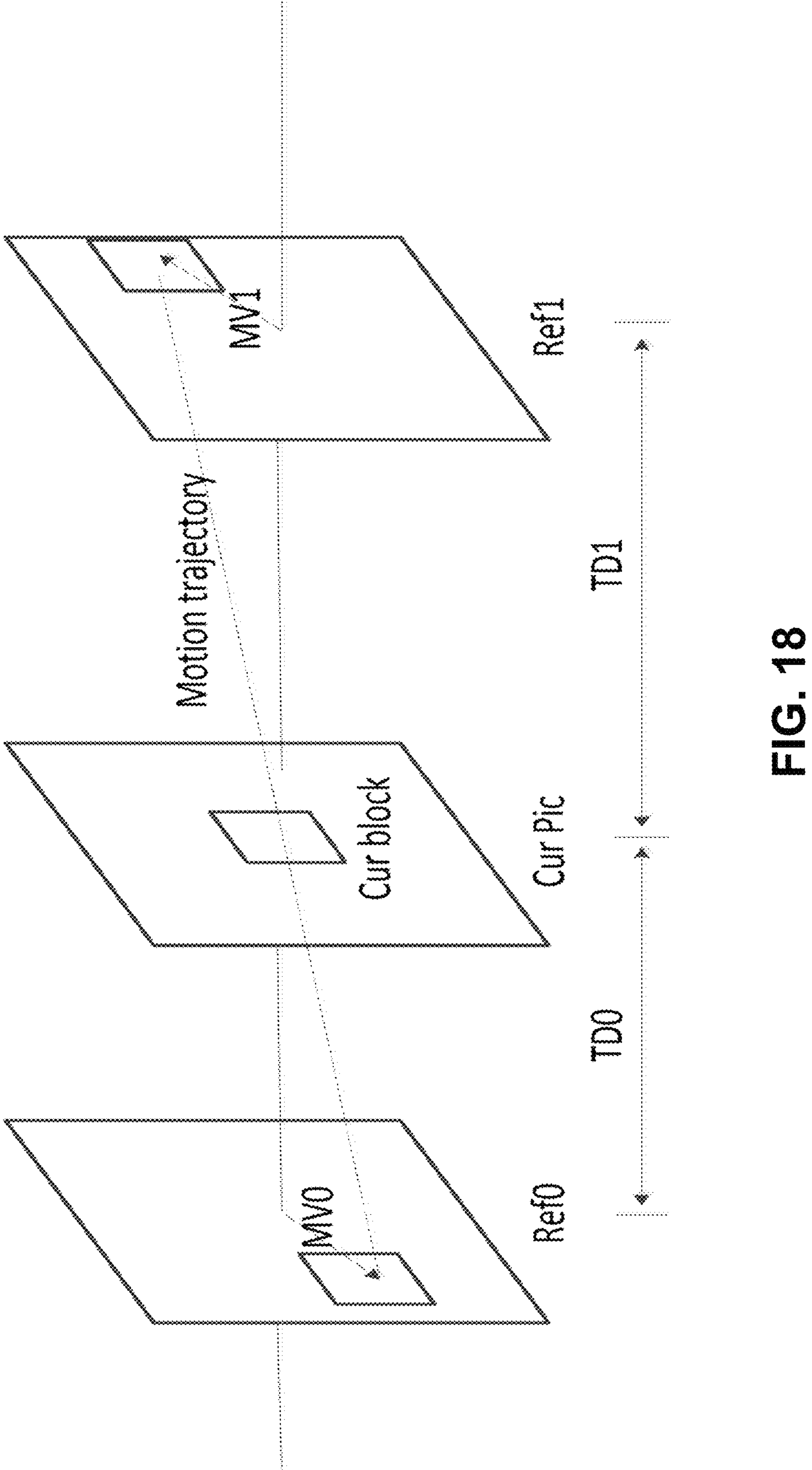
FIG. 18 shows an example of bilateral mapping.

As shown in the FIG. 18, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., temporal distance zero (TD0) and temporal distance one (TD1), between the current picture and the two reference pictures. As a special case, when the current picture is temporally between the two reference pictures and the temporal distance from the current picture to the two reference pictures is the same, the bilateral matching becomes mirror based bi-directional MV.

Figure 19:
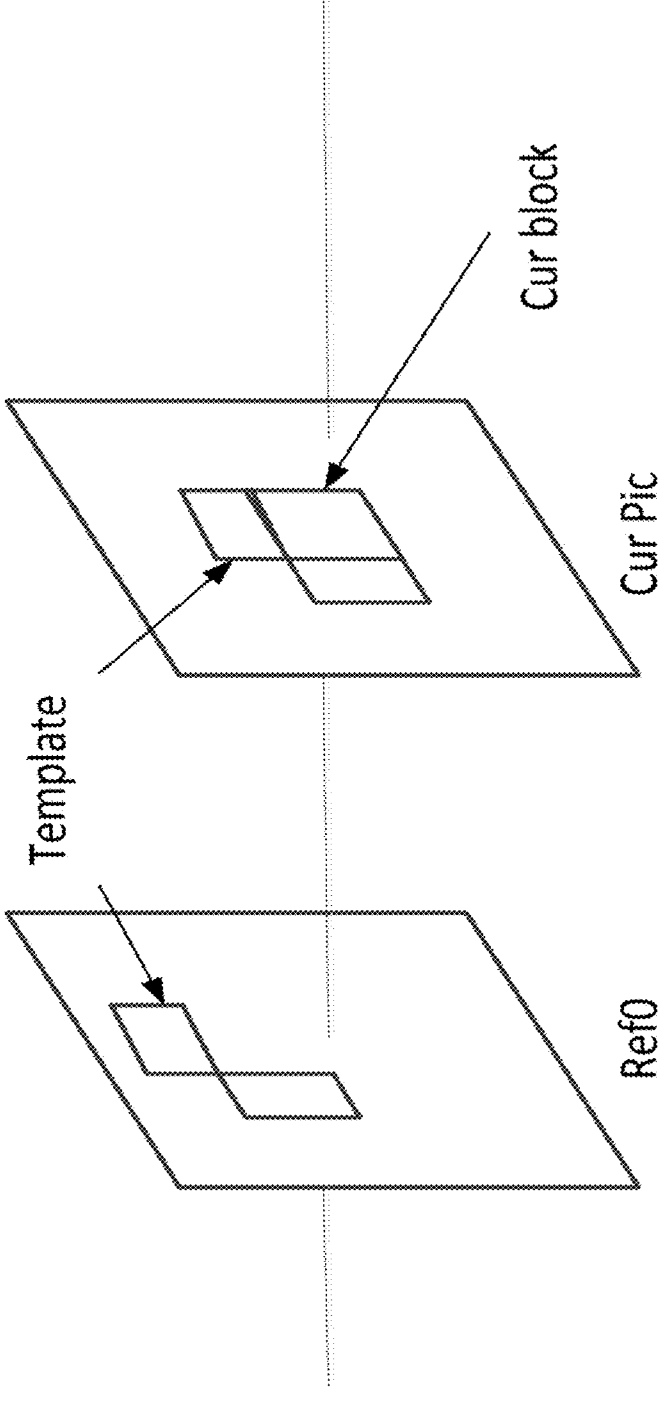
FIG. 19 shows an example of template mapping.

As shown in FIG. 19, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.7.1. CU Level MV Candidate Set

The MV candidate set at CU level consists of:

(i) Original AMVP candidates if the current CU is in AMVP mode
(ii) all merge candidates,
(iii) several MVs in the interpolated MV field, which is introduced in section 2.2.7.3.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.7.2. Sub-CU Level MV Candidate Set

The MV candidate set at sub-CU level consists of:

(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.7.3. Generation of Interpolated MV Field

Before coding a frame, interpolated motion field is generated for the whole picture based on unilateral ME. Then the motion field may be used later as CU level or sub-CU level MV candidates.

Figure 20:
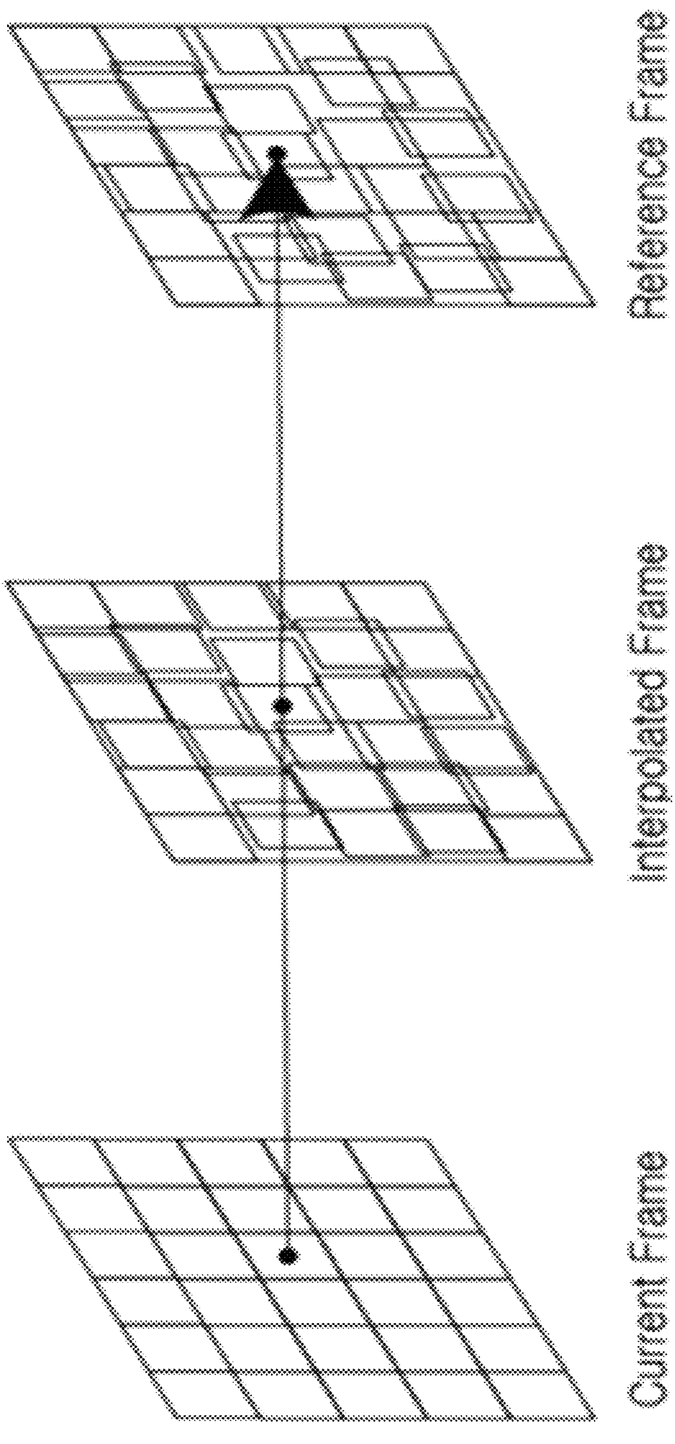
FIG. 20 shows an example of Unilateral motion estimation (ME) in Frame-Rate Up Conversion (FRUC).

First, the motion field of each reference pictures in both reference lists is traversed at 4×4 block level. For each 4×4 block, if the motion associated to the block passing through a 4×4 block in the current picture (as shown in FIG. 20) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.7.4. Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot \left(|MV_x - MV_x^s| + |MV_y - MV_y^s|\right) \quad (4)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.7.5. MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7.6. Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
```

where cost0 is the SAD of list0 template matching, cost1 is the SAD of list1 template matching and costBi is the SAD of bi-prediction template matching. The value of factor is equal to 1.25, which means that the selection process is biased toward bi-prediction. The inter prediction direction selection is only applied to the CU-level template matching process.

2.2.8. Generalized Bi-Prediction Improvement

Generalized Bi-prediction improvement (GBi) proposed in JVET-L0646 is adopted into VTM-3.0.

GBi was proposed in JVET-C0047. JVET-K0248 improved the gain-complexity trade-off for GBi and was adopted into BMS2.1. The BMS2.1 GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In BMS2.1 GBi, the predictor generation in bi-prediction mode is shown in Equation (1).

$$P_{GBi} = (w_0 * P_{L0} + w_1 * P_{L1} + RoundingOffset_{GBi}) \gg shiftNum_{GBi},$$

where $P_{GBi}$ is the final predictor of GBi. $w_0$ and $w_1$ are the selected GBi weight pair and applied to the predictors of list 0 (L0) and list 1 (L1), respectively. $RoundingOffset_{GBi}$ and $shiftNum_{GBi}$ are used to normalize the final predictor in GBi. The supported $w_1$ weight set is {-¼, ⅜, ½, ⅝, 5/4}, in which the five weights correspond to one equal weight pair and four unequal weight pairs. The blending gain, i.e., sum of $w_1$ and $w_0$, is fixed to 1.0. Therefore, the corresponding $w_0$ weight set is {5/4, ⅝, ½, ⅜, −¼}. The weight pair selection is at CU-level.

For non-low delay pictures, the weight set size is reduced from five to three, where the w1 weight set is {⅜, ½, ⅝} and the w0 weight set is {⅝, ½, ⅜}. The weight set size reduction for non-low delay pictures is applied to the BMS2.1 GBi and all the GBi tests in this contribution.

In this JVET-L0646, one combined solution based on JVET-L0197 and JVET-L0296 is proposed to further improve the GBi performance. Specifically, the following modifications are applied on top of the existing GBi design in the BMS2.1.

2.2.8.1. GBi Encoder Bug Fix

To reduce the GBi encoding time, in current encoder design, the encoder will store uni-prediction motion vectors estimated from GBi weight equal to 4/8, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to 4/8. Consequently, 4-parameter affine MVs may be overwritten by 6-parameter affine MVs after the encoding with GBi weight 4/8. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to 4/8, and reuse the corresponding affine MVs based on the affine model type for other GBi weights.

2.2.8.2. GBi Encoder Speed-Up

Five encoder speed-up methods are proposed to reduce the encoding time when GBi is enabled.

(1) Skipping Affine Motion Estimation for Some GBi Weights Conditionally

In BMS2.1, affine ME including 4-parameter and 6-parameter affine ME is performed for all GBi weights. We propose to skip affine ME for those unequal GBi weights (weights unequal to 4/8) conditionally. Specifically, affine ME will be performed for other GBi weights if and only if the affine mode is selected as the current best mode and it is not affine merge mode after evaluating the GBi weight of 4/8. If current picture is non-low-delay picture, the bi-prediction ME for translation model will be skipped for unequal GBi weights when affine ME is performed. If affine mode is not selected as the current best mode or if affine merge is selected as the current best mode, affine ME will be skipped for all other GBi weights.

(2) Reducing the Number of Weights for RD Cost Checking for Low-Delay Pictures in the Encoding for 1-Pel and 4-Pel MVD Precision For low-delay pictures, there are five weights for RD cost checking for all MVD precisions including 1/4-pel, 1-pel and 4-pel. The encoder will check RD cost for 1/4-pel MVD precision first. We propose to skip a portion of GBi weights for RD cost checking for 1-pel and 4-pel MVD precisions. We order those unequal weights according to their RD cost in 1/4-pel MVD precision. Only the first two weights with the smallest RD costs, together with GBi weight 4/8, will be evaluated during the encoding in 1-pel and 4-pel MVD precisions. Therefore, three weights at most will be evaluated for 1-pel and 4-pel MVD precisions for low delay pictures.

(3) Conditionally Skipping Bi-Prediction Search when the L0 and L1 Reference Pictures are the Same For some pictures in random access (RA), the same picture may occur in both reference picture lists (list-0 and list-1). For example, for random access coding configuration in common test conditions (CTC), the reference picture structure for the first group of pictures (GOP) is listed as follows.

| | |
|---|---|
| POC: 16, TL:0, [L0: 0] | [L1: 0] |
| POC: 8, TL:1, [L0: 0 16] | [L1: 16 0] |
| POC: 4, TL:2, [L0: 0 8] | [L1: 8 16] |
| POC: 2, TL:3, [L0: 0 4] | [L1: 4 8] |
| POC: 1, TL:4, [L0: 0 2] | [L1: 2 4] |
| POC: 3, TL:4, [L0: 2 0] | [L1: 4 8] |
| POC: 6, TL:3, [L0: 4 0] | [L1: 8 16] |
| POC: 5, TL:4, [L0: 4 0] | [L1: 6 8] |
| POC: 7, TL:4, [L0: 6 4] | [L1: 8 16] |
| POC: 12, TL:2, [L0: 8 0] | [L1: 16 8] |
| POC: 10, TL:3, [L0: 8 0] | [L1: 12 16] |
| POC: 9, TL:4, [L0: 8 0] | [L1: 10 12] |
| POC: 11, TL:4, [L0: 10 8] | [L1: 12 16] |
| POC: 14, TL:3, [L0: 12 8] | [L1: 12 16] |
| POC: 13, TL:4, [L0: 12 8] | [L1: 14 16] |
| POC: 15, TL:4, [L0: 14 12] | [L1: 16 14] |

We can see that pictures 16, 8, 4, 2, 1, 12, 14 and 15 have the same reference picture(s) in both lists. For bi-prediction for these pictures, it is possible that the L0 and L1 reference pictures are the same. We propose that the encoder skips bi-prediction ME for unequal GBi weights when 1) two reference pictures in bi-prediction are the same and 2) temporal layer is greater than 1 and 3) the MVD precision is 1/4-pel. For affine bi-prediction ME, this fast skipping method is only applied to 4-parameter affine ME.

(4) Skipping Rate Distortion (RD) Cost Checking for Unequal GBi Weight Based on Temporal Layer and the POC Distance Between Reference Picture and Current Picture We propose to skip those RD cost evaluations for those unequal GBi weights when the temporal layer is equal to 4 (highest temporal layer in RA) or the POC distance between reference picture (either list-0 or list-1) and current picture is equal to 1 and coding quantization parameter (QP) is greater than 32.

(5) Changing Floating-Point Calculation to Fixed-Point Calculation for Unequal GBi Weight During ME For existing bi-prediction search, the encoder will fix the MV of one list and refine MV in another list. The target is modified before ME to reduce the computation complexity. For example, if the MV of list-1 is fixed and encoder is to refine MV of list-0, the target for list-0 MV refinement is modified with Eq. (5). O is original signal and $P_1$ is the prediction signal of list-1. w is GBi weight for list-1.

$$T=((O\ll 3)-w*P_1)*(1/(8-w)) \tag{5}$$

Where the term (1/(8−w)) is stored in floating point precision, which increases computation complexity. We propose to change Eq. (5) to fixed-point as Eq. (6).

$$T=(O*a_1-P_1*a_2+\text{round})\gg N \tag{6}$$

where $a_1$ and $a_2$ are scaling factors and they are calculated as:

$$\gamma=(1\ll N)/(8-w);\ a_1=\gamma\ll 3;\ a_2=\gamma*w;\ \text{round}=1\ll(N-1)$$

2.2.8.3. CU Size Constraint for GBi

In this method, GBi is disabled for small CUs. In inter prediction mode, if bi-prediction is used and the CU area is smaller than 128 luma samples, GBi is disabled without any signaling.

2.2.9. Bi-Directional Optical Flow 2.2.9.1. Theoretical Analysis

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (7)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$pred_{BIO} = 1/2 \cdot \left(I^{(0)} + I^{(1)} + v_x/2 \cdot \left(\tau_1 \partial I^{(1)}/\partial x - \tau_0 \partial I^{(0)}/\partial x\right) + v_y/2 \cdot \left(\tau_1 \partial I^{(1)}/\partial y - \tau_0 \partial I^{(0)}/\partial y\right)\right). \quad (8)$$

Figure 21:
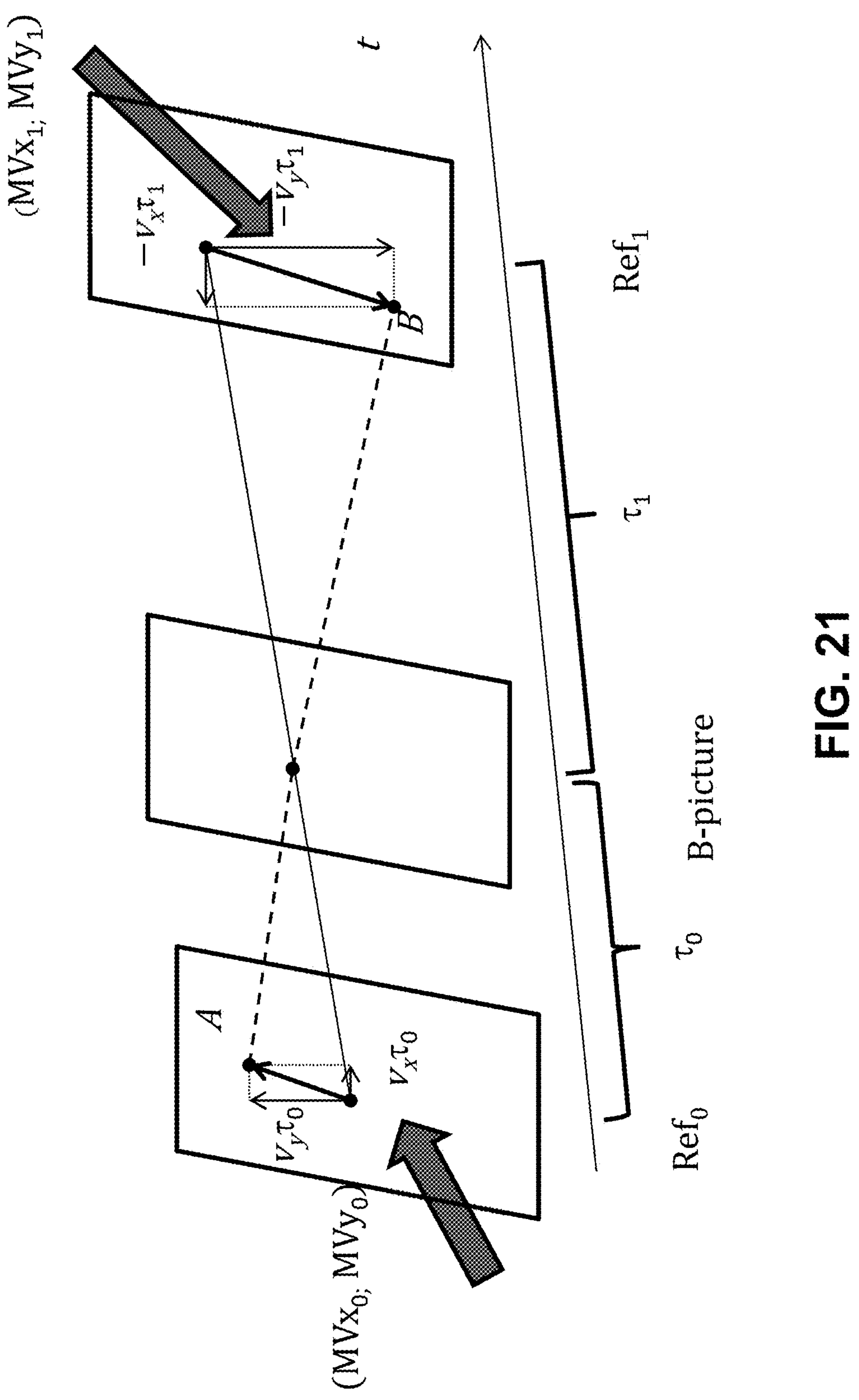
FIG. 21 shows an example of optical flow trajectory.

Here, $\tau_0$ and $\tau_1$ denote the distances to the reference frames as shown on a FIG. 21. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0$, $MVy_0$, $MVx_1$, $MVy_1 \neq 0$) and the block motion vectors are proportional to the time distance ($MVx_0/MVx_1 = MVy_0/MVy_1 = -\tau_0/\tau_1$).

Figure 37:
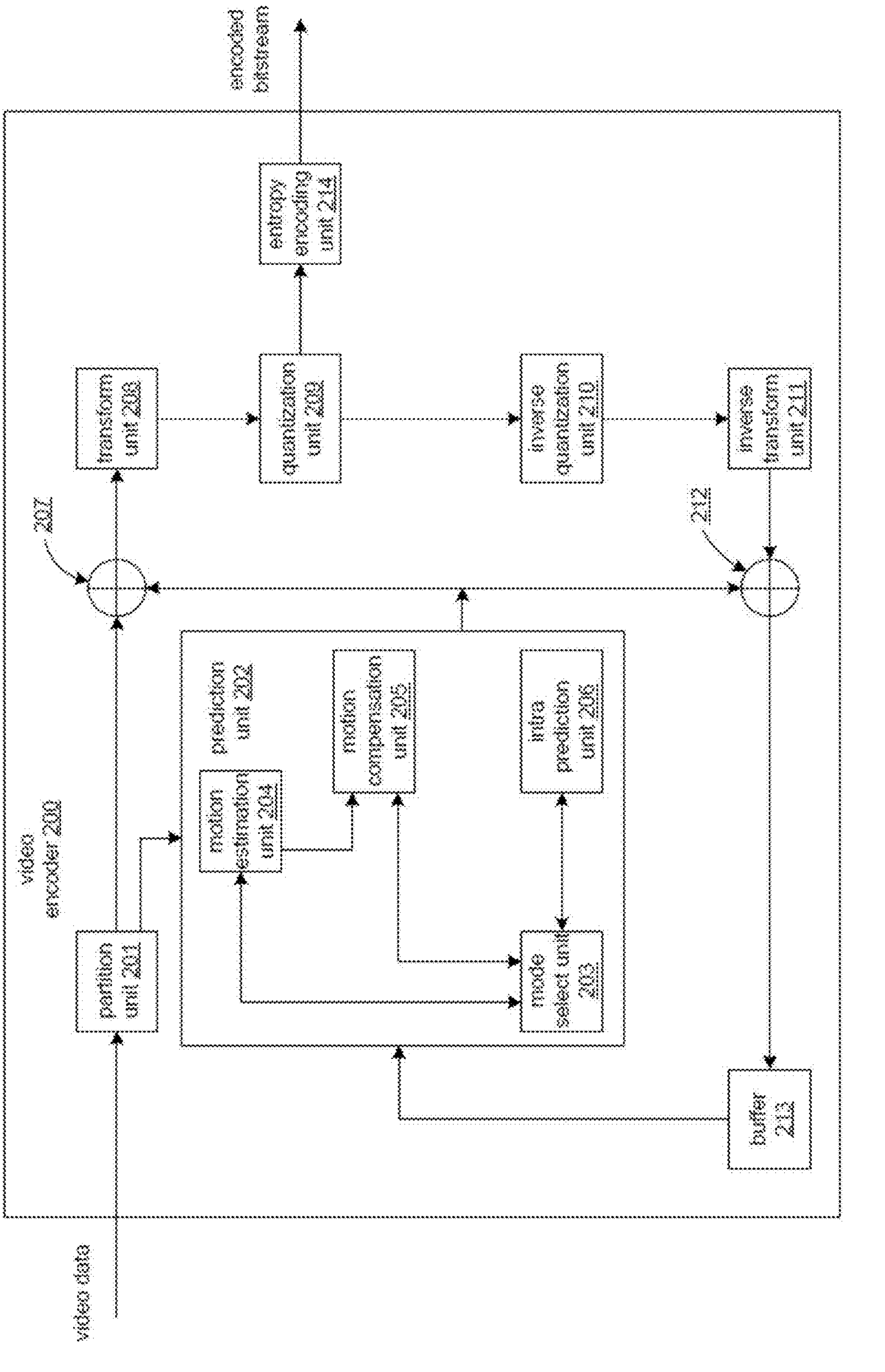
FIG. 37 is a block diagram that illustrates an encoder in accordance with some embodiments of the present disclosure.

The motion vector field $(v_x, v_y)$ is determined by minimizing the difference $\Delta$ between values in points A and B (intersection of motion trajectory and reference frame planes on FIG. 37). Model uses only first linear term of a local Taylor expansion for $\Delta$:

$$\Delta = \left(I^{(0)} - I^{(1)} + v_x\left(\tau_1 \partial I^{(1)}/\partial x + \tau_0 \partial I^{(0)}/\partial x\right) + v_y\left(\tau_1 \partial I^{(1)}/\partial y + \tau_0 \partial I^{(0)}/\partial y\right)\right) \quad (9)$$

All values in Equation (9) depend on the sample location (i',j'), which was omitted from the notation so far. Assuming the motion is consistent in the local surrounding area, we minimize $\Delta$ inside the (2M+1)×(2M+1) square window $\Omega$ centered on the currently predicted point (i, j), where M is equal to 2:

$$(v_x, v_y) = \underset{v_x, v_y}{\operatorname{argmin}} \sum_{[i',j'] \in \Omega} \Delta^2[i', j'] \quad (10)$$

For this optimization problem, the JEM uses a simplified approach making first a minimization in the vertical direction and then in the horizontal direction. This results in $$v_x = (s_1 + r) > m\ ?\ \text{clip3}\left(-thBIO, thBIO, -\frac{s_3}{(s_1 + r)}\right) : 0 \quad (11)$$

$$v_y = (s_5 + r) > m\ ?\ \text{clip3}\left(-thBIO, thBIO, -\frac{s_6 - v_x s_2/2}{(s_5 + r)}\right) : 0 \quad (12)$$

-continued $$\text{where, } s_1 = \sum_{[i',j'] \in \Omega} \left(\tau_1 \partial I^{(1)}/\partial x + \tau_0 \partial I^{(0)}/\partial x\right)^2; \quad (13)$$

$$s_3 = \sum_{[i',j'] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j'] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j'] \in \Omega} \left(\tau_1 \partial I^{(1)}/\partial y + \tau_0 \partial I^{(0)}/\partial y\right)^2;$$

$$s_6 = \sum_{[i',j'] \in \Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Equations (11) and (12).

$$r = 500 \cdot 4^{d-8} \quad (14)$$

$$m = 700 \cdot 4^{d-8} \quad (15)$$

Here d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation (13), 2M+1)×(2M+1) square window $\Omega$ centered in currently predicted point on a boundary of predicted block needs to accesses positions outside of the block (as shown in FIG. 22A.) In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 22B.

Figure 22B:
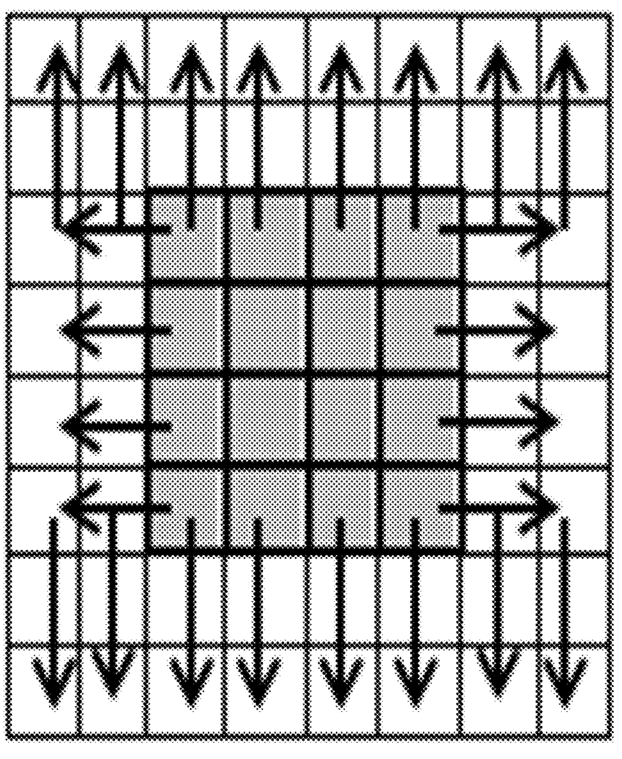
FIG. 22A-22B show examples of Bi-directional Optical flow (BIO) w/o block extension.
Figure 22A:
Figure 22A:
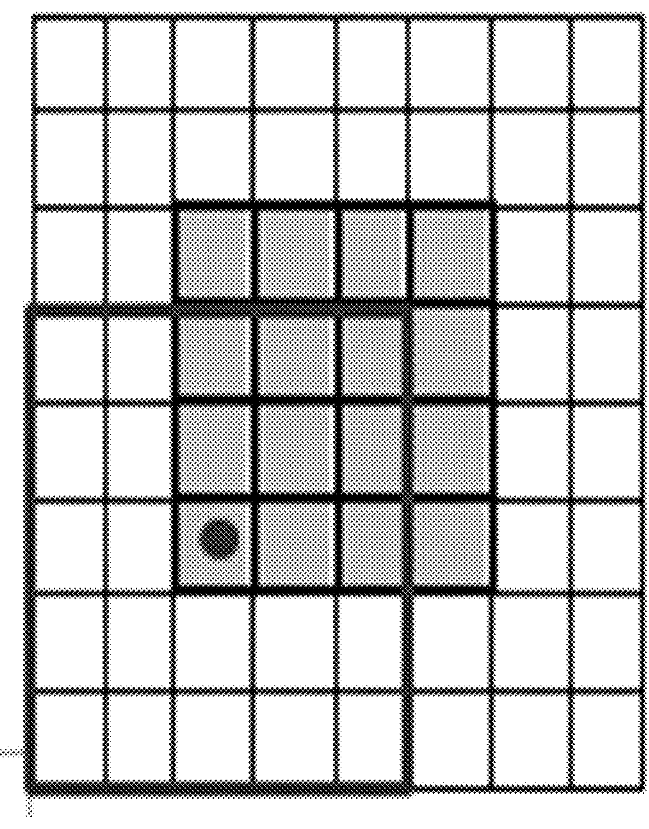

FIG. 22A-22B BIO w/o block extension: FIG. 22A shows access positions outside of the block.

FIG. 22B shows example of padding used in order to avoid extra memory access and calculation.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation (13) of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j'] \in \Omega(x,y)} \left(\tau_1 \partial I^{(1)}/\partial x + \tau_0 \partial I^{(0)}/\partial x\right)^2; \quad (16)$$

$$s_{3,b_k} = \sum_{(x,y) \in b_k} \sum_{[i',j'] \in \Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y) \in b_k} \sum_{[i',j'] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y) \in b_k} \sum_{[i',j'] \in \Omega} \left(\tau_1 \partial I^{(1)}/\partial y + \tau_0 \partial I^{(0)}/\partial y\right)^2;$$

$$s_{6,b_k} = \sum_{(x,y) \in b_k} \sum_{[i',j'] \in \Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples belonging to the k-th 4×4 block of the predicted block. $s_n$ in Equations (11) and (12) are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times2^{14-d}$; otherwise, it is set to $12\times2^{13-d}$.

Gradients for BIO are calculated at the same time with motion compensation interpolation using operations consistent with HEVC motion compensation process (2D separable finite impulse response (FIR)). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18-d. In case of vertical gradient $\partial I/\partial y$ first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.9.2. RIO in VTM-3.0 as Proposed in JVET-L0256

Step 1: Judge Whether RIO is Applicable (W and H are Width and Height of Current Block)

BIO is not applicable if

- Affine coded
- ATMVP coded
- (iPOC−iPOC0)*(iPOC−iPOC1)>=0
- H==4 or (W==4 and H==8)
- With Weighted Prediction
- GBi weights are not (1,1)

BIO is not used if

Total SAD between the two reference blocks (denoted as R0 and R1) is smaller than a threshold.

$$SAD=\sum_{(x,y)}|R0(x,y)-R1(x,y)|$$

Step 2: Data Preparation

For a W×H block, (W+2)×(H+2) samples are interpolated.

The inner W×H samples are interpolated with the 8-tap interpolation filter as in normal motion compensation The four side outer lines of samples (black circles in FIG. 23) interpolated with the bi-linear filter For each position, gradients are calculated on the two reference blocks (denoted as R0 and R1)

$$Gx0(x,y)=(R0(x+1,y)-R0(x-1,y))\gg 4$$

$$Gy0(x,y)=(R0(x,y+1)-R0(x,y-1))\gg 4$$

$$Gx1(x,y)=(R1(x+1,y)-R1(x-1,y))\gg 4$$

$$Gy1(x,y)=(R1(x,y+1)-R1(x,y-1))\gg 4$$

For each position, internal values are calculated as $$T1=(R0(x,y)\gg 6)-(R1(x,y)\gg 6),$$

$$T2=(Gx0(x,y)+Gx1(x,y))\gg 3,\ T3=(Gy0(x,y)+Gy1(x,y))\gg 3$$

$$B1(x,y)=T2*T2,\ B2(x,y)=T2*T3,\ B3(x,y)=-T1*T2,$$

$$B5(x,y)=T3*T3,\ B6(x,y)=-T1*T3$$

Figure 23:
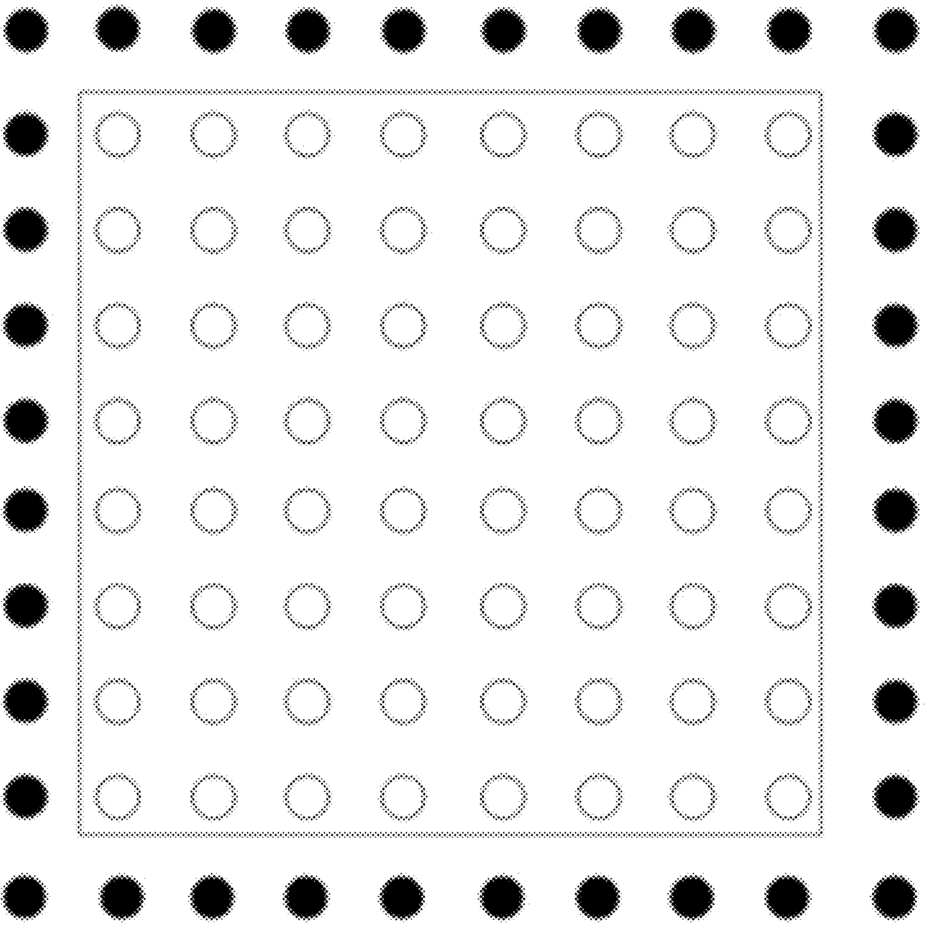
FIG. 23 shows examples of interpolated samples used in BIO.

FIG. 23 shows examples of interpolated samples used in BIO.

Step 3: Calculate Prediction for Each Block

BIO is skipped for a 4×4 block if SAD between the two 4×4 reference blocks is smaller than a threshold.

Calculate Vx and Vy.

Calculate the final prediction for each position in the 4×4 block.

$$b(x,y)=\left(Vx\left(Gx^0(x,y)-Gx^1(x,y)\right)+Vy\left(Gy^0(x,y)-Gy^1(x,y)\right)+1\right)\gg 1$$

$$P(x,y)=\left(R^0(x,y)+R^1(x,y)+b(x,y)+\text{offset}\right)\gg \text{shift}$$

b(x,y) is known as a correction item.

2.2.9.3. BIO in VTM-3.0

8.3.4 Decoding Process for Inter Blocks

If predFlagL0 and predFlagL1 are equal to 1, DiffPicOrderCnt(currPic, refPicList0[refIdx0])*DiffPicOrderCnt (currPic, refPicList1[refIdx1])<0, MotionModelIdc [xCb][yCb] is equal to 0 and MergeModeList [merge_idx[xCb][yCb]] is not equal to SbCol, set the value of bioAvailableFlag to TRUE.

Otherwise, set the value of bioAvailableFlag to FALSE.

. . .

If bioAvailableFlag is equal to TRUE, the following is applied:

The variable shift is set equal to Max(2, 14−bitDepth).

The variables cuLevelAbsDiffThres and subCuLevelAbsDiffThres are set equal to (1<<(bitDepth−8+shift)) *cbWidth*cbHeight and 1<<(bitDepth−3+shift). The variable cuLevelSumAbsoluteDiff is set to 0.

For xSbIdx=0 . . . (cbWidth>>2)−1 and ySbIdx=0 . . . (cbHeight>>2)−1, the variable subCuLevelSumAbsoluteDiff[xSbIdx][ySbIdx] and the bidirectional optical flow utilization flag bioUtilizationFlag[xSbIdx][ySbIdx] of the current subblock are derived as:

subCuLevelSumAbsoluteDiff[xSbIdx][ySbIdx]=⊔ $\Sigma_i\Sigma_j$ Abs(predSamplesL0L[(xSbIdx<<2)+1+i][(ySbIdx<<2)+1+j]−predSamplesL1L[(xSbIdx<<2)+1+i][(ySbIdx<<2)+1+j]) with i, j=0 . . . 3 bioUtilizationFlag [xSbIdx][ySbIdx]=subCuLevelSumAbsoluteDiff[xSbIdx][ySbIdx]>=subCuLevelAbsDiffThres cuLevelSumAbsoluteDiff+=subCuLevelSumAbsoluteDiff[xSbIdx][ySbIdx]

If cuLevelSumAbsoluteDiff is smaller than cuLevelAbsDiffThres, set bioAvailableFlag to FALSE.

If bioAvailableFlag is equal to TRUE, the prediction samples inside the current luma coding subblock, predSamplesL[xL+xSb][yL+ySb] with xL=0 . . . sbWidth−1 and yL=0 . . . sbHeight 1, are derived by invoking the bi-directional optical flow sample prediction process specified in clause 8.3.4.5 with the luma coding subblock width sbWidth, the luma coding subblock height sbHeight and the sample arrays predSamplesL0L and predSamplesL1L, and the variables predFlagL0, predFlagL1, refIdxL0, refIdxL1.

8.3.4.3 Fractional Sample Interpolation Process 8.3.4.3.1 General

Inputs to this process are:

a luma location (xSb, ySb) specifying the top-left sample of the current coding subblock relative to the top left luma sample of the current picture, a variable sbWidth specifying the width of the current coding subblock in luma samples, a variable sbHeight specifying the height of the current coding subblock in luma samples, a luma motion vector mvLX given in 1/16-luma-sample units, a chroma motion vector mvCLX given in 1/32-chroma-sample units, the selected reference picture sample array refPicLXL and the arrays refPicLXCb and refPicLXCr.

the bidirectional optical flow enabling flag bioAvailableFlag.

Outputs of this process are:

an (sbWidth)×(sbHeight) array predSamplesLXL of prediction luma sample values when bioAvailableFlag is FALSE, or an (sbWidth+2)×(sbHeight+2) array predSamplesLXL of prediction luma sample values when bioAvailableFlag is TRUE.

two (sbWidth/2)×(sbHeight/2) arrays predSamplesLXCb and predSamplesLXCr of prediction chroma sample values.

Let (xIntL, yIntL) be a luma location given in full-sample units and (xFracL, yFracL) be an offset given in 1/16-sample units. These variables are used only in this clause for specifying fractional-sample locations inside the reference sample arrays refPicLXL, refPicLXCb and refPicLXCr.

When bioAvailableFlag is equal to TRUE, for each luma sample location (xL=−1 . . . sbWidth, yL=−1 . . . sbHeight) inside the prediction luma sample array predSamplesLXL, the corresponding prediction luma sample value predSamplesLXL[xL][yL] is derived as follows:

The variables xIntL, yIntL, xFracL and yFracL are derived as follows:

$$xIntL = xSb - 1 + (mvLX[0] \gg 4) + xL$$

$$yIntL = ySb - 1 + (mvLX[1] \gg 4) + yL$$

$$xFracL = mvLX[0] \,\&\, 15$$

$$yFracL = mvLX[1] \,\&\, 15$$

The value of bilinearFiltEnabledFlag is derived as follows:

If xL is equal to −1 or sbWidth, or yL is equal to −1 or sbHeight, set the value of bilinearFiltEnabledFlag to TRUE.

Else, set the value of bilinearFiltEnabledFlag to FALSE.

The prediction luma sample value predSamplesLXL[xL][yL] is derived by invoking the process specified in clause 8.3.4.3.2 with (xIntL, yIntL), (xFracL, yFracL), refPicLXL and bilinearFiltEnabledFlag as inputs.

When bioAvailableFlag is equal to FALSE, for each luma sample location (xL=0 . . . sbWidth−1, yL=0 . . . sbHeight−1) inside the prediction luma sample array predSamplesLXL, the corresponding prediction luma sample value predSamplesLXL[xL][yL] is derived as follows:

The variables xIntL, yIntL, xFracL and yFracL are derived as follows:

$$xIntL = xSb + (mvLX[0] \gg 4) + xL$$

$$yIntL = ySb + (mvLX[1] \gg 4) + yL$$

$$xFracL = mvLX[0] \,\&\, 15$$

$$yFracL = mvLX[1] \,\&\, 15$$

The variable bilinearFiltEnabledFlag is set to FALSE.

The prediction luma sample value predSamplesLXL[xL][yL] is derived by invoking the process specified in clause 8.3.4.3.2 with (xIntL, yIntL), (xFracL, yFracL), and refPicLXL and bilinearFiltEnabledFlag as inputs.

. . .

8.3.4.5 Bi-Directional Optical Flow Prediction Process

Inputs to this process are:

two variables nCbW and nCbH specifying the width and the height of the current coding block, two (nCbW+2)×(nCbH+2) luma prediction sample arrays predSamplesL0 and predSamplesL1, the prediction list utilization flags, predFlagL0 and predFlagL1, the reference indices refIdxL0 and refIdxL1, the bidirectional optical flow utilization flags bioUtilizationFlag[xSbIdx][ySbIdx] with xSbIdx=0 . . . (nCbW>>2)−1, ySbIdx=0 . . . (nCbH>>2)−1

Output of this process is the (nCbW)×(nCbH) array pbSamples of luma prediction sample values.

The variable bitDepth is set equal to BitDepthY.

The variable shift2 is set equal to Max(3, 15—bitDepth) and the variable offset2 is set equal to 1<<(shift2−1).

The variable mvRefineThres is set equal to 1<<(13—bitDepth).

For xSbIdx=0 . . . (nCbW>>2)−1 and ySbIdx=0 . . . (nCbH>>2)−1,

If bioUtilizationFlag[xSbIdx][ySbIdx] is FALSE, for x=xSb . . . xSb+3,y=ySb . . . ySb+3, the prediction sample values of the current prediction unit are derived as follows:

$$pbSamples[x][y] = Clip3(0, (1 \ll bitDepth) - 1, (predSamplesL0[x][y] + predSamplesL1[x][y] + offset2) \gg shift2)$$

Otherwise, the prediction sample values of the current prediction unit are derived as follows:

The location (xSb, ySb) specifying the top-left sample of the current subblock relative to the top left sample of prediction sample arrays predSamplesL0 and predSampleL1 is derived as follows:

$$xSb = (xSbIdx \ll 2) + 1$$

$$ySb = (ySbIdx \ll 2) + 1$$

For x=xSb−1 . . . xSb+4,y=ySb−1 . . . ySb+4, the followings are applied:

The locations (hx, vy) for each of the corresponding sample (x, y) inside the prediction sample arrays are derived as follows:

$$hx = Clip3(1, nCbW, x)$$

$$vy = Clip3(1, nCbH, y)$$

The variables gradientHL0[x][y], gradientVL0[x][y], gradientHL1[x][y] and gradientVL1[x][y] are derived as follows:

$$gradientHL0[x][y] = (predSamplesL0[hx+1][vy] - predSamplesL0[hx-1][vy]) \gg 4$$

$$gradientVL0[x][y] = (predSamplesL0[hx][vy+1] - predSamplesL0[hx][vy-1]) \gg 4$$

$$gradientHL1[x][y] = (predSamplesL1[hx+1][vy] - predSamplesL1[hx-1][vy]) \gg 4$$

$$gradientVL1[x][y] = (predSamplesL1[hx][vy+1] - predSamplesL1[hx][vy-1]) \gg 4$$

The variables temp, tempX and tempY are derived as follows:

$$temp[x][y] = (predSamplesL0[hx][vy] \gg 6) - (predSamplesL1[hx][vy] \gg 6)$$

$$tempX[x][y] = (gradientHL0[x][y] + gradientHL1[x][y] \gg 3$$

$$tempY[x][y] = (gradientVL0[x][y] + gradientVL1[x][y] \gg 3$$

The variables sGx2, sGy2, sGxGy, sGxdI and sGydI are derived as follows:

$$sGx2 = \square \sum_x \sum_y (tempX[xSb+x][ySb+y]^* tempX[xSb+x][ySb+y]) \text{ with } x, y = -1 \ldots 4$$

$$sGy2 = \square \sum_x \sum_y (tempY[xSb+x][ySb+y]^* tempX[xSb+x][ySb+y]) \text{ with } x, y = -1 \ldots 4$$

$$sGxGy = \sum_x \sum_y (tempX[xSb+x][ySb+y]^* tempX[xSb+x][ySb+y]) \text{ with } x, y = -1 \ldots 4$$

$$sGxdI = \sum_x \sum_y (-tempX[xSb+x][ySb+y]^* temp[xSb+x][ySb+y]) \text{ with } x, y = -1 \ldots 4$$

$$sGydI = \sum_x \sum_y (-tempY[xSb+x][ySb+y]^* temp[xSb+x][ySb+y]) \text{ with } x, y = -1 \ldots 4$$

The horizontal and vertical motion refinements of the current subblock are derived as:

$$vx = sGx2 > 0 \,?\, Clip3(-mvRefineThres, mvRefineThres, -(sGxdI \ll 3) \gg \text{Floor}(\text{Log2}(sGx2)) : 0$$

$$vy = sGy2 > 0 \,?\, Clip3(-mvRefineThres, mvRefineThres, ((sGydI \ll 3) - ((vx^* sGxGym) \ll 12 + vx^* sGxGys) \gg 1) \gg \text{Floor}(\text{Log2}(sGy2))) : 0$$

$$sGxGym = sGxGy \gg 12;$$

$$sGxGys = sGxGy \,\&((1 \ll 12) - 1)$$

For x=xSb−1 . . . xSb+2,y=ySb−1 . . . ySb+2, the followings are applied:

$$sampleEnh = \text{Round}((vx^*(gradientHL1[x+1][y+1] - gradientHL0[x+1][y+1])) \gg 1) + \text{Round}((vy^*(gradientVL1[x+1][y+1] - gradientVL0[x+1][y+1])) \gg 1) pbSamples[x][y] = Clip3(0, (1 \ll bitDepth) - 1, (predSamplesL0[x+1][y+1] + predSamplesL1[x+1][y+1] + sampleEnh + offset2) \gg shift2)$$

2.2.10. Decoder-Side Motion Vector Refinement

DMVR is one kind of Decoder-side Motion Vector Derivation (DMVD)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
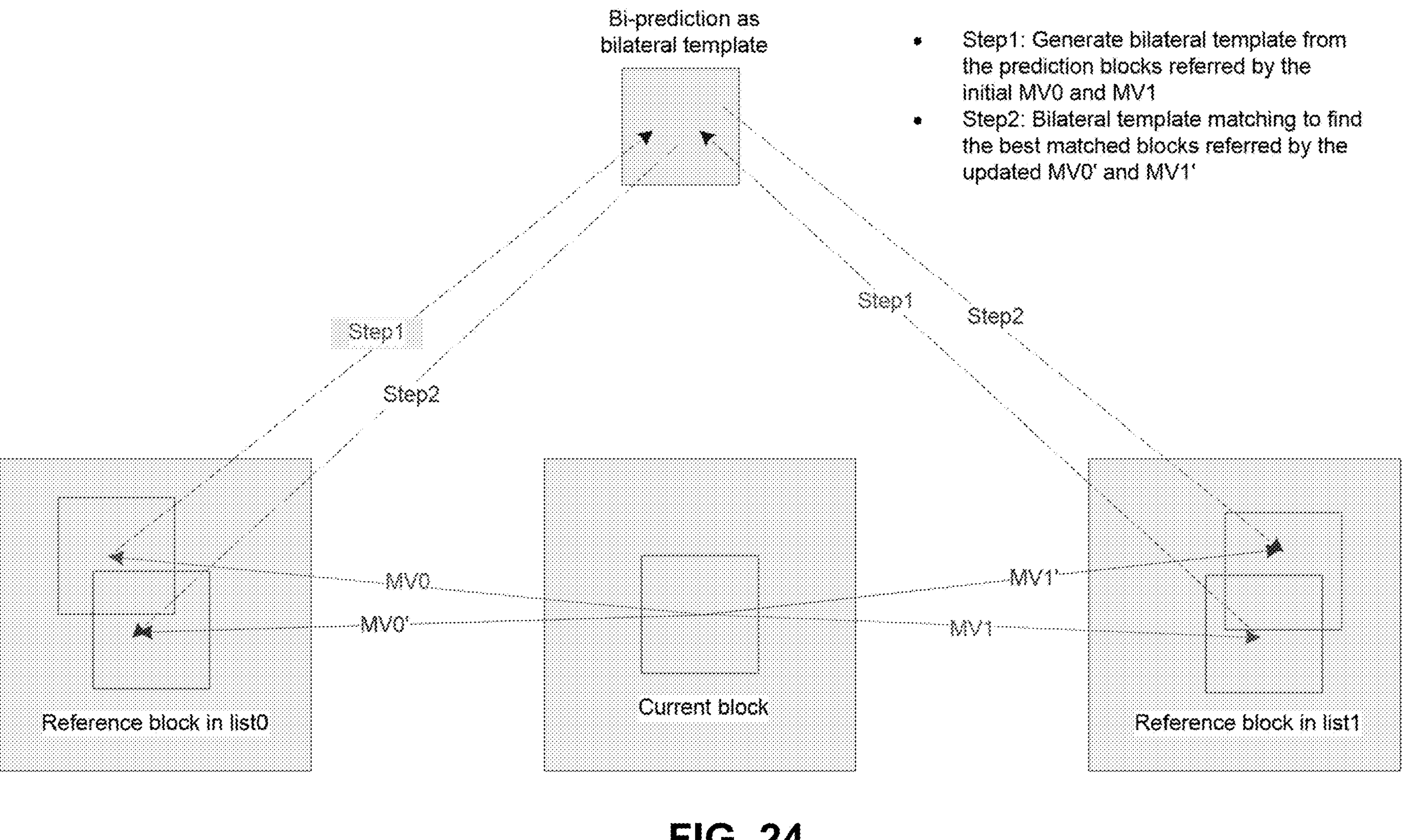
FIG. 24 shows an example of proposed decoder-side motion vector refinement (DMVR) based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

FIG. 24 shows an example of proposed DMVR based on bilateral template matching.

2.2.11. JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step 2) The spatial gradients $g_x(i, j)$ and $g_y(i, j)$ of the sub-block prediction are calculated at each sample location using a 3-tap filter [−1, 0, 1].

$$g_x(i, j) = I(i+1, j) - I(i-1, j)$$

$$g_y(i, j) = I(i, j+1) - I(i, j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 25:
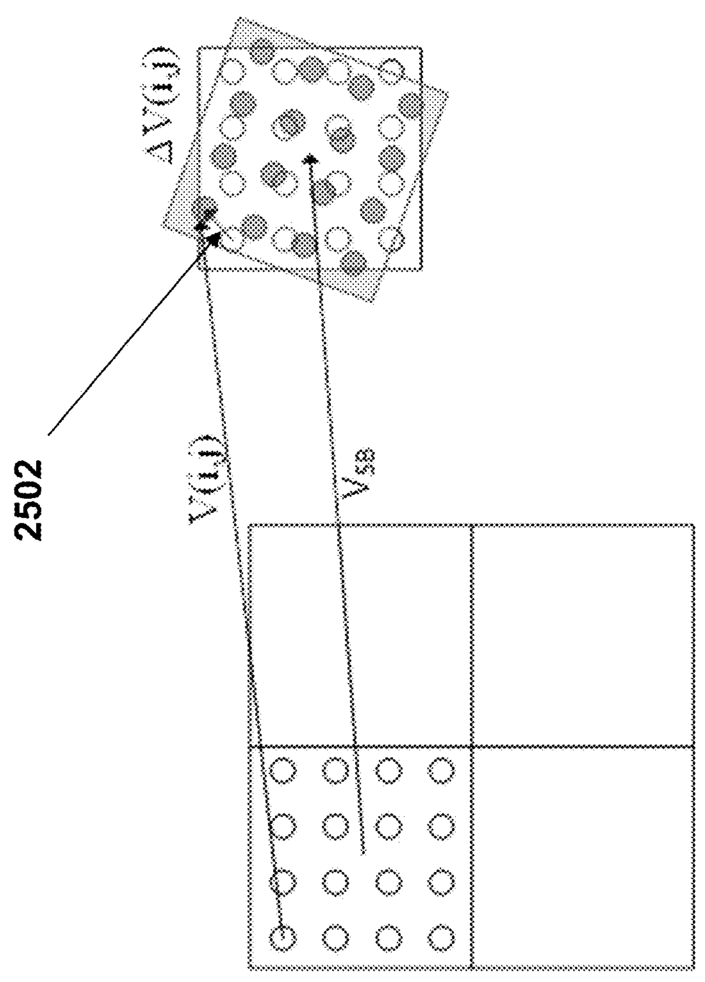
FIG. 25 shows examples of sub-block motion vector (MV) (VSB) and pixel Δv(i,j).

Step 3) The luma prediction refinement is calculated by the optical flow equation.

$$\Delta I(i, j) = g_x(i, j) * \Delta v_x(i, j) + g_y(i, j) * \Delta v_y(i, j)$$

where the Δv(i,j) is the difference between pixel MV computed for sample location (i,j), denoted by v(i,j), and the sub-block MV of the sub-block to which pixel (i,j) belongs, as shown in FIG. 25.

FIG. 25 shows examples of sub-block MV VSB and pixel Δv(i, j) (arrow 2502).

Since the affine model parameters and the pixel location relative to the sub-block center are not changed from sub-block to sub-block, Δv(i,j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c * x + d * y \\ \Delta v_y(x, y) = e * x + f * y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation.

$$I'(i, j) = I(i, j) + \Delta I(i, j)$$

2.2.12. JVET-N0510

Phase-Variant Affine Subblock Motion Compensation (PAMC)

To better approximate the affine motion model in an affine subblock, phase-variant MC is applied to the subblock. In the proposed method, the affine coded block is also divided into 4×4 subblocks, and a subblock MV is derived for each subblock as done in VTM4.0. The MC of each subblock is divided into two stages. The first stage is to filter an (4+L−1)×(4+L−1) reference block window with (4+L−1) rows of horizontal filtering, where the L is the filter tap length of the interpolation filer. However, different from the translational MC, in the proposed phase-variant affine subblock MC, the filter phase of each sample row is different. For each sample row, MVx is derived as follows.

$$MVx = (subblockMVx \ll 7 + dMvVerX \times (rowIdx - L/2 - 2)) \gg 7 \quad \text{(Equation 1)}$$

The filter phase of each sample row is derived from the MVx. The subblockMVx is the x component of the MV of the derived subblock MV as done in VTM4.0. The rowIdx is the sample row index. The dMvVerX is (cuBottomLeftCPMVx−cuTopLeftCPMVx)<<(7−log 2LumaCbHeight), where cuBottomLeftCPMVx is the x component of the CU bottom left control point MV, cuTopLeftCPMVx is the x component of the CU top left control point MV, and LumaCbHeight is the log 2 of the height of the luma coding block (CB).

Figure 26:
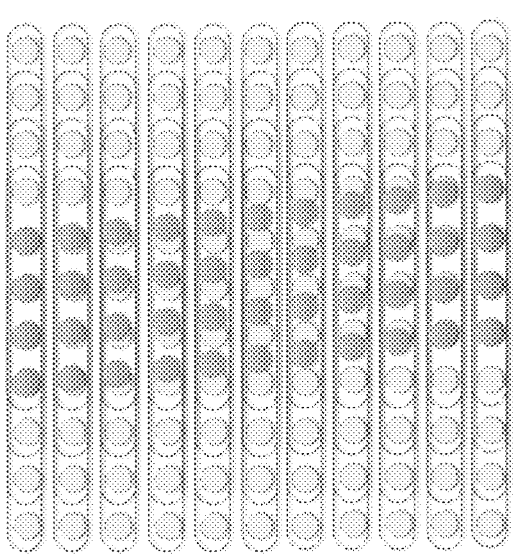
FIG. 26 shows an example of phase-variant horizontal filtering.
Figure 27:
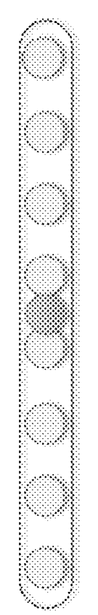
FIG. 27 shows an example of illustration of applying one time of 8-tap horizontal filtering.

After the horizontal filtering, a 4×(4+L−1) horizontally filtered samples are generated. FIG. 1 shows the concept of the proposed horizontal filtering. The gray points are the samples of the reference block window, and the orange points denote the horizontally filtered samples. A blue tube of 8×1 samples denotes applying one time of 8-tap horizontal filtering, as shown in FIG. 26 and FIG. 27. Each sample row needs four times of horizontal filtering. The filter phases on a sample row are the same. However, the filter phases on different rows are different. Skewed 4×11 samples are generated.

In the second stage, the 4×(4+L−1) horizontally filtered samples (orange samples in FIG. 1) are further vertically filtered. For each sample column, MVy is derived as follows.

$$MVy = (subblockMVy \ll 7 + dMvHorY \times (columnIdx - 2)) \gg 7 \quad \text{(Equation 2)}$$

The filter phase of each sample column is derived from the MVy. The subblockMVy is the y component of the MV of the derived subblock MV as done in VTM4.0. The columnIdx is the sample column index. The dMvHorY is (cuTopRightCPMVy−cuTopLeftCPMVy)<<(7−log 2LumaCbWidth), where cuTopRightCPMVy is the y component of the CU top right control point MV, cuTopLeftCPMVy is the y component of the CU top left control point MV, and log 2LumaCbWidth is the log 2 of the width of the luma CB.

Figure 28:
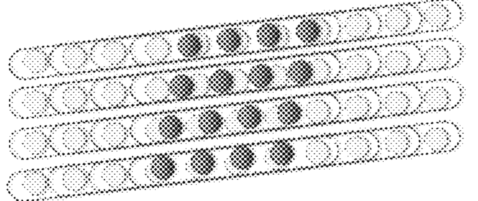
FIG. 28 shows an example of non-uniform phase vertical filtering.

After the vertical filtering, 4×4 affine subblock prediction samples are generated. FIG. 28 shows the concept of the proposed vertical filtering. The light orange points are the horizontally filtered samples from first stage. The red points are the vertically filtered samples as the final prediction samples.

In this proposal, the used interpolation filter sets are the same as those in VTM4.0. The only difference is that the horizontal filter phases on one sample row are different and the vertical filter phases on one sample column are different. As for the number of filtering operations for each affine subblock in the proposed method, it is the same as that in VTM4.0.

2.2.13. JVET-K0102 Interweaved Prediction

Figure 29:
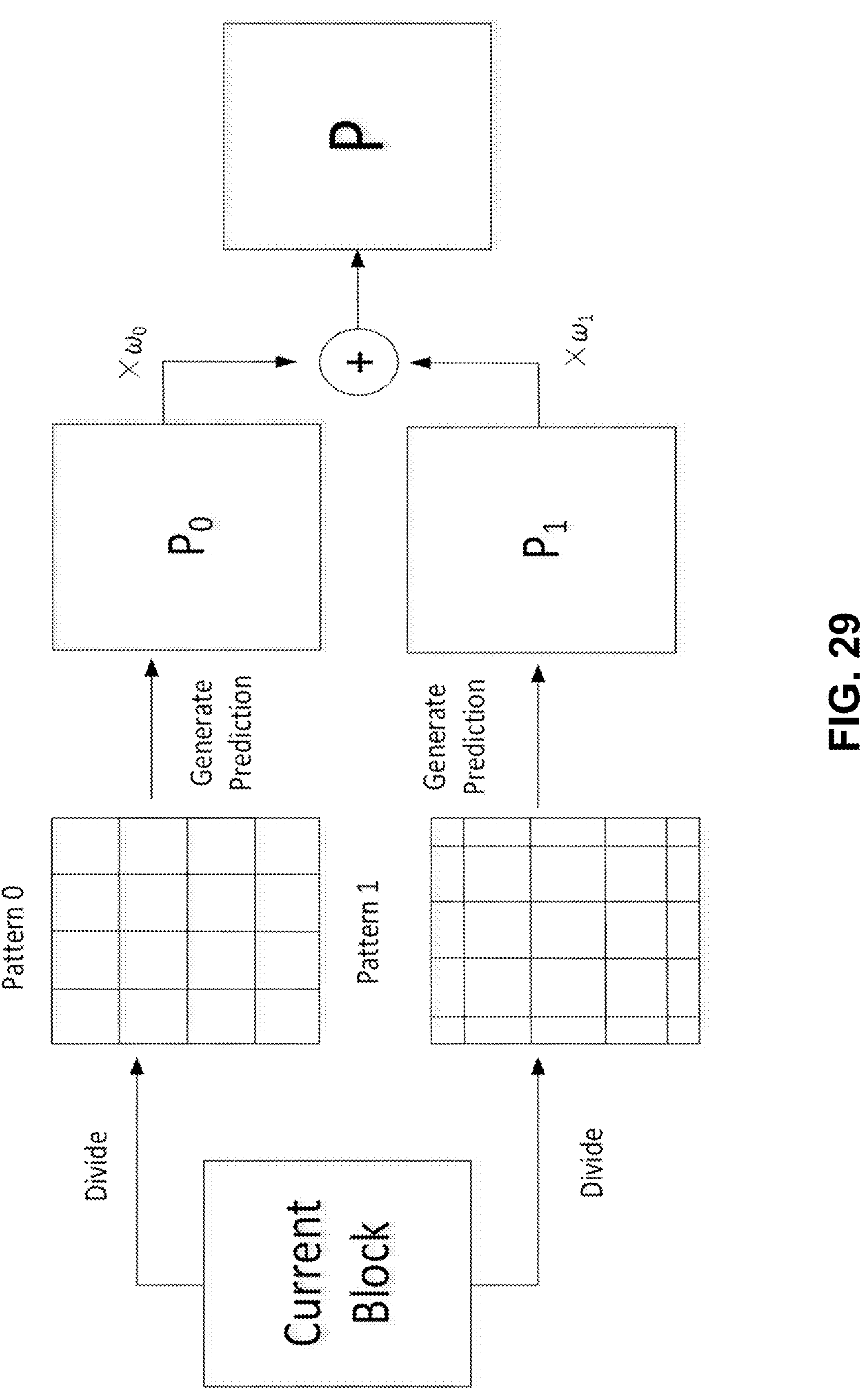
FIG. 29 shows an example of an interweaved prediction procedure.

Interweaved prediction as shown in FIG. 29 is proposed to achieve a finer granularity of MVs without increasing the complexity too much.

First, a coding block is divided into sub-blocks with two different dividing patterns. The first dividing pattern is the same as that in VTM as pattern 0 shown in FIG. 31, while the second dividing pattern also divides the coding-block into 4*4 sub-blocks but with a 2*2 offset as pattern 1 shown in FIG. 32.

Second, two auxiliary predictions are generated by AMC with the two dividing patterns. The MV for each sub-block in a dividing pattern is derived from CPMVs by the affine model.

The final prediction is calculated as a weighted-sum of the two auxiliary predictions, formulated as:

$$\begin{cases} P = (P_0 + P_1) \gg 1, & \text{if } \omega_0 = \omega_1 \\ P = (\omega_0 P_0 + \omega_1 P_1) \gg 2 & \text{Otherwise} \end{cases}. \quad (1)$$

As shown in FIG. 30, an auxiliary prediction sample located at the center of a sub-block is associated with a weighting value 3, while an auxiliary prediction sample located at the boundary of a sub-block is associated with a weighting value 1.

FIG. 29 shows an example of interweaved prediction procedure.

FIG. 30 shows examples of weighting values in a sub-block.

3. Technical Problems Solved by Disclosed Technical Solutions

1. Optical flow is used for affine prediction in JVET-N0236, but far from being optimal.
2. When interweaved prediction is applied, the required bandwidth may be increased.
3. How to apply motion compensation for chroma components with 4×4 sub-blocks for affine mode is still an open issue.
4. Interweaved affine prediction increases cache bandwidth requirements. For AMC of pattern1 in interweaved affine prediction, the reference sample lines need to be fetched from the cache buffer, resulting in a higher cache bandwidth.

4. Example Solutions and Embodiments

To tackle the problems, another others, we propose different formations for derivation of refined prediction samples with optical flow. In addition, we propose to use neighboring (e.g., adjacent or non-adjacent) blocks' information (such as reconstructed samples or motion information), and/or gradients of one sub-block/block and prediction blocks of the sub-block/block to obtain the final prediction blocks of current sub-block/block.

The items below should be considered as examples to explain general concepts. These items should not be interpreted in a narrow way. Furthermore, these items can be combined in any manner.

Denote reference picture of current picture from list 0 and list 1 by Ref0 and Ref1 respectively, denote $\tau_0$=POC(current)−POC(Ref0), $\tau_1$=POC(Ref1)−POC(current), and denote reference block of the current block from Ref0 and Ref1 by refblk0 and refblk1 respectively. For a subblock in current block, MV of its corresponding reference subblock in refblk0 pointing to refblk1 is denoted by $(v_x, v_y)$. MVs of the current subblock referring to Ref0 and Ref1 are denoted by $(mvL0_x, mvL0_y)$ and $(mvL1_x, mvL1_y)$ respectively.

In the following discussion, SatShift(x, n) is defined as $$SatShift(x, n) = \begin{cases} (x + offsset0) \gg n & \text{if } x \geq 0 \\ -((-x + \text{offset1}) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as $$\text{Clip3}(\text{Min}, \text{Max}, x) = \begin{cases} \text{Min} & \text{if } x < \text{Min} \\ \text{Max} & \text{if } x > \text{Max} \\ x & \text{Otherwise} \end{cases}$$

In the following discussion, an operation between two motion vectors means the operation will be applied to both the two components of the motion vector. For example, MV3=MV1+MV2 is equivalent to $MV3_x=MV1_x+MV2_x$ and $MV3_y=MV1_y+MV2_y$. alternatively, the operation may be only applied to the horizontal or vertical component of the two motion vectors.

In the following discussion, the left neighbouring block, left-bottom neighbouring block, above neighbouring block, right-above neighbouring block and left-above neighbouring block are denoted as block $A_1$, $A_0$, $B_1$, $B_0$ and $B_2$ as shown in FIG. 2.

Figure 39B:
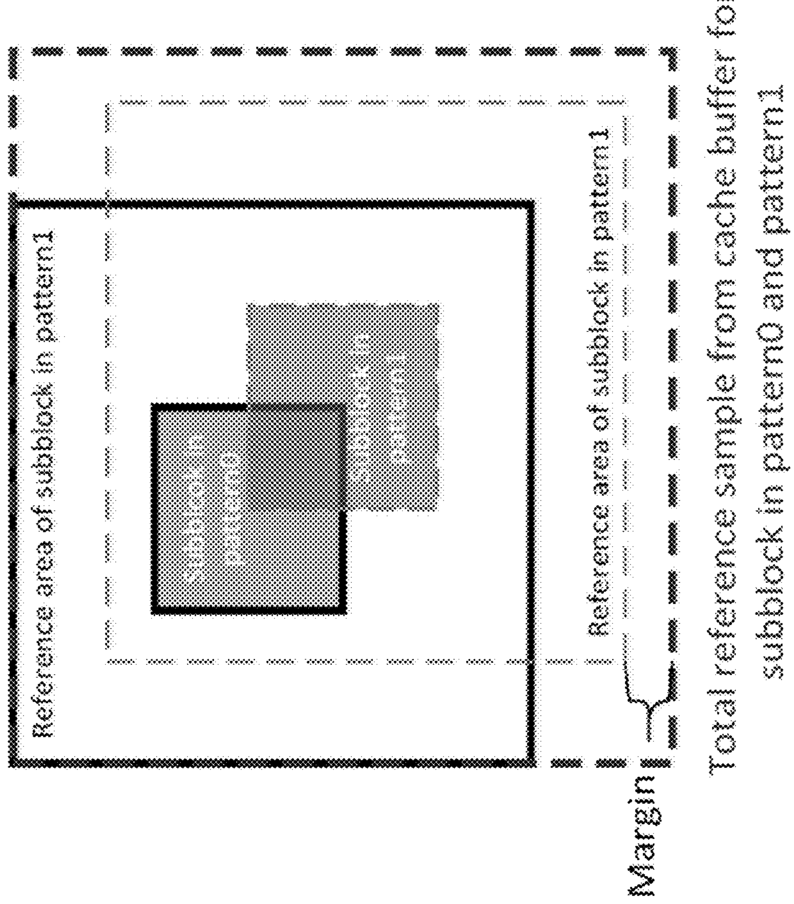
FIGS. 39A and 39B show examples of cache bandwidth restriction for interweaved affine prediction.
Figure 39A:
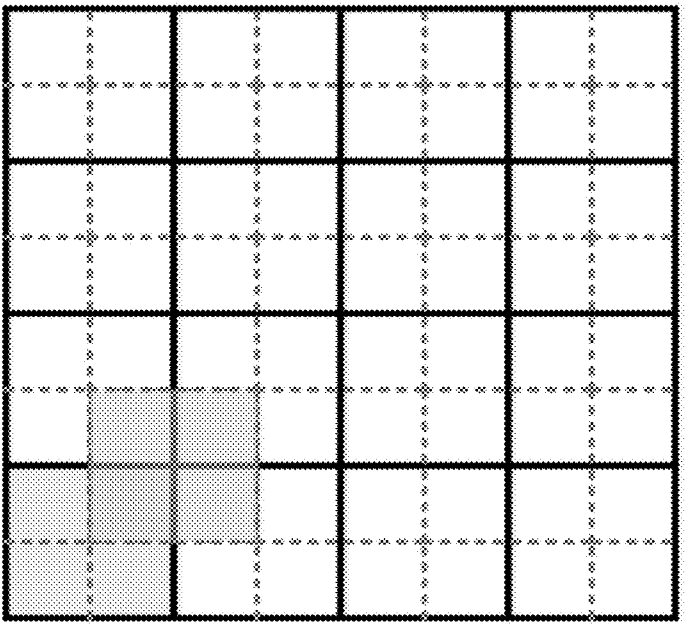

An Example of Constraints of Cache Bandwidth in the Interweaved Prediction of Affine Mode The reference sample lines for MC of subblocks in pattern 0 can be reused in the MC of spatial neighboring subblocks in pattern 1. For example, the subblock in pattern 0 (with faint yellow) and its corresponding subblock in pattern1 (with faint blue) as shown in FIG. 39A. With the proposed cache bandwidth restriction, as shown in FIG. 39B, the number (denoted by N) of lines of reference sample fetched from the cache buffer for a subblock in pattern 0 is:

$$num_{filter\_tap} + \text{height\_sub} + \frac{\text{height\_sub}}{2} + \text{Margin}$$

wherein $num_{filter\_tap}$ represents the number of filter taps such as 6, 7 or 8 and Margin is a preset non-negative number such as 0 or 1.

To make sure the reference sample lines required by the corresponding subblock in pattern 1 are within the N lines required by the subblock in pattern 1, MV_y of subblock in pattern1 is restricted. When MV_y of subblock in pattern1 is out of the restriction, the interweaved affine prediction is not used.

Figure 40:
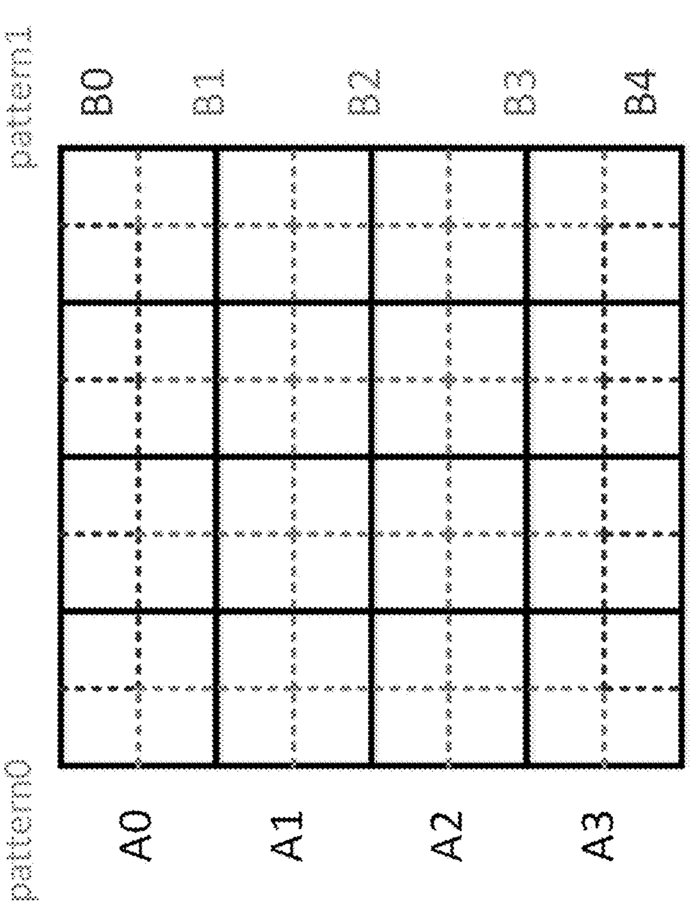
FIG. 40 shows an example of a subblock line in pattern0 and pattern1.
Figure 42:
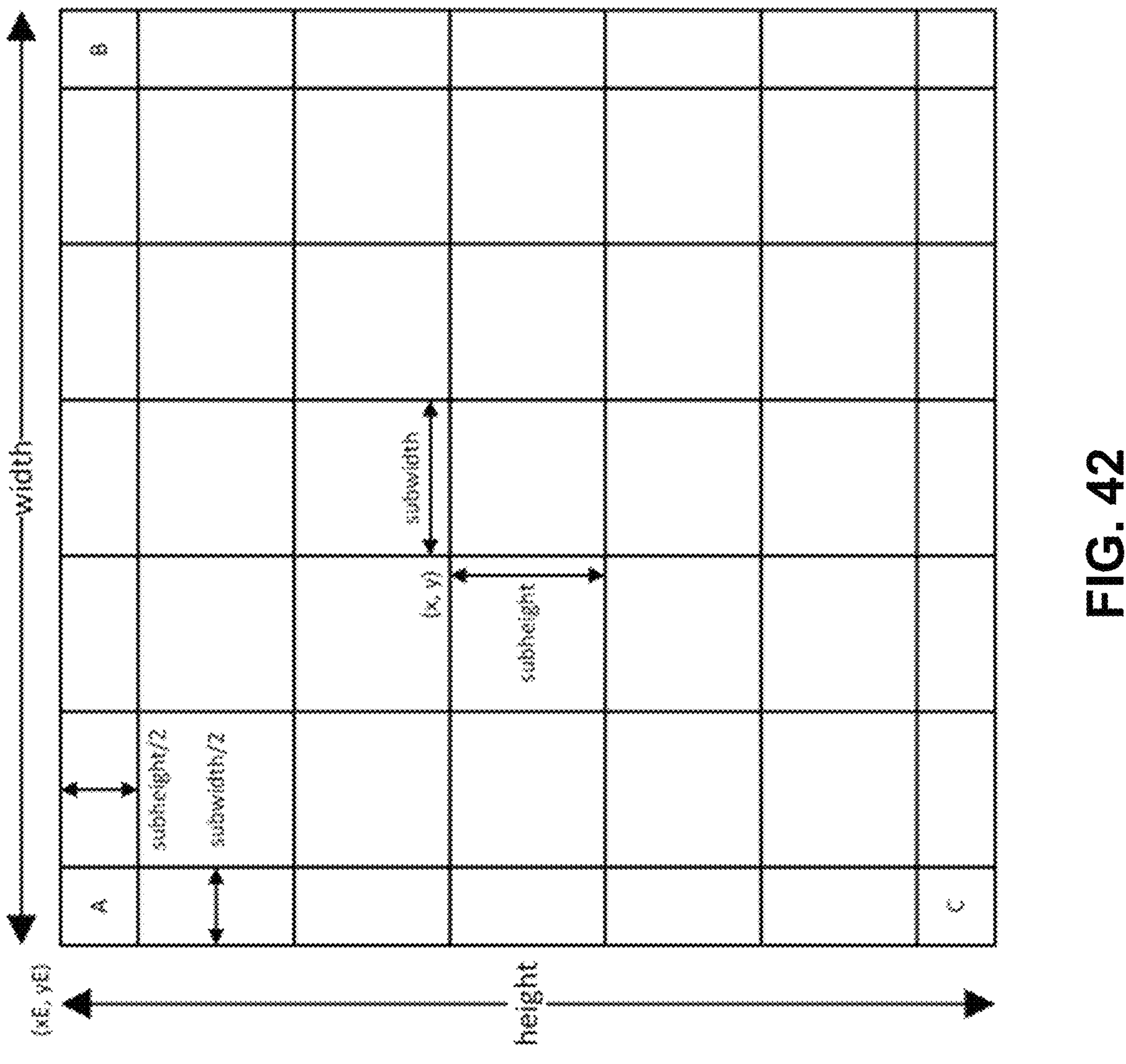
FIGS. 42 and 43 show locations of the sample-patterns 0 and 1, respectively.
Figure 43:
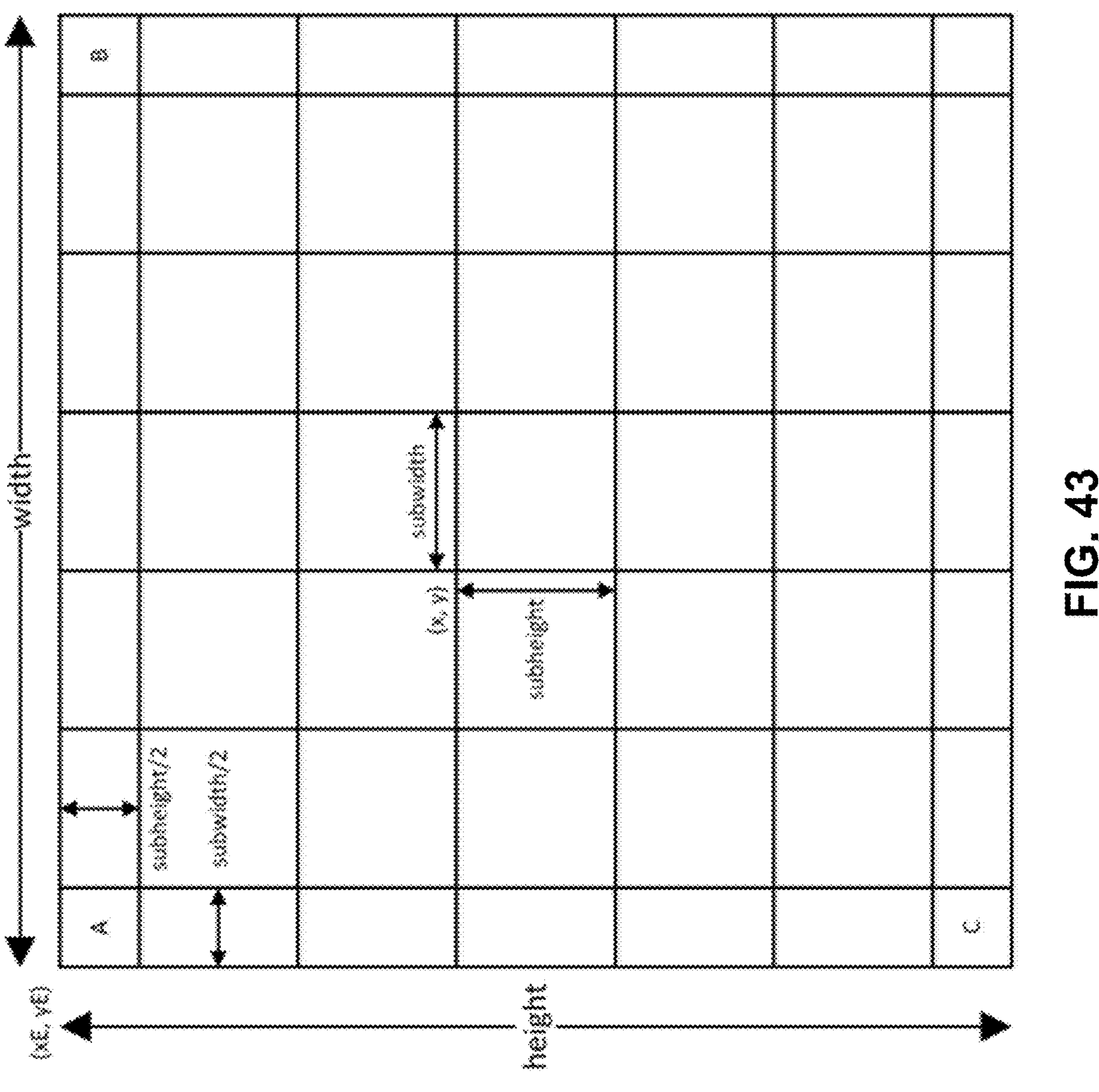

As shown in FIG. 40, A0, A1, A2, A3 represent the subblock line of the pattern0 and B0, B1, B2, B3, B4 represent the subblock line of pattern1 in interweaved prediction of affine mode.

For B0 subblock line, if $MV_y(A0)-MV_y(B0)>$Margin, the interweaved prediction of affine mode is not used;

For B4 subblock line, if $MV_y(B4)-MV_y(A3)>$Margin, the interweaved prediction of affine mode is not used;

For B1, B2, B3 subblock line, which subblock line in pattern0 share the cache buffer line with them is decided by the affine model. Take B1 subblock line as an example, if $\Delta MV_y=MV_y(B1)-MV_y(A0)>0$, the prediction samples of subblock in the B1 line is closer to the A1 subblock line than the A0 subblock line. We can use the affine model to calculate $\Delta MV_y$: $\Delta MV_y=d\Delta x+e\Delta y$. Here, we set $$\Delta x = \frac{\text{subblock\_width}}{2} \text{ and } \Delta y = \frac{\text{subblock\_height}}{2},$$

where subblock_width and subblock_height represent the width and height of subblock. When $\Delta MV_y>0$&&$MV_y(A1)-MV_y(B1)>$Margin or $\Delta MV_y\leq 0$&&$MV_y(B1)-MV_y(A0)>$Margin, the interweaved prediction of affine mode is not used. And B2 and B3 subblock line is similar.

In the above description, $MV_y(Ax)$ represents the vertical component of the motion vector of the subblock in pattern 0 and $MV_y(Bx)$ represents the vertical component of the motion vector of corresponding subblock in pattern1.

1. It is proposed that the gradient (e.g., the G(x, y)) may be derived at sub-block level wherein all samples within a sub-block are assigned with the same gradient value.
   a. In one example, all samples within one sub-block shares the same motion displacement and gradient information. So that the refinement can be performed at sub-block level. For the sub-block $(x_s, y_s)$, only one refinement is derived as $$(Vx(x_s, y_s) \times Gx(x_s, y_s) + Vy(x_s, y_s) \times Gy(x_s, y_s)).$$

i. Alternatively, furthermore, the motion displacement V(x, y) is derived at sub-block level, such as 2×2 or 4×1.
   b. For example, the sub-block may be defined as different shape such as 2×2, 2×1, or 4×1.
   c. For example, the sub-block's gradient may be calculated using the averaging sample value of its sub-block or partial of samples within a sub-block.
   d. For example, the sub-block's gradient $Gx(x_s, y_s)$ may be calculated as the average of each sample's gradient or average of gradients from partial of samples within a sub-block.
   e. In one example, the sub-block size may be predefined or derived on-the-fly according to decoded information (e.g., according to block dimension).
      i. Alternatively, indication of the sub-block size may be signalled in a bitstream.
   f. In one example, the sub-block size for gradient calculation and that for motion vector/motion vector difference may be the same.
      i. Alternatively, the sub-block size for gradient calculation may be smaller than the block size for motion vector/motion vector difference.
      ii. Alternatively, the sub-block size for gradient calculation may be greater than the block size for motion vector/motion vector difference.
2. Instead of performing PROF for each reference picture list, PROF (or other prediction refinement coding methods that rely on optical flow information) may be applied after bi-prediction is performed to reduce the complexity.

a. In one example, a temporary prediction signal according to at least two sets of decoded motion information may be firstly generated (e.g., with average/weighted average), and the refinement is further applied according to the generated temporary prediction signal.

i. In one example, the gradient calculation is derived from the generated temporary prediction signal.

b. In one example, assume two predictors from two reference lists for a sample located at (x, y) are denoted as $P_0(x, y)$ and $P_1(x, y)$, respectively. The optical flow from two lists are denoted as $V^0(x,y)$ and $V^1(x,y)$, respectively. The intermediate bi-prediction $P_b(x,y)$ is derived as, $$P_b(x, y) = \alpha \times P_0(x, y) + \beta \times P_1(x, y) + o$$

where α and β are the weighting factor for two predictions, and o is the offset. The spatial gradient can be derived using $P_b(x,y)$. The final bi-prediction is derived as, $$P'(x, y) = P_b(x, y) + Gx(x, y) \times \left(\alpha \times V_x^0(x, y) + \beta \times V_x^1(x, y)\right) + Gy(x, y) \times \left(\alpha \times V_y^0(x, y) + \beta \times V_y^1(x, y)\right)$$

3. It is proposed that whether to apply a coding tool related to affine prediction for a block may be determined by whether a condition is satisfied, where in the condition depends on coded information such as CPMVs of the block and/or width of the block or sub-block, and/or height of the block or sub-block, and/or one or more MVs derived for one or more subblocks, and/or the block is bi-predicted or uni-predicted. In the following discussion, the width and height of the block is represented by W and H, respectively.

a. The block may be coded with at least one of affine-merge mode, affine-inter mode, affine-skip mode, affine merge with motion vector difference mode (affine matched motion vector derivation (MMVD)), a.k.a. affine ultimate motion vector expression (UMVE), or any other modes using affine prediction.

b. In one example, the coding tool may be affine prediction c. In one example, the coding tool may be interweaved prediction.

d. In one example, it is required that the coding tool cannot be applied in the block in a conformance bit-stream if the condition is not satisfied.

i. Alternatively, when the condition is not satisfied, another coding tool may be used to replace the coding tool.

(i) In one example, the above method is only applied when the current block is coded with affine merge mode.

e. In one example, the coding tool is turned off in the block at the encoder as well as at the decoder if the condition is not satisfied.

i. In one example, a syntax element to indicate whether the coding tool is applied or not in the block is not signaled if the condition is not satisfied.

(i) The coding tool is inferred to be turned off when the syntax element is not signaled.

f. In one example, the coding tool is affine prediction, and normal (non-affine) prediction is applied when the condition is not satisfied.

i. In one example, one or multiple of the CPMVs may be used as the motion vectors of current block without affine motion model applied.

g. In one example, the coding tool is interweaved prediction, and normal affine prediction (without interweaved prediction) is applied if the condition is not satisfied.

i. In one example, the prediction samples of the second dividing patterns in interweaved prediction is set equal to the prediction samples of the first dividing patterns at the corresponding positions when the condition is not stratified.

h. In one example, a bounding rectangle (or namely bounding box) is a rectangular which is derived based on the information. The condition is determined depending on the bounding rectangle. A bounding box or a bounding rectangle may, for example, represent a smallest rectangle or a box of samples that includes entirety of the current block and/or a prediction block of the current block. Alternatively, a bounding box or a bounding rectangle may be any rectangle or square of samples that includes entirety of the current block and/or a prediction block of the current block.

i. For example, the condition is true if the size of the bounding box (denoted as S) is smaller (or no larger) than a threshold (denoted as T) and the condition is false if S is no smaller (or larger) than T.

ii. For example, the condition is false if the size of the bounding box (denoted as S) is smaller (or no larger) than a threshold (denoted as T) and the condition is true if S is no smaller (or larger) than T.

iii. For example, the condition is true if f(S) is smaller (or no larger) than T and the condition is false if S is no smaller (or larger) than T, where f(S) is a function of S.

iv. For example, the condition is false if f(S) is smaller (or no larger) than T and the condition is true if S is no smaller (or larger) than T, where f(S) is a function of S.

v. In one example, T depends on whether the block is bi-predicted or uni-predicted.

vi. In one example, f(S)=(S<<p)>>(Lw+Lh), e.g. p=7, Lw=log 2(W) and Lh=log 2(H).

(i) Alternatively, f(S)=(S*p)/(W*H), e.g. p=128.

(ii) Alternatively, f(S)=S*p, e.g. p=16*4, or p=4*4, or p=8*8.

vii. In one example, T is equal to T'.

viii. In one example, T is equal to k*T', e.g. k=2.

ix. In one example, T is equal to T' when the block is bi-predicted and T is equal to 2*T' when the block is uni-predicted.

x. In one example, T'=((Pw+offsetW)*(Ph+offsetH)<<p)>>(Log 2(Pw)+Log 2(Ph)), e.g. p=7.

(i) Alternatively, T=((Pw+offsetW)*(Ph+offsetH)*p)/(Pw*Ph), e.g. p=128.

(ii) Alternatively, T=(Pw+offsetW)*(Ph+offsetH)*W*H.

(iii) e.g., Pw=16, Ph=4, offsetW=offsetH=7.

(iv) e.g., Pw=4, Ph=16, offsetW=offsetH=7.

(v) e.g., Pw=4, Ph=4, offsetW=offsetH=7.

(vi) e.g., Pw=8, Ph=8, offsetW=offsetH=7.

xi. The left boundary of the bounding rectangle, denoted by BL may be derived as $$BL = \min\{x^0 + MV_x^0, x^1 + MV_x^1, \ldots, x^{N1-1} + MV_x^{N1-1}\} + offsetBL,$$

wherein $x^k$ (k=0, 1, . . . N1−1) is a horizontal coordinate of the top-left corner of a sub-block (denoted as sub-block k), $MV^k_x$ is a horizontal component of the MV of sub-block k, offsetBL is an offset, e.g. offsetBL=0.

xii. The right boundary of the bounding rectangle, denoted by BR may be derived as $$BR = \max\{x^0 + MV_x^0, x^1 + MV_x^1, \ldots, x^{N2-1} + MV_x^{N2-1}\} + offsetBR,$$

wherein $x^k$ (k=0, 1, . . . N2−1) is a horizontal coordinate of the bottom-right corner of a sub-block (denoted as sub-block k), $MV^k_x$ is a horizontal component of the MV of sub-block k, offsetBR is an offset, e.g. offsetBR=0.

xiii. The top boundary of the bounding rectangle, denoted by BT may be derived as $$BT = \min\{y^0 + MV_y^0, y^1 + MV_y^1, \ldots, y^{N3-1} + MV_y^{N3-1}\} + offsetBT,$$

wherein $y^k$ (k=0, 1, . . . N3−1) is a vertical coordinate of the top-left corner of a sub-block (denoted as sub-block k), $MV^k_y$ is a vertical component of the MV of sub-block k, offsetBT is an offset, e.g. offsetBT=0.

xiv. The bottom boundary of the bounding rectangle, denoted by BB may be derived as $$BB = \max\{y^0 + MV_y^0, y^1 + MV_y^1, \ldots, y^{N4-1} + MV_y^{N4-1}\} + offsetBB,$$

wherein $x^k$ (k=0, 1, . . . N4−1) is a vertical coordinate of the bottom-right corner of a sub-block (denoted as sub-block k), $MV^k_y$ is a horizontal component of the MV of sub-block k, offsetBB is an offset, e.g. offsetBB=0.

xv. The size of bounding box is derived as (BR−BL+IntW)*(BB−BT+IntH), e.g., IntW=IntH=7.

xvi. The sub-block used to derive the bounding box may be split from the block in any pattern specified by interleaved prediction.

xvii. The N1 sub-blocks used to derive BL may comprise the four corner subblocks, which are divided from the block using the original dividing pattern of affine.

xviii. The N2 sub-blocks used to derive BR may comprise the four corner subblocks, which are divided from the block using the original dividing pattern of affine.

xix. The N3 sub-blocks used to derive BT may comprise the four corner subblocks, which are divided from the block using the original dividing pattern of affine.

xx. The N4 sub-blocks used to derive BB may comprise the four corner subblocks, which are divided from the block using the original dividing pattern of affine.

xxi. The N1 sub-blocks used to derive BL may comprise the four corner subblocks, which are divided from the block using the second dividing pattern defined by interweaved prediction.

xxii. The N2 sub-blocks used to derive BR may comprise the four corner subblocks, which are divided from the block using the second dividing pattern defined by interweaved prediction.

xxiii. The N3 sub-blocks used to derive BT may comprise the four corner subblocks, which are divided from the block using the second dividing pattern defined by interweaved prediction.

xxiv. The N4 sub-blocks used to derive BB may comprise the four corner subblocks, which are divided from the block using the second dividing pattern defined by interweaved prediction.

xxv. At least one of the BL, BR, BT, BB may be further clipped.

(i) BL and BR are clipped into the range of [startX, endX], wherein startX and endX may be defined as the X-coordinator of the top-left sample and top-right sample within the picture/tile/slice/brick containing current block.

a. In one example, startX is 0, and endX is (picW−1) wherein picW denotes the picture width in luma samples.

(ii) BT and BB are clipped into the range of [startY, endY], wherein Y may be defined as the X-coordinator of the top-left sample and top-right sample within the picture/tile/slice/brick containing current block.

a. In one example, startY is 0, and endY is (picH−1) wherein picH denotes the picture height in luma samples.

xxvi. The MV of a sub-block may be rounded or clipped to an integer precision before it is used to derive BL and/or BR and/or BT and/or BB.

(i) For example, $MV^k_x$ is recalculated as ($MV^k_x$+offset)>>p before it is used to derive BL and/or BR and/or BT and/or BB.

(ii) For example, $MV^k_y$ is recalculated as ($MV^k_y$+offset)>>p before it is used to derive BL and/or BR and/or BT and/or BB.

(iii) For example, offset=0, p=4.

i. In one example, the condition is determined depending on $MV_x$s and $MV_y$s of subblocks.

i. In one example, the condition is true if the MVx of one subblock in first dividing pattern minus $MV_x$s is larger (or no smaller) than a threshold (denoted as T)

ii. In one example, the condition is true if $MV_x$s minus the MVx of one subblock in first dividing pattern is larger (or no smaller) than a threshold (denoted as T)

iii. In one example, the condition is true if the MVy of one subblock in first dividing pattern minus $MV_y$s is larger (or no smaller) than a threshold (denoted as T)

iv. In one example, the condition is true if $MV_y$s minus the MVy of one subblock in first dividing pattern is larger (or no smaller) than a threshold (denoted as T)

4. Whether to and/or how to apply motion compensation on a sub-block at subblock index (xSbIdx, ySbIdx) may depend on the affine mode indication, the color component and color format. In the following examples, MotionModelIdc[xCb][yCb] is equal to 0 when the current block is not encoded with the affine mode and MotionModelIdc[xCb][yCb] is larger than 0 when the current block is encoded with the affine mode. SubWidthC and SubHeightC are defined depending on the color format. For example, SubWidthC and SubHeightC are defined in JVET-R2001 as below:

| sps_chroma_format_idc | sps_separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

a. Whether to apply motion compensation on a sub-block at subblock index (xSbIdx, ySbIdx) individually may depend on the affine mode indication, the color component and color format.
   i. For example, when the color component is not luma (color component ID is not equal to 0 in JVET-R2001), if the current block is not encoded with affine mode (MotionModelIdc[xCb][yCb] is equal to 0 in JVET-R2001), or the xSbIdx % SubWidthC and ySbIdx % SubHeightC are both equal to 0, the motion compensation on a sub-block at subblock index (xSbIdx, ySbIdx) is applied individually.
b. The width and/or height (denoted as cW and/or cH) of a chroma sub-block to do motion compensation at subblock index (xSbIdx, ySbIdx) may depend on the affine mode indication and color format.
   i. For example, cW=MotionModelIdc[xCb][yCb] ? sbWidth: sbWidth/SubWidthC, wherein sbWidth is the width of a luma sub-block. For example, sbWidth is equal to 4.
   ii. For example, cH=MotionModelIdc[xCb][yCb] ? sbHeight: sbHeight/SubHeightC, wherein sbHeight is the height of a luma sub-block. For example, sbHeight is equal to 4.

5. Whether to and/or how to apply weighted prediction on a sub-block at subblock index (xSbIdx, ySbIdx) may depend on the affine mode indication, the color component and color format. In the following examples, MotionModelIdc[xCb][yCb] is equal to 0 when the current block is not encoded with the affine mode and MotionModelIdc[xCb][yCb] is larger than 0 when the current block is encoded with the affine mode. SubWidthC and SubHeightC are defined depending on the color format. For example, SubWidthC and SubHeightC are defined in JVET-R2001 as below:

| sps_chroma_format_idc | sps_separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

a. Whether to apply weighted prediction on a sub-block at subblock index (xSbIdx, ySbIdx) individually may depend on the affine mode indication, the color component and color format.
   i. For example, when the color component is not luma (color component ID is not equal to 0 in JVET-R2001), if the current block is not encoded with affine mode (MotionModelIdc[xCb][yCb] is equal to 0 in JVET-R2001), or the xSbIdx % SubWidthC and ySbIdx % SubHeightC are both equal to 0, the weighted prediction on a sub-block at subblock index (xSbIdx, ySbIdx) is applied individually.
b. The width and/or height (denoted as cW and/or cH) of a chroma sub-block to do weighted prediction at subblock index (xSbIdx, ySbIdx) may depend on the affine mode indication and color format.
   i. For example, cW=MotionModelIdc[xCb][yCb] ? sbWidth: sbWidth/SubWidthC, wherein sbWidth is the width of a luma sub-block. For example, sbWidth is equal to 4.
   ii. For example, cH=MotionModelIdc[xCb][yCb] ? sbHeight: sbHeight/SubHeightC, wherein sbHeight is the height of a luma sub-block. For example, sbHeight is equal to 4.

6. The derivation of MotionModelIdc[x][y] may depend on or conditioned on inter_affine_flag[x0][y0] and/or sps_6param_affine_enabled_flag.
   a. In one example, MotionModelIdc[x][y] is set equal to 0 when inter_affine_flag[x0][y0] is equal to 0.
   b. In one example, MotionModelIdc[x][y] is set equal to 0 when sps_6param_affine_enabled_flag is equal to 0.
   c. For example, MotionModelIdc[x][y]=inter_affine_flag[x0][y0]? (1+(sps_6param_affine_enabled_flag ? cu_affine_type_flag[x0][y0]: 0): 0

6. It is proposed that whether to apply interweaved prediction may depend on the relationship between the MV(denoted as SBMV1) of a sub-block (denoted as SB1) of pattern 1 and a MV (denoted as SBMV0) of a sub-block (denoted as SB0) of pattern 0. In the following discussion, suppose the affine model is defined as mvx = Clip3(−131072, 131071, Rounding((mv0_x << 7) + dHorX*xPos + dHorY*yPos, 7))

-continued mvy = Clip3(−131072, 131071, Rounding((mv0_y << 7) + dVerX*xPos + dVerY*yPos, 7))

to derive a MV at (xPos, yPos).

a. Given a SB1, SB0 may be selected from one subblock in pattern 0 which is overlapped with SB1.
   i. The selection may depend on affine parameters.
   ii. For example, the center of SB0 is above the center of SB1 if condition A is satisfied. the center of SB0 is below the center of SB1 if condition B is satisfied
      (i) For example, condition A is SB1 is at the last row.
      (ii) For example, condition B is SB1 is at the first row.
      (iii) For example, condition B is (mv0_y>0 and mv1_y>0) or (mv0_y>0 and mv1_y<0 and |mv0_y|>|mv1_y|) or (mv0_y<0 and mv1_y>0 and |mv0_y|<|mv1_y|).
      (iv) For example, condition A is satisfied when condition B is not satisfied.
   wherein $$mv0\_y = dVerX + dVerY$$
$$mv1\_y = dVerX - dVerY$$

iii. For example, the center of SB0 is left to the center of SB1 if condition C is satisfied. the center of SB0 is right to the center of SB1 if condition D is satisfied
      (i) For example, condition C is SB1 is at the rightmost row.
      (ii) For example, condition D is SB1 is at the leftmost row.
      (iii) For example, condition D is (mv0_x>0 and mv1_x>0) or (mv0_x>0 and mv1_x<0 and |mv0_x|>|mv1_x|) or (mv0_x<0 and mv1_x>0 and |mv0_x|<|mv1_x|)
      (iv) For example, condition C is satisfied when condition D is not satisfied.

wherein

Figure 41:
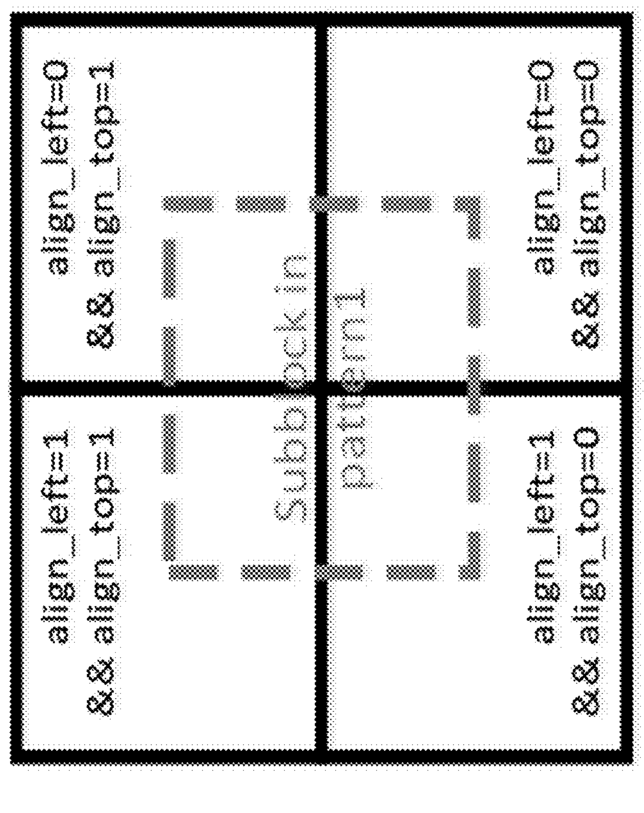
FIG. 41 shows an example of subblock zero (SB0) (black solid blocks) selection for subblock one (SB1)(green dashed block).

If the center of SB0 is above the center of SB1

$$mv0\_x = dHorX + dHorY$$
$$mv1\_x = -dHorX + dHorY$$

otherwise $$mv0\_x = dHorX - dHorY$$
$$mv1\_x = -dHorX - dHorY$$

b. align_left is equal to 1 if the center of SB0 is left to the center of SB1; Otherwise, it is equal to 0. align_top is equal to 1 if the center of SB0 is above the center of SB1; Otherwise, it is equal to 0. Then the selection of SB0 is based on align_left and align_top as shown in FIG. 41.

c. Interweaved prediction is disabled if the relationship of MVs in SB0 and SB1 satisfies condition E.
   i. Condition E may depend on align_left and/or align_top.
   ii. If align_left is equal to 1, condition E is satisfied if (SBMV1x>>N)−(SBMV0x>>N)>HMargin1.
   iii. If align_left is equal to 1, condition E is satisfied if (SBMVx>>N)−(SBMV1x>>N)>HMargin2.
   iv. If align_left is equal to 0, condition E is satisfied if (SBMVx>>N)−(SBMV1x>>N)>HMargin3.
   v. If align_left is equal to 0, condition E is satisfied if (SBMV1x>>N)−(SBMV0x>>N)>HMargin4.
   vi. If align_top is equal to 1, condition E is satisfied if (SBMV1y>>N)−(SBMV0y>>N)>VMargin1.
   vii. If align_top is equal to 1, condition E is satisfied if (SBMV0y>>N)−(SBMV1y>>N)>VMargin2.
   viii. If align_top is equal to 0, condition E is satisfied if (SBMVx>>N)−(SBMV1y>>N)>VMargin3.
   ix. If align_top is equal to 0, condition E is satisfied if (SBMV1y>>N)−(SBMV0y>>N)>VMargin4.
   x. N represents the MV precision, e.g. N=2 or 4.
   xi. HMargin1~HMargin4 and VMargin1~VMargin4 are integers, they may depend on coding information, such as block sizes or whether the block is bi-predicted or uni-predicted.
      (i) If the block is bi-predicted, HMargin1=HMargion3=6, HMargin2=HMargion4=8+6.
      (ii) If the block is uni-predicted, HMargin1=HMargion3=4, HMargin2=HMargion4=8+4.
      (iii) If the block is bi-predicted, VMargin1=VMargion3=4, HMargin2=HMargion4=8+4.
      (iv) If the block is uni-predicted, HMargin1=HMargion3=1, HMargin2=HMargion4=8+1.
      (v) If the block size is 8×8, HMargin1=HMargion3=6, HMargin2=HMargion4=8+6.
      (vi) If the block size is 4×4, HMargin1=HMargion3=4, HMargin2=HMargion4=8+4.
      (vii) If the block size is 8×8, VMargin1=VMargion3=4, HMargin2=HMargion4=8+4.
      (viii) If the block size is 4×4, HMargin1=HMargion3=1, HMargin2=HMargion4=8+1.

5. Embodiments

In this patent application, deletion of text is indicated by open and close double brackets (e.g.,) with deleted text in between the open and close double brackets; and newly added text is indicated by bold italicized text.

5.1. Embodiment 1: Bandwidth Restriction by Disabling Interweaved Affine

Figure 31:
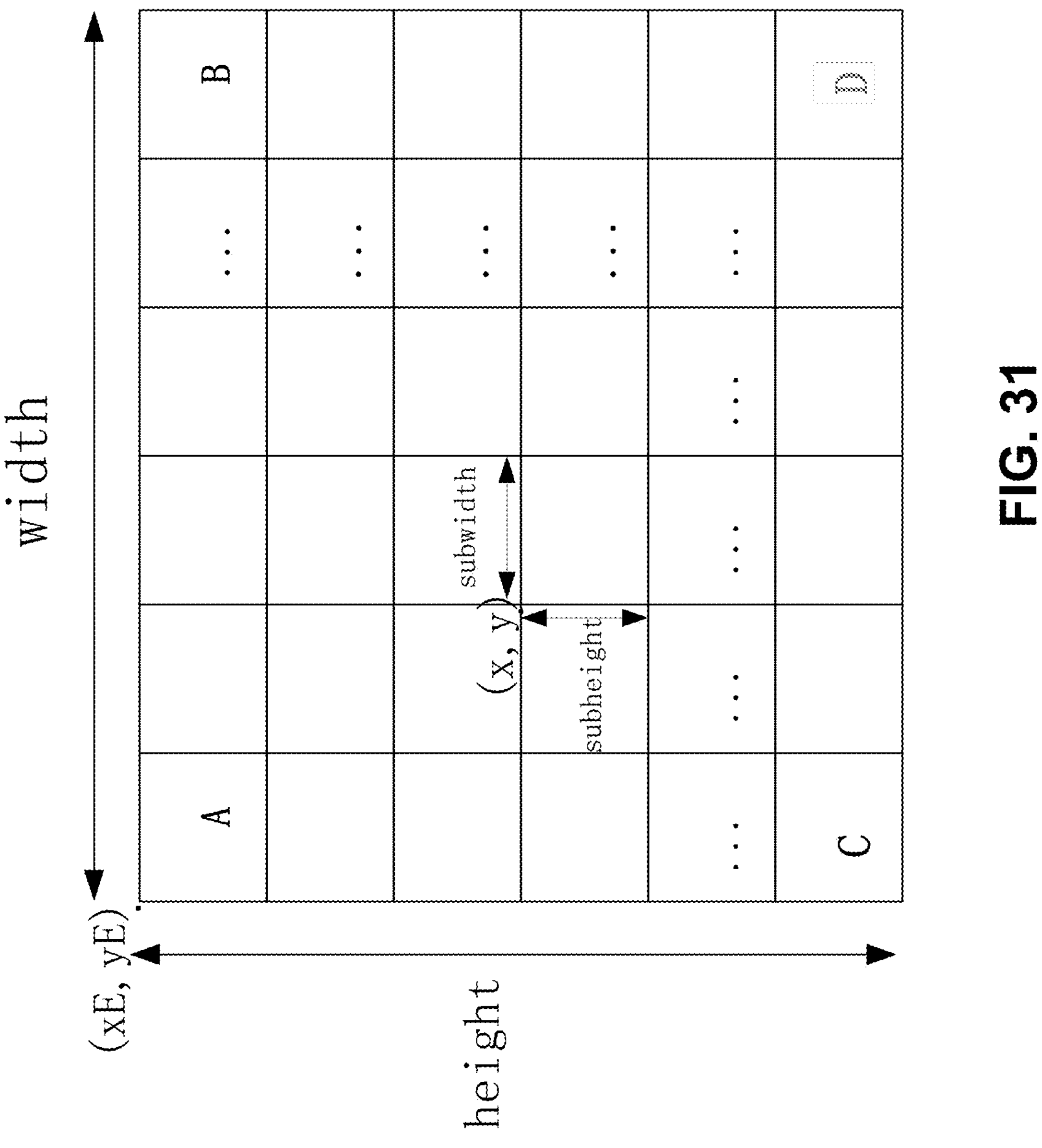
FIG. 31 shows an example dividing pattern.
Figure 32:
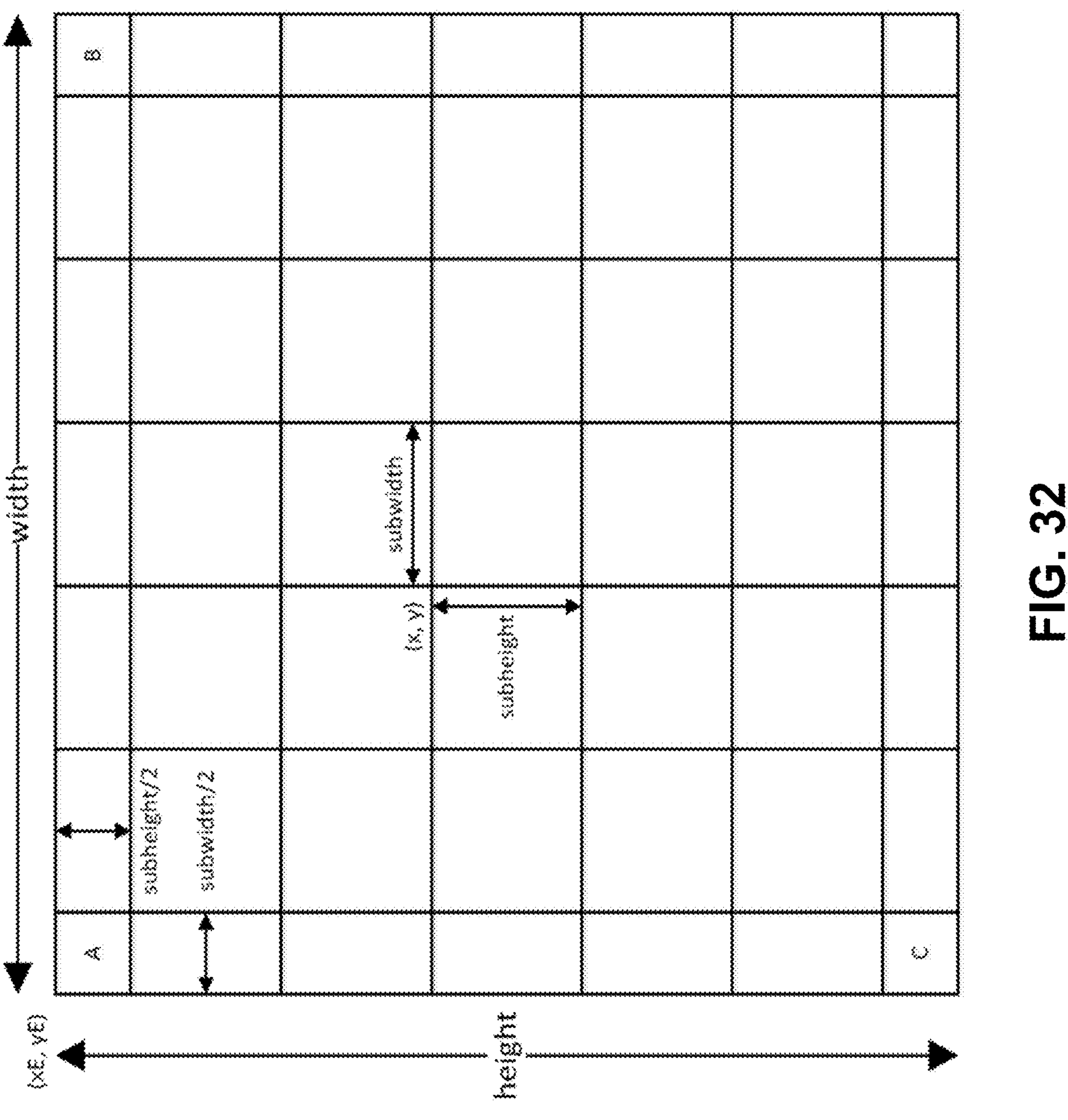
FIG. 32 shows an example dividing pattern.

Two dividing patterns in interweaved prediction are shown FIG. 31 and FIG. 32. Suppose mvA0, mvB0, mvC0 and mvD0 represent the motion vectors for the sub-blocks A, B, C and D in dividing pattern 0; mvA1, mvB1, mvC1 and mvD1 represent the motion vectors for the sub-blocks A, B, C and D in dividing pattern 1. Suppose the width and height of each sub-block in dividing pattern 0 are subwidth and subheight. Unified Prefetched Integer Sample Number (UPISN) is derived as below:

1)

$$cornerWidth0 = subwidth$$
$$cornerHeight0 = subheight$$

2)

$$cornerWidth1 = subwidth>>1$$
$$cornerHeight1 = subheight>>1$$

3)

posMax_x= Max(Max(Max(mvA0_x>>4, (mvB0_x>>4) + width − cornerWidth0), Max(mvC0_x>>4, (mvD0_x>>4) + width − cornerWidth0)) + cornerWidth0, Max(Max(mvA1_x>>4, (mvB1_x>>4) + width − cornerWidth1), Max(mvC1_x>>4, (mvD1_x>>4) + width − cornerWidth1)) + cornerWidth1)
posMin_x = Min(Min(Min(mvA0_x>>4, (mvB0_x>>4) + width − cornerWidth0), Min(mvC0_x>>4, (mvD0_x>>4) + width − cornerWidth0)), Min(Min(mvA1_x>>4, (mvB1_x>>4) + width − cornerWidth1), Min(mvC1_x>>4, (mvD1_x>>4) + width − cornerWidth1))
posMax_y = Max(Max(Max(mvA0_y>>4, (mvB0_y>>4) + height − cornerHeight0), Max(mvC0_y>>4, (mvD0_y>>4) + height − cornerHeight0)) + cornerHeight0, Max(Max(mvAl_y>>4, (mvB1_y>>4) + height − cornerHeight1), Max(mvC1_y>>4, (mvD1_y>>4) + height − cornerHeight1)) + cornerHeight1)
posMin_y = Min(Min(Min(mvA0_y>>4, (mvB0_y>>4) + height − cornerHeight0), Min(mvC0_y>>4, (mvD0_y>>4) + height − cornerHeight0)), Min(Min(mvA1_y>>4, (mvB1_y>>4) + height − cornerHeight1), Min(mvC1_y>>4, (mvD1_y>>4) + height − cornerHeight1))
bandwidth_hor = Clip3(0, PictureWidthInMinBu * MiniSize − 1, xE + posMax_x) − Clip3(0, Picture WidthInMinBu * MiniSize − 1, xE + posMin_x)
bandwidth_ver = Clip3(0, PictureHeightInMinBu * MiniSize −1, yE + posMax_y) − Clip3(0, PictureHeightInMinBu * MiniSize −1, yE + posMin_y)
sampNum = (bandwidth_hor * bandwidth_ver) << (14 − log2(width) − log2(height))

For uni-prediction with interweaved prediction, prediction samples of dividing pattern 1 are set equal to prediction samples of dividing pattern 0 if sampNum is larger than 129536.

For bi-prediction with interweaved prediction, sampNum0 is derived for MVs of List 0, prediction samples of dividing pattern 1 for List 0 are set equal to prediction samples of dividing pattern 0 if sampNum0 is larger than 64768.

sampNum1 is derived for MVs of List 1, prediction samples of dividing pattern 1 for List 1 are set equal to prediction samples of dividing pattern 0 if sampNum1 is larger than 64768.

5.2. Embodiment 2: Bandwidth Restriction by Disabling Affine sampNum, sampNum0, sampNum1 are derived in the same way as embodiment 1.

It is required that in a conformance bitstream,

For uni-prediction with interweaved prediction, sampNum shall be smaller than or equal to 129536.

For bi-prediction with interweaved prediction, sampNum0 and sampNum1 shall be smaller than or equal to 64768.

5.3. Embodiment 3: Motion Compensation for Chroma Components in Affine Mode

The changes are based on JVET-R2001-v10

8.5.6 Decoding Process for Inter Blocks 8.5.6.1 General

For each coding subblock at subblock index (xSbIdx, ySbIdx) with xSbIdx=0 . . . numSbX−1, and ySbIdx=0 . . . numSbY−1, the following applies:

The luma location (xSb, ySb) specifying the top-left sample of the current coding subblock relative to the top-left luma sample of the current picture is derived as follows:

$$(xSb, ySb) = (xCb + xSbIdx^{*} sbWidth, yCb + ySbIdx^{*} sbHeight) \quad (923)$$

For X being each of 0 and 1, when predFlagLX[xSbIdx][ySbIdx] is equal to 1, the following applies:

The reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.6.2 with X and refIdxLX as inputs.

The motion vector offset mvOffset is set equal to refMvLX[xSbIdx][xSbIdx]−mvLX[xSbIdx][ySbIdx].

If cIdx is equal to 0, the following applies:

The array predSamplesLX$_L$ is derived by invoking the fractional sample interpolation process specified in clause 8.5.6.3 with the luma location (xSb, ySb), the coding subblock width sbWidth, the coding subblock height sbHeight in luma samples, the luma motion vector offset mvOffset, the refined luma motion vector refMvLX[xSbIdx][xSbIdx], the reference array refPicLX$_L$, bdofFlag, dmvrFlag, hpelIfIdx, cIdx, RprConstraintsActive[X][refIdxLX], and RefPicScale[X][refIdxLX] as inputs.

When cbProfFlagLX is equal to 1, the prediction refinement with optical flow process specified in clause 8.5.6.4 is invoked with sbWidth, sbHeight, the (sbWidth+2)×(sbHeight+2) array predSamplesLX$_L$ and the motion vector difference array diffMvLX[xIdx][yIdx] with xIdx=0 . . . cbWidth/numSbX−1, and yIdx=0 . . . cbHeight/numSbY−1 as inputs and the refined (sbWidth)×(sbHeight) array predSamplesLX$_L$ as output.

*Otherwise, if MotionModelIdc [ xCb ][ yCb ] is equal to 0, or the xSbIdx % SubWidthC and ySbIdx % SubHeightC are both equal to 0, the following applies:*

*If* cIdx is equal to 1, the following applies:

The array predSamplesLX$_{Cb}$ is derived by invoking the fractional sample interpolation process specified in clause 8.5.6.3 with the luma location (xSb, ySb), the coding subblock width *MotionModelIdc[ xCb ][ yCb ] ?*

*sbWidth :* sbWidth/SubWidthC, the coding subblock height *MotionModelIdc[ xCb ][ yCb ] ? sbHeight :* sbHeight/SubHeightC, the chroma motion vector offset mvOffset, the refined chroma motion vector refMvLX[xSbIdx][ySbIdx], the reference array refPicLX$_{Cb}$, bdofFlag, dmvrFlag, hpelIfIdx, cIdx, RprConstraintsActive[X][refIdxLX], and RefPicScale[X][refIdxLX] as inputs.

Otherwise (cIdx is equal to 2), the following applies:

The array predSamplesLX$_{Cr}$ is derived by invoking the fractional sample interpolation process specified in clause 8.5.6.3 with the luma location (xSb, ySb), the coding subblock width *MotionModelIdc[ xCb ][ yCb ] ? sbWidth :* sbWidth/SubWidthC, the coding subblock height *MotionModelIdc[ xCb ][ yCb ] ? sbHeight :* sbHeight/SubHeightC, the chroma motion vector offset mvOffset, the refined chroma motion vector refMvLX[xSbIdx][xSbIdx], the reference array refPicLX$_{Cr}$, bdofFlag, dmvrFlag, hpelIfIdx, cIdx, RprConstraintsActive [X][refIdxLX], and RefPicScale[X][refIdxLX] as inputs.

[text of standard continued]

5.4. Embodiment 4: Motion Compensation for Chroma Components in Affine Mode 8.5.6 Decoding Process for Inter Blocks 8.5.6.1 General This process is invoked when decoding a coding unit coded in inter prediction mode.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mvL0[xSbIdx][ySbIdx] and mvL1 [xSbIdx][ySbIdx] with xSbIdx=0 . . . numSbX−1, and ySbIdx=0 . . . numSbY−1, the refined motion vectors refMvL0[xSbIdx][ySbIdx] and refMvL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx] [ySbIdx] and predFlagL1[xSbIdx][ySbIdx] with xSbIdx=0 . . . numSbX−1, and ySbIdx=0 . . . numSbY−1, the half sample interpolation filter index hpelIfIdx, the bi-prediction weight index bcwIdx, the minimum sum of absolute difference values in decoder-side motion vector refinement process dmvrSad[xSbIdx][ySbIdx] with xSbIdx=0 . . . numSbX−1, and ySbIdx=0 . . . numSbY−1, the decoder-side motion vector refinement flag dmvrFlag, a variable cIdx specifying the colour component index of the current block, the prediction refinement utilization flag cbProfFlagL0 and cbProfFlagL1, a motion vector difference array diffMvL0[xIdx][yIdx] and diffMvL1[xIdx][yIdx] with xIdx=0 . . . cbWidth/numSbX−1, and yIdx=0 . . . cbHeight/numSbY−1.

Outputs of this Process are:

an array predSamples of prediction samples.

Let predSamplesL0$_L$, predSamplesL1$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$ and predSamplesL1$_{Cr}$, predSamplesIntra$_{Cb}$, and predSamplesIntra$_{Cr}$ be (cbWidth/SubWidthC)×(cbHeight/SubHeightC) arrays of predicted chroma sample values.

The variable currPic specifies the current picture and the variable bdofFlag is derived as follows:

If all of the following conditions are true, bdofFlag is set equal to TRUE.

ph_bdof_disabled_flag is equal to 0.

predFlagL0[xSbIdx][ySbIdx] and predFlagL1[xSbIdx][ySbIdx] are both equal to 1.

DiffPicOrderCnt(currPic, RefPicList[0][refIdxL0]) is equal to DiffPicOrderCnt(RefPicList[1][refIdxL1], currPic).

RefPicList[0][refIdxL0] is an short term reference picture (STRP) and RefPicList[1][refIdxL1] is an STRP.

MotionModelIdc[xCb][yCb] is equal to 0.

merge_subblock_flag[xCb][yCb] is equal to 0.

sym_mvd_flag[xCb][yCb] is equal to 0.

ciip_flag[xCb][yCb] is equal to 0.

BcwIdx[xCb][yCb] is equal to 0.

luma_weight_l0_flag[refIdxL0] and luma_weight_l1_flag[refIdxL1] are both equal to 0.

chroma_weight_l0_flag[refIdxL0] and chroma_weight_l1_flag[refIdxL1] are both equal to 0.

cbWidth is greater than or equal to 8.

cbHeight is greater than or equal to 8.

cbHeight*cbWidth is greater than or equal to 128.

RprConstraintsActive[0][refIdxL0] is equal to 0 and RprConstraintsActive[1][refIdxL1] is equal to 0.

cIdx is equal to 0.

Otherwise, bdofFlag is set equal to FALSE.

If numSbY is equal to 1 and numSbX is equal to 1 the following applies:

When bdofFlag is equal to TRUE, the variables numSbY, numSbX are modified as follows:

$$numSbX = (cbWidth > 16)?(cbWidth \gg 4):1 \quad (919)$$

$$numSbY = (cbHeight > 16)?(cbHeight \gg 4):1 \quad (920)$$

For X=0 . . . 1, xSbIdx=0 . . . numSbX−1 and ySbIdx=0 . . . numSbY−1, the following applies:

predFlagLX[xSbIdx][ySbIdx] is set equal to predFlagLX[0][0].

refMvLX[xSbIdx][ySbIdx] is set equal to refMvLX[0][0].

mvLX[xSbIdx][ySbIdx] is set equal to mvLX[0][0].

The width and the height of the current coding sublock sbWidth, sbHeight in luma samples are derived as follows:

$$sbWidth = cbWidth/numSbX \quad (921)$$

$$sbHeight = cbHeight/numSbY \quad (922)$$

For each coding subblock at subblock index (xSbIdx, ySbIdx) with xSbIdx=0 . . . numSbX−1, and ySbIdx=0 . . . numSbY−1, the following applies:

The luma location (xSb, ySb) specifying the top-left sample of the current coding subblock relative to the top-left luma sample of the current picture is derived as follows:

$$(xSb, ySb) = (xCb + xSbIdx * sbWidth, yCb + ySbIdx * sbHeight) \quad (923)$$

For X being each of 0 and 1, when predFlagLX[xSbIdx][ySbIdx] is equal to 1, the following applies:

The reference picture consisting of an ordered two-dimensional array $refPicLX_L$ of luma samples and two ordered two-dimensional arrays $refPicLX_{Cb}$ and $refPicLX_{Cr}$ of chroma samples is derived by invoking the process specified in clause 8.5.6.2 with X and refIdxLX as inputs.

The motion vector offset mvOffset is set equal to refMvLX[xSbIdx][xSbIdx]−mvLX[xSbIdx][ySbIdx].

If cIdx is equal to 0, the following applies:

The array $predSamplesLX_L$ is derived by invoking the fractional sample interpolation process specified in clause 8.5.6.3 with the luma location (xSb, ySb), the coding subblock width sbWidth, the coding subblock height sbHeight in luma samples, the luma motion vector offset mvOffset, the refined luma motion vector refMvLX[xSbIdx][xSbIdx], the reference array $refPicLX_L$, bdofFlag, dmvrFlag, hpelIfIdx, cIdx, RprConstraintsActive[X][refIdxLX], and RefPicScale[X][refIdxLX] as inputs.

When cbProfFlagLX is equal to 1, the prediction refinement with optical flow process specified in clause 8.5.6.4 is invoked with sbWidth, sbHeight, the (sbWidth+2)×(sbHeight+2) array $predSamplesLX_L$ and the motion vector difference array diffMvLX[xIdx][yIdx] with xIdx=0 . . . cbWidth/numSbX−1, and yIdx=0 . . . cbHeight/numSbY−1 as inputs and the refined (sbWidth)×(sbHeight) array $predSamplesLX_L$ as output.

*Otherwise, if MotionModelIdc [ xCb ][ yCb ] is equal to 0, or xSbIdx % SubWidthC and ySbIdx % SubHeightC are both equal to 0, the following applies:*

If cIdx is equal to 1, the following applies:

The array $predSamplesLX_{Cb}$ is derived by invoking the fractional sample interpolation process specified in clause 8.5.6.3 with the luma location (xSb, ySb), the coding subblock width *MotionModelIdc[ xCb ][ yCb ] ? sbWidth :* sbWidth/SubWidthC, the coding subblock height *MotionModelIdc[ xCb ][ yCb ] ? sbHeight :* sbHeight/SubHeightC, the chroma motion vector offset mvOffset, the refined chroma motion vector refMvLX[xSbIdx][ySbIdx], the reference array $refPicLX_{Cb}$, bdofFlag, dmvrFlag, hpelIfIdx, cIdx, RprConstraintsActive[X][refIdxLX], and RefPicScale[X][refIdxLX] as inputs.

Otherwise (cIdx is equal to 2), the following applies:

The array $predSamplesLX_{Cr}$ is derived by invoking the fractional sample interpolation process specified in clause 8.5.6.3 with the luma location (xSb, ySb), the coding subblock width *MotionModelIdc[ xCb ][ yCb ] ? sbWidth :* sbWidth/SubWidthC, the coding subblock height *MotionModelIdc[ xCb ][ yCb ] ? sbHeight :* sbHeight: sbHeight/SubHeightC, the chroma motion vector offset mvOffset, the refined chroma motion vector refMvLX[xSbIdx][xSbIdx], the reference array $refPicLX_{Cr}$, bdofFlag, dmvrFlag, hpelIfIdx, cIdx, RprConstraintsActive[X][refIdxLX], and RefPicScale[X][refIdxLX] as inputs.

The variable sbBdofFlag is set equal to FALSE.

When bdofFlag is equal to TRUE, the variable sbBdofFlag is further modified as follows:

If dmvrFlag is equal to 1 and the variable dmvrSad[xSbIdx][ySbIdx] is less than (2*sbWidth*sbHeight), the variable sbBdofFlag is set equal to FALSE.

Otherwise, the variable sbBdofFlag is set equal to TRUE.

The array predSamples of prediction samples is derived as follows:

If cIdx is equal to 0, the prediction samples inside the current luma coding subblock, predSamples[$x_L$+xSb][$y_L$+ySb] with $x_L$=0 . . . sbWidth−1 and $y_L$=0 . . . sbHeight−1, are derived as follows:

If sbBdofFlag is equal to TRUE, the bi-directional optical flow sample prediction process as specified in clause 8.5.6.5 is invoked with nCbW set equal to the luma coding subblock width sbWidth, nCbH set equal to the luma coding subblock height sbHeight and the sample arrays $predSamplesL0_L$ and $predSamplesL1_L$, and the variables predFlagL0[xSbIdx][ySbIdx], predFlagL1[xSbIdx][ySbIdx], refIdxL0, and refIdxL1 as inputs, and predSamples[$x_L$+xSb][$y_L$+ySb] as outputs.

Otherwise (sbBdofFlag is equal to FALSE), the weighted sample prediction process as specified in clause 8.5.6.6 is invoked with the luma coding subblock width sbWidth, the luma coding subblock height sbHeight and the sample arrays $predSamplesL0_L$ and $predSamplesL1_L$, and the variables predFlagL0[xSbIdx][ySbIdx], predFlagL1[xSbIdx][ySbIdx], refIdxL0, refIdxL1, bcwIdx, dmvrFlag, and cIdx as inputs, and predSamples[$x_L$+xSb][$y_L$+ySb] as outputs.

*Otherwise, if MotionModelIde [xCb][yCb] is equal to 0, or xSbIdx%SubWidthC and ySbIdx%SubHeightC are both equal to 0, the following applies:*

If cIdx is equal to 1, the prediction samples inside the current chroma component Cb coding subblock, predSamples[$x_C$+xSb/SubWidthC][$y_C$+ySb/SubHeightC] with $x_C$=0. *(MotionModelIdc[xCb][yCb] ? sbWidth:* sbWidth: sbWidth/SubWidthC)−1 and $y_C$=0. *(MotionModelIdc[xCb][yCb] ? sbHeight:* sbHeight/SubHeightC)−1, are derived by invoking the weighted sample prediction process specified in clause 8.5.6.6 with nCbW set equal to *MotionModelIdc[xCb][yCb] ? sbWidth:* sbWidth/SubWidthC, nCbH set equal to

*MotionModelIdc[xCb][yCb] ? sbHeight :* sbHeight/SubHeightC, the sample arrays predSamplesL0$_{Cb}$ and predSamplesL1$_{Cb}$, and the variables predFlagL0[xSbIdx][ySbIdx], predFlagL1[xSbIdx][ySbIdx], refIdxL0, refIdxL1, bcwIdx, dmvrFlag, and cIdx as inputs.

Otherwise (cIdx is equal to 2), the prediction samples inside the current chroma component Cr coding subblock, predSamples[$x_C$+xSb/SubWidthC][$y_C$+ySb/SubHeightC] with $x_C$=0. *MotionModelIdc[xCb][yCb] ? sbWidth:* sbWidth/SubWidthC)−1 and $y_C$=0. *(MotionModelIdc[xCb][yCb] ? sbHeight:* sbHeight/SubHeightC)−1, are derived by invoking the weighted sample prediction process specified in clause 8.5.6.6 with nCbW set equal to *MotionModelIdc[xCb][yCb] ? sbWidth:* sbWidth/SubWidthC, nCbH set equal to *MotionModelIdc[xCb][yCb] ? sbHeight :* sbHeight/SubHeightC, the sample arrays predSamplesL0$_{Cr}$ and predSamplesL1$_{Cr}$, and the variables predFlagL0[xSbIdx][ySbIdx], predFlagL1[xSbIdx][ySbIdx], refIdxL0, refIdxL1, bcwIdx, dmvrFlag, and cIdx as inputs.

When cIdx is equal to 0, the following assignments are made for x=0 . . . sbWidth−1 and y=0 . . . sbHeight−1:

$$MvL0[xSb+x][ySb+y] = mvL0[xSbIdx][ySbIdx] \tag{924}$$

$$MvL1[xSb+x][ySb+y] = [mvL1[xSbIdx][ySbIdx] \tag{925}$$

$$MvDmvrL0[xSb+x][ySb+y] = refMvL0[xSbIdx][ySbIdx] \tag{926}$$

$$MvDmvrL1[xSb+x][ySb+y] = refMvL1[xSbIdx][ySbIdx] \tag{927}$$

$$RefIdxL0[xSb+x][ySb+y] = refIdxL0 \tag{928}$$

$$RefIdxL1[xSb+x][ySb+y] = refIdxL1 \tag{929}$$

$$PredFlagL0[xSb+x][ySb+y] = predFlagL0[xSbIdx][ySbIdx] \tag{930}$$

$$PredFlagL1[xSb+x][ySb+y] = predFlagL1[xSbIdx][ySbIdx] \tag{931}$$

$$HpelIfIdx[xSb+x][ySb+y] = hpelIfIdx \tag{932}$$

$$BcwIdx[xSb+x][ySb+y] = bcwIdx \tag{933}$$

When ciip_flag[xCb][yCb] is equal to 1, the array predSamples of prediction samples is modified as follows:

If cIdx is equal to 0, the following applies:

The general intra sample prediction process as specified in clause 8.4.5.2.5 is invoked with the location (xTbCmp, yTbCmp) set equal to (xCb, yCb), the intra prediction mode predModeIntra set equal to INTRA_PLANAR, the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntra$_L$.

The weighted sample prediction process for combined merge and intra prediction as specified in clause 8.5.6.7 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntra$_L$, respectively, and the colour component index cIdx as inputs, and the output is assigned to the (cbWidth)×(cbHeight) array predSamples.

Otherwise, if cIdx is equal to 1 and cbWidth/SubWidthC is greater than or equal to 4, the following applies:

The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to INTRA_PLANAR, the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntra$_{Cb}$.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamples$_{Cb}$ and predSamplesIntra$_{Cb}$, respectively, and the colour component index cIdx as inputs, and the output is assigned to the (cbWidth/SubWidthC)×(cbHeight/SubHeightC) array predSamples.

Otherwise, if cIdx is equal to 2 and cbWidth/SubWidthC is greater than or equal to 4, the following applies:

The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to INTRA_PLANAR, the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntra$_{Cr}$.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamples$_{Cr}$ and predSamplesIntra$_{Cr}$, respectively, and the colour component index cIdx as inputs, and the output is assigned to the (cbWidth/SubWidthC)×(cbHeight/SubHeightC) array predSamples.

5.5. Embodiment 5: Derivation of MotionModelIdc cu_affine_type_flag[x0][y0] equal to 1 specifies that for the current coding unit, when decoding a P or B slice, 6-parameter affine model based motion compensation is used to generate the prediction samples of the current coding unit. cu_affine_type_flag[x0][y0] equal to 0 specifies that 4-parameter affine model based motion compensation is used to generate the prediction samples of the current coding unit.

MotionModelIdc[x][y] represents motion model of a coding unit as illustrated in Table 15. The array indices x, y specify the luma sample location (x, y) relative to the top-left luma sample of the picture.

The variable MotionModelIdc[x][y] is derived as follows for x=x0 . . . x0+cbWidth−1 and y=y0 . . . y0+cbHeight−1:

If general_merge_flag[x0][y0] is equal to 1, the following applies:

$$MotionModelIdc[\,x\,][\,y\,] = \text{merge\_subblock\_flag}[\,x0\,][\,y0\,] \quad (165)$$

Otherwise (general_merge_flag[x0][y0] is equal to 0), the following applies:

[[*MotionModelIdc*[*x*][*y*] = inter_affine_flag[*x*0][*y*0] + cu_affine_type_flag[*x*0][*y*0]]]

*MotionModelIdc[ x ][ y ] = inter_affine_flag[ x0 ][ y0 ]? (1 +( sps_6param_affine_enabled_flag ? cu_affine_type_flag[ x0 ][ y0 ]: 0) : 0* (166)

TABLE 15

| Interpretation of MotionModelIdc[x0][y0] | |
|---|---|
| MotionModelIdc[x][y] | Motion model for motion compensation |
| 0 | Translational motion |
| 1 | 4-parameter affine motion |
| 2 | 6-parameter affine motion |

5.6. Embodiment 5: 6-Tap Interpolation Filtering for Interweaved Prediction

The text change is based on audio video coding standard (AVS)-N2865

9.9.2.3 Affine Luminance Sample Interpolation Process

Luminance interpolation filter coefficients of affine prediction template 1

| Sub-pixel position | $f_L$[p][0] | $f_L$[p][1] | $f_L$[p][2] | $f_L$[p][3] | $f_L$[p][4] | $f_L$[p][5] | $f_L$[p][6] | $f_L$[p][7] |
|---|---|---|---|---|---|---|---|---|
| 1 | 0 | 0 | 0 | 64 | 0 | 0 | 0 | 0 |
| 2 | 0 | 1 | −3 | 63 | 4 | −1 | 0 | 0 |
| 3 | 0 | 2 | −6 | 62 | 8 | −3 | 1 | 0 |
| 4 | 0 | 2 | −8 | 60 | 13 | −5 | 2 | 0 |
| 5 | 0 | 2 | −9 | 57 | 18 | −6 | 2 | 0 |
| 6 | 0 | 3 | −11 | 53 | 24 | −8 | 3 | 0 |
| 7 | 0 | 3 | −10 | 49 | 29 | −9 | 2 | 0 |
| 8 | 0 | 3 | −11 | 45 | 34 | −10 | 3 | 0 |
| 9 | 0 | 3 | −11 | 40 | 40 | −11 | 3 | 0 |
| 10 | 0 | 3 | −10 | 34 | 45 | −11 | 3 | 0 |
| 11 | 0 | 2 | −9 | 29 | 49 | −10 | 3 | 0 |
| 12 | 0 | 3 | −8 | 24 | 53 | −11 | 3 | 0 |
| 13 | 0 | 2 | −6 | 18 | 57 | −9 | 2 | 0 |
| 14 | 0 | 2 | −5 | 13 | 60 | −8 | 2 | 0 |
| 15 | 0 | 1 | −3 | 8 | 62 | −6 | 2 | 0 |

5.7. Embodiment 6: Cache Bandwidth Constraints for Interweaved Prediction

The text change is based on AVS-N2865

9.19 Derivation of Affine Motion Unit Sub-Block Motion Vector Array

If there are 3 motion vectors in the affine control point motion vector group, the motion vector group is expressed as mvsAffine (mv0, mv1, mv2); otherwise (there are 2 motion vectors in the affine control point motion vector group), the motion vector group is expressed It is mvsAffine (mv0,mv1).

a) Calculate the variables dHorX, dVerX, dHorY and dVerY:

$$dHorX = (mv1\_x - mv0\_x) \ll (7 - \mathrm{Log}(width))$$
$$dVerX = (mv1\_y - mv0\_y) \ll (7 - \mathrm{Log}(width))$$

b) If there are 3 motion vectors in mvsAffine, then:

$$dHorY = (mv2\_x - mv0\_x) \ll (7 - \mathrm{Log}(height))$$
$$dVerY = (mv2\_y - mv0\_y) \ll (7 - \mathrm{Log}(height))$$

c) Otherwise (there are 2 motion vectors in mvsAffine):

$$dHorY = -\,dVerX$$
$$dVerY = dHorX$$

(xE, yE) is the position of the upper left sample of the current prediction unit brightness prediction block in the brightness sample matrix of the current image. The width and height of the current prediction unit are width and height respectively, and the width and height of each sub-block are subwidth and subheight, see FIG. 40. The sub-block where the upper-left sample of the current prediction unit luminance prediction block is located is A, the sub-block where the upper-right sample is located is B, and the sub-block where the lower-left sample is located is C.

c) OutBandwidthConstrain is initialized to 0, and AlignTop, AlignLeft, AlignLeftFirstRow and AlignLeftLastRow are initialized to 1.

b) If the prediction reference mode of the current prediction unit is 'Pred_List01' or AffineSubblockSizeFlag is equal to 1, then subwidth and subheight are both equal to 8, MarginVer is equal to 4, MarginHor is equal to 6, and (x, y) are the coordinates of the upper left corner of the sub-block, calculate The motion vector of each luminance sub-block:

d) For template 0:

1) If the current sub-block is A, both xPos and yPos are equal to 0;

2) Otherwise, if the current sub-block is B, then xPos is equal to width and yPos is equal to 0;

3) Otherwise, if the current sub-block is C and there are 3 motion vectors in mvsAffine, xPos is equal to 0 and yPos is equal to height;

4) Otherwise, xPos is equal to (x−xE)+4, and yPos is equal to (y−yE)+4;

5) The motion vector mvE0 of the current sub-block:

mvE0_x = Clip3(−131072, 131071, Rounding((mv0_x << 7) + dHorX*xPos + dHorY*yPos, 7))
mvE0_y = Clip3(−131072, 131071, Rounding((mv0_y << 7) + dVerX*xPos + dVerY*yPos, 7))

For template:

1) If the current sub-block is A, both xPos and yPos are equal to 0;

2) Otherwise, if the current sub-block is B, then xPos is equal to width and yPos is equal to 0;

3) Otherwise, if the current sub-block is C and there are 3 motion vectors in mvsAffine, xPos is equal to 0 and yPos is equal to height;

4) Otherwise, a) If y is less than yE+subheight/2, xPos is equal to (x−xE)+4, and yPos is equal to (y−yE)+2;

b) Otherwise, if x is less than xE+subwidth/2, xPos is equal to (x−xE)+2, and yPos is equal to (y−yE)+4;

c) Otherwise, if x is greater than xE+width-subwidth/2 and y is greater than yE+height-subheight/2 or x is less than xE+subwidth/2 and y is greater than yE+height-subheight/2, xPos is equal to (x−xE)+2, yPos is equal to (y−yE)+2;

d) Otherwise, if y is greater than yE+height-subheight/2, xPos is equal to (x−xE)+4, and yPos is equal to (y−yE)+2;

e) Otherwise, if x is greater than xE+width-subwidth/2, xPos is equal to (x−xE)+2, and yPos is equal to (y−yE)+4;

f) Otherwise, xPos is equal to (x−xE)+4, and yPos is equal to (y−yE)+4;

5) The motion vector mvE1 of the current sub-block:

mvE1_x = Clip3(−131072, 131071, Rounding((mv0_x << 7) + dHorX*xPos + dHorY*yPos, 7))
mvE1_y = Clip3(−131072, 131071, Rounding((mv0_y << 7) + dVerX*xPos + dVerY*yPos, 7))

1) If the sub-block is located in the first row, Align Top is equal to 0, if the sub-block is located in the last row, then AlignTop is equal to 1, otherwise, calculate mv0_y and mv1_y. If mv0_y>0 and mv1_y>0, or mv0_y>0 and mv1_y<0 and |mv0_y|>|mv1_y|, or mv0_y<0 and mv1_y>0 and |mv0_y|<|mv1_y|, then AlignTop is equal to 0: otherwise, AlignTop is equal to 1 mv0_y = dVerX + dVerY
mv1_y = dVerX − dVerY

1) If the sub-block is located in the first column, AlignLeft is equal to 0, if the sub-block is located in the last column, AlignLeft is equal to 1, otherwise, calculate mv0_x and mv1_x. If AlignTop is equal to 1:

mv0_x = dHorX + dHorY
mv1_x = − dHorX + dHorY otherwise mv0_x = dHorX − dHorY
mv1_x = − dHorX − dHorY If mv0_x>0 and mv1_x>0, or mv0_x>0 and mv1_x<0 and |mv0_x|>|mv1_x|, or mv0_x<0 and mv1_x>0 and |mv0_x|<|mv1_x| then AlignLeft is equal to 0; otherwise, AlignLeft Equal to 1.

Figure 44:
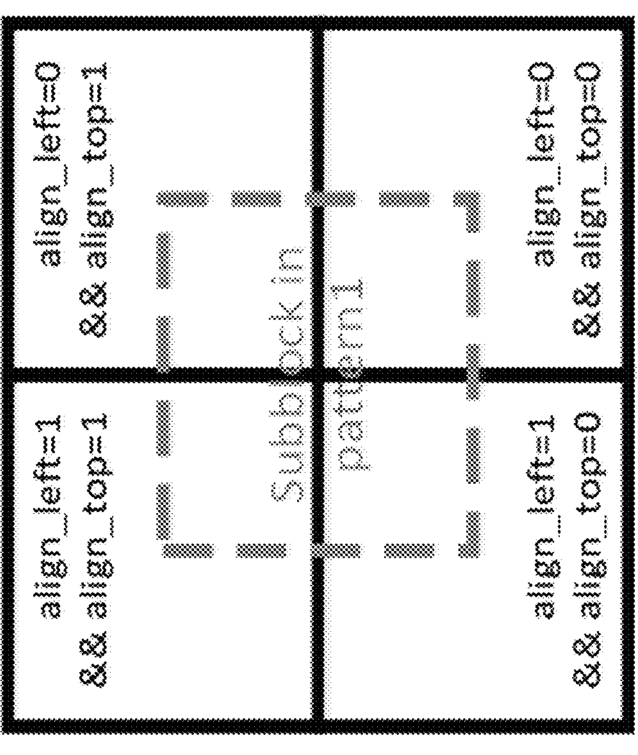
FIG. 44 shows a subblock in a pattern 1.

Take the motion vector of the corresponding sub-block in template 0 according to AlignTop and AlignLeft, and record it as (mvx_pattern0, mvy_pattern0) in FIG. 44.

1) If AlignLeft is equal to 1 and (mvE1_x>>4)−(mvx_pattern0>>4)>MarginHor or (mvx_pattern0>>4)−(mvE1_x>>4)>8+MarginHor, or AlignLeft is equal to 0 and (mvx_pattern0>>4)−(mvE1_x>>4)>MarginHor or (mvE1_x>>4)−(mvx_pattern0>>4)>8+MarginHor, then OutBandwidthConstrain is equal to 1; if AlignTop is equal to 1 and (mvE1_y>>4)−(mvy_pattern0>>4)>MarginVer or (mvy_pattern0>>4)−(mvE1_y>>4)>8+MarginVer, or AlignTop is equal to 0 and (mvy_pattern0>>4)−(mvE1_y>>4)>MarginVer or (mvE1_y>>4)−(Mvy_pattern0>>4)>8+MarginVer, then OutBandwidthConstrain is equal to 1.

a) If the prediction reference mode of the current prediction unit is 'Pred_List0' or 'Pred_List1' and AffineSubblockSizeFlag is equal to 0, then subwidth and subheight are both equal to 4, MarginVer is equal to 1, MarginHor is equal to 4, and (x,y) is the upper left corner position of the sub-block Calculate the motion vector of each luminance sub-block:

b) For template 0:

1) If the current sub-block is A, both xPos and yPos are equal to 0;

2) Otherwise, if the current sub-block is B, then xPos is equal to width and yPos is equal to 0;

1) Otherwise, if the current sub-block is C and there are 3 motion vectors in mvAffine, xPos is equal to 0, and yPos is equal to height;

2) Otherwise, xPos is equal to (x−xE)+2, and yPos is equal to (y−yE)+2;

3) The motion vector mvE0 of the current sub-block:

```
mvE0_x = Clip3(−131072, 131071, Rounding((mv0_x << 7) + dHorX*xPos + dHorY*yPos, 7))
mvE0_y = Clip3(−131072, 131071, Rounding((mv0_y << 7) + dVerX*xPos + dVerY*yPos, 7))
```

For template 1:

1) If the current sub-block is A, both xPos and yPos are equal to 0;

2) Otherwise, if the current sub-block is B, then xPos is equal to width and yPos is equal to 0;

3) Otherwise, if the current sub-block is C and there are 3 motion vectors in mvsAffine, xPos is equal to 0 and yPos is equal to height;

4) Otherwise, a) If y is less than yE+subheight/2, xPos is equal to (x−xE)+2, and yPos is equal to (y−yE)+1;

b) Otherwise, if x is less than xE+subwidth/2, xPos is equal to (x−xE)+1, and yPos is equal to (y−yE)+2;

c) Otherwise, if x is greater than xE+width-subwidth/2 and y is greater than yE+height-subheight/2 or x is less than xE+subwidth/2 and y is greater than yE+height-subheight/2, xPos is equal to (x−xE)+1, yPos is equal to (y−yE)+1;

d) Otherwise, if y is greater than yE+height-subheight/2, xPos is equal to (x−xE)+2, and yPos is equal to (y−yE)+1;

e) Otherwise, if x is greater than xE+width-subwidth/2, xPos is equal to (x−xE)+1, and yPos is equal to (y−yE)+2;

f) Otherwise, xPos is equal to (x−xE)+2, and yPos is equal to (y−yE)+2;

5) The motion vector mvE1 of the current sub-block:

```
mvE1_x = Clip3(−131072, 131071, Rounding((mv0_x << 7) + dHorX*xPos + dHorY*yPos, 7)
mvE1_y = Clip3(−131072, 131071, Rounding((mv0_y << 7) + dVerX*xPos + dVerY*yPos, 7))
```

1) If the sub-block is located in the first row, AlignTop is equal to 0, if the sub-block is located in the last row, then AlignTop is equal to 1, otherwise, calculate mv0_y and mv1_y. If mv0_y>0 and mv1_y>0, or mv0_y>0 and mv1_y<0 and |mv0_y|>|mv1_y|, or mv0_y<0 and mv1_y>0 and |mv0_y|<|mv1_y|, then AlignTop is equal to 0; otherwise, AlignTop is equal to 1.

```
mv0_y = dVerX + dVerY
mv1_y = dVerX − dVerY
```

1) If the sub-block is located in the first column, AlignLeft is equal to 0, if the sub-block is located in the last column, AlignLeft is equal to 1, otherwise, calculate mv0_x and mv1_x. If AlignTop is equal to 1:

```
mv0_x = dHorX + dHorY
mv1_x = − dHorX + dHorY
```

otherwise:

```
mv0_x = dHorX − dHorY
mv1_x = − dHorX − dHorY
```

If mv0_x>0 and mv1_x>0, or mv0_x>0 and mv1_x<0 and mv0_x>mv1_x, or mv0_x<0 and mv1_x>0 and |mv0_x|<|mv1_x|, then AlignLeft is equal to 0; otherwise, AlignLeft is equal to 1.

Figure 45:
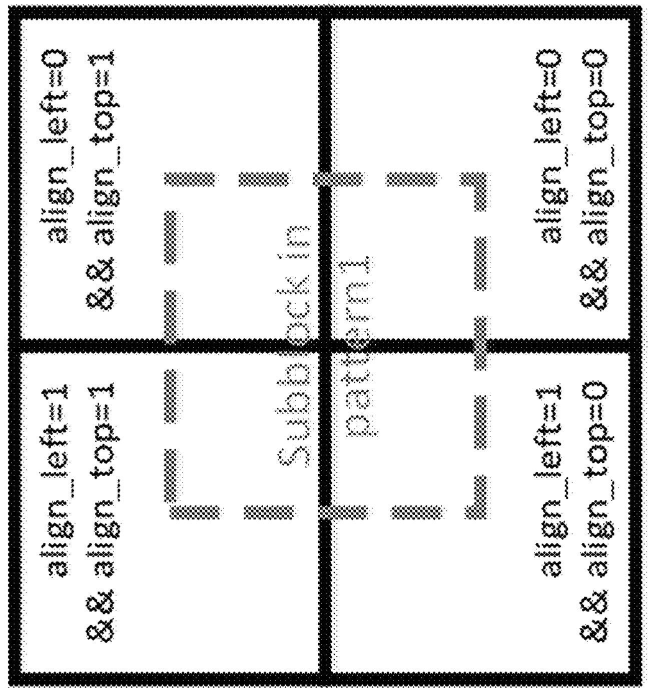
FIG. 45 shows a subblock in a pattern 1.

Take the motion vector of the corresponding sub-block in template 0 according to AlignTop and AlignLeft, and record it as (mvx_pattern0, mvy_pattern0) in FIG. 45.

1) If AlignLeft is equal to 1 and (mvE1_x>>4)−(mvx_pattern0>>4)>MarginHor or (mvx_pattern0>>4)−(mvE1_x>>4)>4+MarginHor, or AlignLeft is equal to 0 and (mvx_pattern0>>4)−(mvE1_x>>4)>MarginHor or (mvE1_x>>4)−(mvx_pattern0>>4)>4+MarginHor, then OutBandwidthConstrain is equal to 1; if AlignTop is equal to 1 and (mvE1_y>>4)−(mvy_pattern0>>4)>MarginVer or (mvy_pattern0>>4)−(mvE1_y>>4)>4+MarginVer, or AlignTop is equal to 0 and (mvy_pattern0>>4)−(mvE1_y>>4)>MarginVer or (mvE1_y>>4)−(mvy_pattern0>>4)>4+MarginVer or, then OutBandwidthConstrain is equal to 1.

1) If the prediction model of the current prediction unit is an interlaced affine motion model, the motion vectors of the four sub-blocks A0, B0, C0, and D0 corresponding to template 0 and A1, B1, C1 corresponding to template 1 are obtained according to the above method. D1 motion vectors of the four sub-blocks, and calculate the unit prefetched integer pixel number sampNum of the prediction unit:

1) According to the method in d) or e) respectively obtain the motion vectors mvA0, mvB0, mvC0, mvD0 of the four sub-blocks of A0, B0, C0, and D0 corresponding to template 0, and the height cornerWidth0 and width cornerHeight0 of the four sub-blocks;

```
cornerWidth0 = subwidth
cornerHeight0 = subheight
```

1) Obtain the motion vectors mvA1, mvB1, mvC1, and mvD1 of the four sub-blocks A1, B1, C1, and D1 corresponding to template 1, respectively, according to the method in d) or e), and the height cornerWidth1 and width cornerHeight1 of the four sub-blocks;

```
cornerWidth1 = subwidth>>1
cornerHeight1 = subheight>>1
```

a)

1) The unit pre-fetched integer pixel number of the current prediction unit:

```
posMax_x=Max(Max(Max(mvA0_x>>4, (mvB0_x>>4) + width − cornerWidth0),
Max(mvC0_x>>4, (mvD0_x>>4) + width − cornerWidth0)) + cornerWidth0,
Max(Max(mvA1_x>>4, (mvB1_x>>4) + width − cornerWidth1),
Max(mvC1_x>>4, (mvD1_x>>4) + width − cornerWidth1)) + cornerWidth1)
```

```
posMin_x = Min(Min(Min(mvA0_x>>4, (mvB0_x>>4) + width − cornerWidth0),
Min(mvC0_x>>4, (mvD0_x>>4) + width − cornerWidth0)),
Min(Min(mvA1_x>>4, (mvB1_x>>4) + width − cornerWidth1), Min(mvC1_x>>4,
(mvD1_x>>4) + width − cornerWidth1)))
posMax_y = Max(Max(Max(mvA0_y>>4, (mvB0_y>>4) + height −
cornerHeight0), Max(mvC0_y>>4, (mvD0_y>>4) + height − cornerHeight0)) +
cornerHeight0, Max(Max(mvA1_y>>4, (mvB1_y>>4) + height − cornerHeight1),
Max(mvC1_y>>4, (mvD1_y>>4) + height − cornerHeight1)) + cornerHeight1)
posMin_y = Min(Min(Min(mvA0_y>>4, (mvB0_y>>4) + height − cornerHeight0),
Min(mvC0_y>>4, (mvD0_y>>4) + height − cornerHeight0)),
Min(Min(mvAl_y>>4, (mvB1_y>>4) + height − cornerHeight1),
Min(mvC1_y>>4, (mvD1_y>>4) + height − cornerHeight1)))
bandwidth_hor = Clip3(0, PictureWidthInMinBu * MiniSize − 1, xE + posMax_x)
− Clip3(0, Picture WidthInMinBu * MiniSize − 1, xE + posMin_x)
bandwidth_ver = Clip3(0, PictureHeightInMinBu * MiniSize −1, yE + posMax_y)
− Clip3(0, PictureHeightInMinBu * MiniSize −1, yE + posMin_y)
sampNum = (bandwidth_hor * bandwidth_ver) << (14 − log2(width) − log2(height))
```

9.20 Interlaced Affine Prediction Weight Derivation

Figures 46, 47:
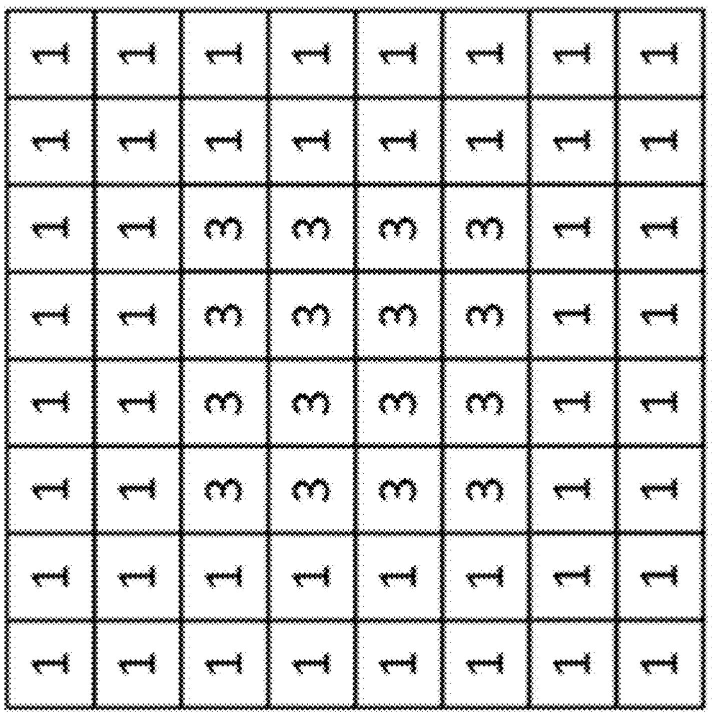
FIG. 46 shows an array of 4×4 weights.
FIG. 47 shows an array of 8×8 weights.

Weightrounding is equal to 2, and weightshift is equal to 2. Remember that the width of the current block is width and the height is height. The derivation process of the interleaved affine prediction weight is as follows:

b) When subblockwidth is equal to 4 and subblockheight is equal to 4:

a) Traverse all sub-blocks in template 0, and the value of weight0 in each 4×4 sub-block is shown in FIG. 46.

1) Traverse all the sub-blocks in template 1, mark the upper left corner coordinates of the sub-block unit as (x, y), and the width and height as sub_w and sub_h:

1. All weight1 in the sub-block are initialized to 1;
2. weight1[x+sub_w/2][y+sub_h/2] is equal to 3;
3. weight1[x+sub_w/2−1][y+sub_h/2] is equal to 3;
4. weight1[x+sub_w/2][y+sub_h/2−1] is equal to 3;
5. weight1[x+sub_w/2−1][y+sub_h/2−1] is equal to 3;
6. If x<2 and y<2, x<2 and y>height−2, x>width−2 and y<2, x>width−2 and y>height−2 satisfy one, then the sub-block The weight0 of all positions within is equal to 4, and weight1 is equal to 0.

2) Traverse weight0 and weight1 at all positions in the current block. If weight0 and weight1 at the same position are equal, then weight0 and weight1 at that position are both equal to 2;

b) When subblockwidth is equal to 8 and subblockheight is equal to 8: Traverse all sub-blocks in template 0, and the value of weight0 in each 8×8 sub-block is shown in FIG. 47.

1) Traverse all the sub-blocks in template 1, mark the upper left corner coordinates of the sub-block unit as (x, y), and the width and height as sub_w and sub_h:

1. All weight1 in the sub-block are initialized to 1;
2. weight1[x+sub_w/2][y+sub_h/2] is equal to 3, weight1[x+sub_w/2+1][y+sub_h/2] is equal to 3, weight1[x+sub_w/2][y+sub_h/2+1] is equal to 3, weight1[x+sub_w/2+1][y+sub_h/2+1] is equal to 3;
3. weight1[x+sub_w/2−2][y+sub_h/2] is equal to 3, weight1[x+sub_w/2-1][y+sub_h/2] is equal to 3, weight1[x+sub_w/2−2][y+sub_h/2+1] is equal to 3, weight1[x+sub_w/2−1][y+sub_h/2+1] is equal to 3;
4. weight1[x+sub_w/2][y+sub_h/2−2] is equal to 3, weight1[x+sub_w/2+1][y+sub_h/2−2] is equal to 3, weight1[x+sub_w/2][y+sub_h/2-1] is equal to 3, weight1[x+sub_w/2+1][y+sub_h/2-1] is equal to 3;
5. weight1[x+sub_w/2−2][y+sub_h/2−2] is equal to 3, weight1[x+sub_w/2−1][y+sub_h/2−2] is equal to 3, weight1[x+sub_w/2-2][y+sub_h/2−1] is equal to 3, weight1[x+sub_w/2−1][y+sub_h/2−1] is equal to 3;

2) Traverse weight0 and weight1 at all positions in the current block. If weight0 and weight1 at the same position are equal, then weight0 and weight1 at that position are both equal to 2.

Figure 33:
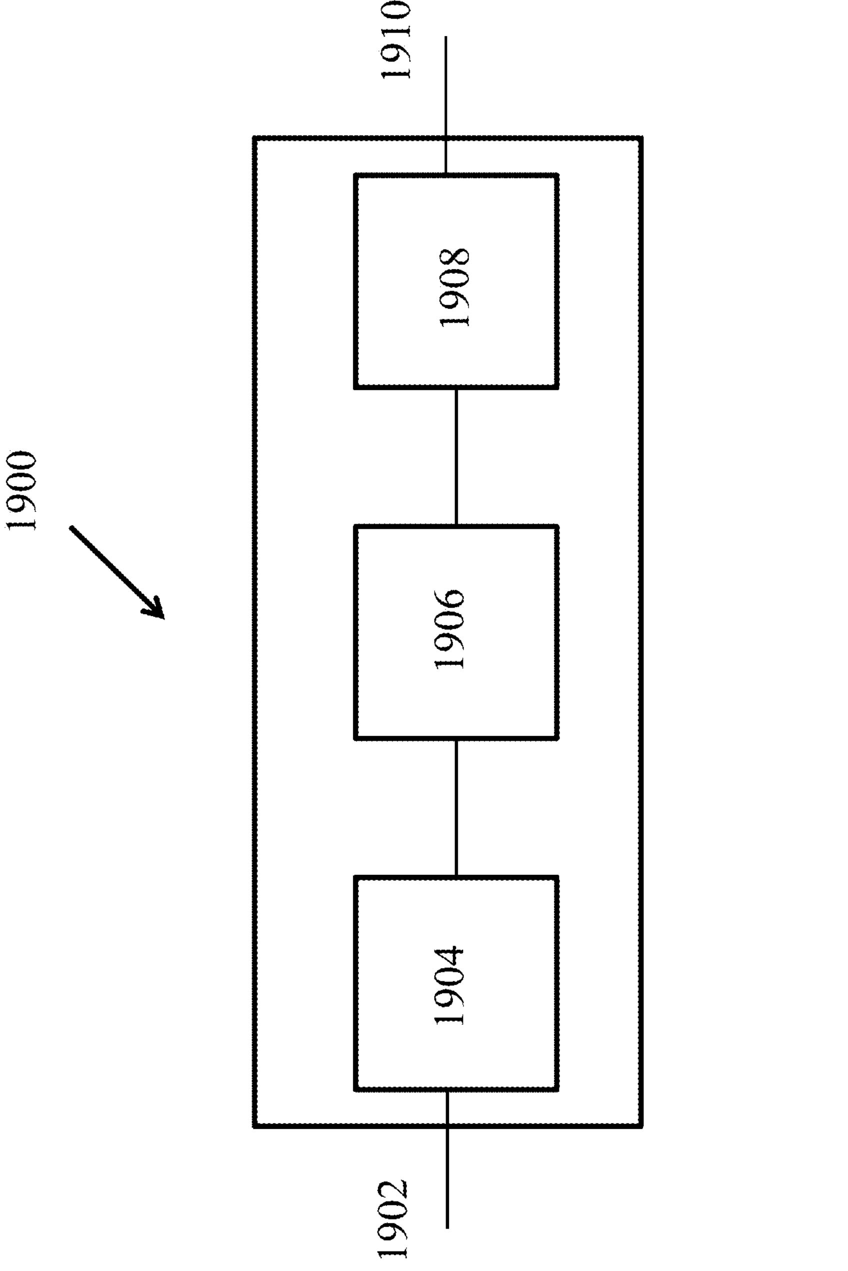
FIG. 33 is a block diagram that illustrates a video coding system in accordance with some embodiments of the present disclosure.

FIG. 33 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 34:
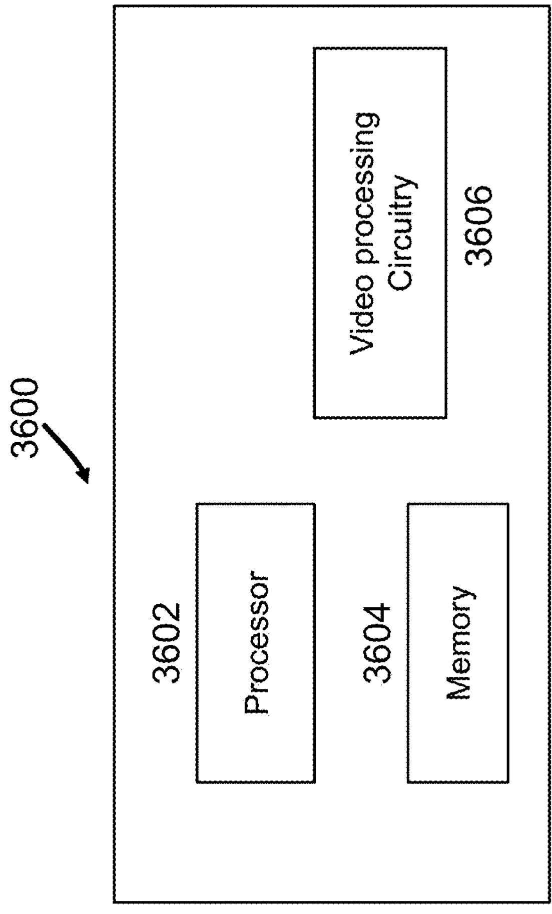
FIG. 34 is a block diagram of an example hardware platform used for video processing.

FIG. 34 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 36:
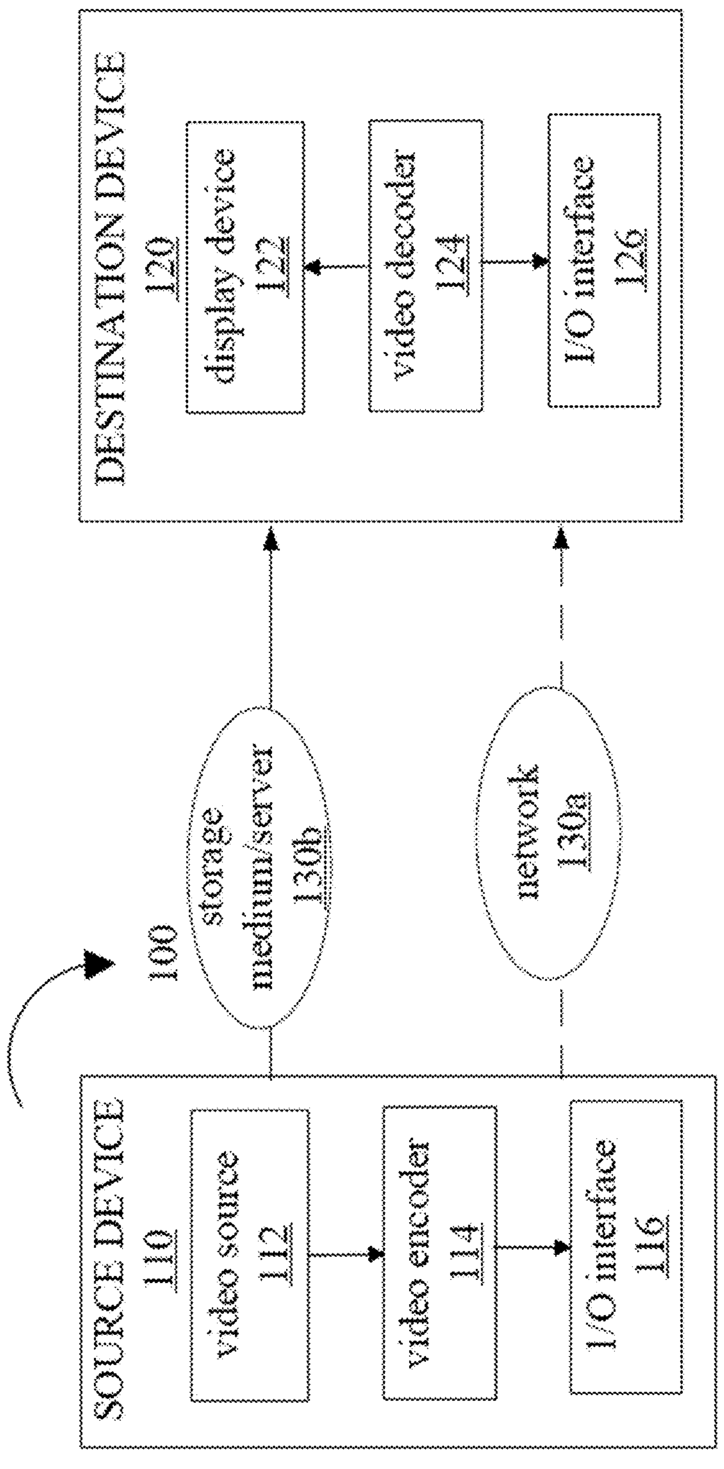
FIG. 36 is a block diagram that illustrates an example video coding system.

FIG. 36 is a block diagram that illustrates an example video coding system 100 that may utilize the techniques of this disclosure.

As shown in FIG. 36, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

FIG. 37 is a block diagram illustrating an example of video encoder 200, which may be video encoder 114 in the system 100 illustrated in FIG. 36.

Video encoder 200 may be configured to perform any or all of the techniques of this disclosure. In the example of FIG. 37, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 37 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 38:
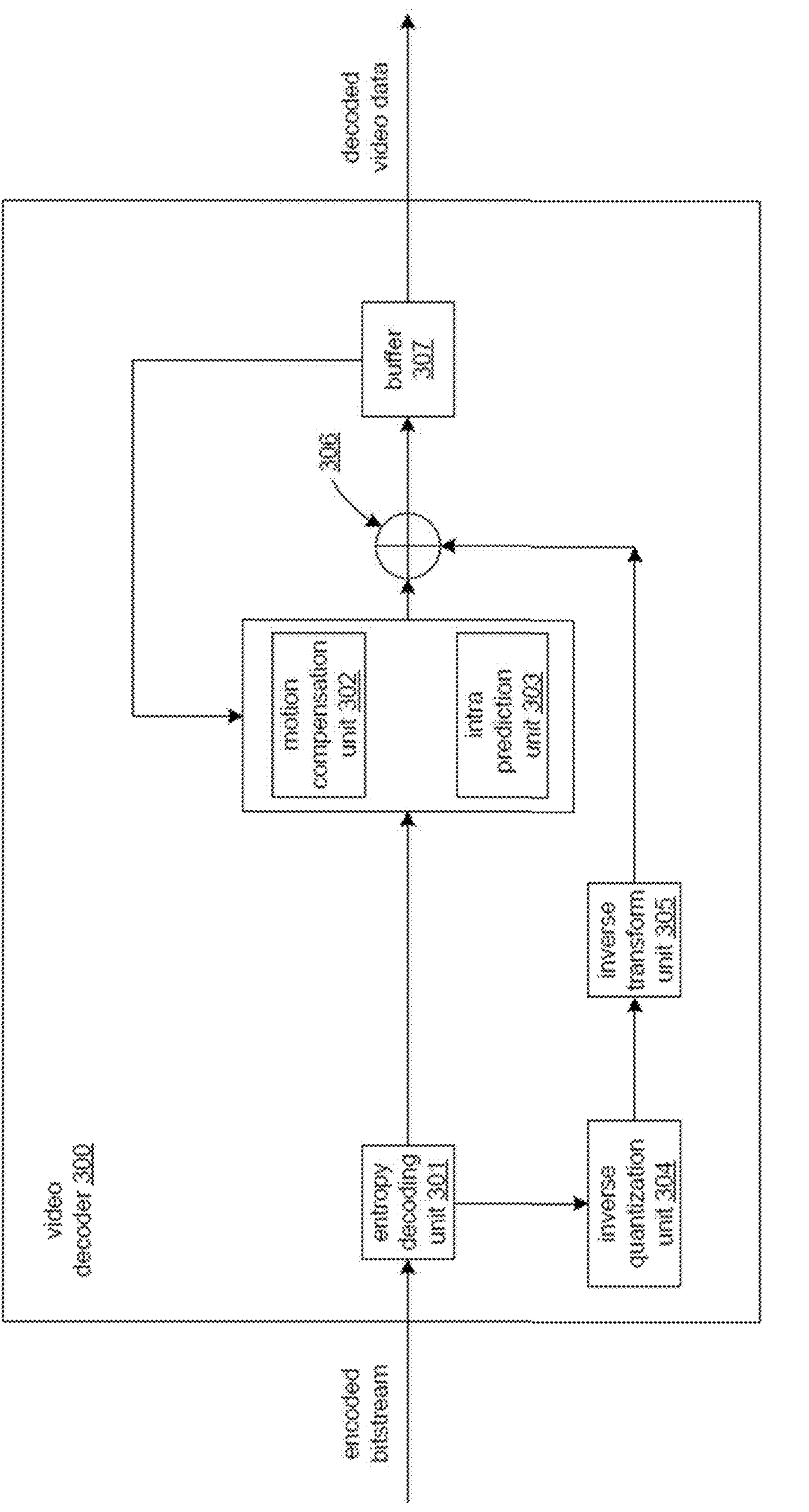
FIG. 38 is a block diagram that illustrates a decoder in accordance with some embodiments of the present disclosure.

FIG. 38 is a block diagram illustrating an example of video decoder 300 which may be video decoder 124 in the system 100 illustrated in FIG. 36.

The video decoder 300 may be configured to perform any or all of the techniques of this disclosure. In the example of FIG. 37, the video decoder 300 includes a plurality of functional components. The techniques described in this disclosure may be shared among the various components of the video decoder 300. In some examples, a processor may be configured to perform any or all of the techniques described in this disclosure.

In the example of FIG. 38, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 37).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 35:
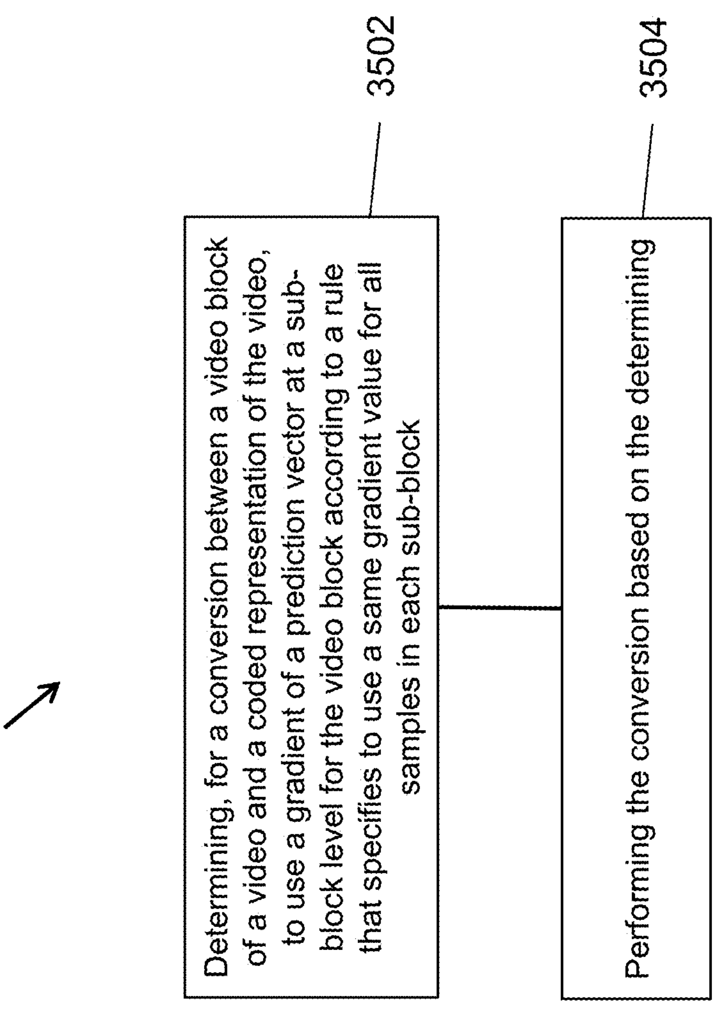
FIG. 35 is a flowchart for an example method of video processing.

1. A video processing method (e.g., method 3500 depicted in FIG. 35), comprising: determining (3502), for a conversion between a video block of a video and a coded representation of the video, to use a gradient of a prediction vector at a sub-block level for the video block according to a rule that specifies to use a same gradient value for all samples in each sub-block, and performing (3504) the conversion based on the determining.
2. The method of solution 1, wherein the rule specifies that all samples in each sub-block of the video block use a same motion displacement and the same gradient value.
3. The method of any of solutions 1-2, wherein the video block is divided into sub-blocks, at least some of which have a size of 2×2, 2×1 or 4×1 pixels.
4. The method of any of solutions 1-3, wherein the same gradient value is determined by averaging sample values of at least some samples of the sub-block.
5. The method of any of solutions 1-3, wherein the same gradient value is determined as an average of each sample's gradient or an average of gradients from partial of samples within the sub-block.
6. The method of any of solutions 1-5, wherein the same gradient is determined based on a first sub-block having a size different from a second sub-block used for determining a motion vector for the video block.

The following solutions show example embodiments of techniques discussed in the previous section (e.g., item 2).

7. A method of video processing, comprising: determining, for a conversion between a current video block of a video and a bitstream representation of the video, to use a prediction refinement of motion information using an optical flow technique according to a rule; and performing the conversion based on the determining, wherein the rule specifies that the prediction refinement is performed after a bi-prediction is performed to obtain the motion information.
8. The method of solution 7, wherein the prediction refinement is computed by determining a temporal prediction signal using at least two decoded motion information values and refining the temporal prediction signal.
9. The method of solution 7, wherein the prediction refinement is computed by determining based on a first predictor value from a first reference picture list and a second predictor value from a second predictor list and an offset.

The following solutions show example embodiments of techniques discussed in the previous section (e.g., item 3).

10. A method of video processing, comprising: determining, for a conversion between a current video block of a video and a bitstream representation of the video, that a coding tool is enabled for the current video block because the current video block satisfies a condition; and performing the conversion based on the determining, wherein the condition relates to a control point motion vectors for the current video block or a size of the current video block or a prediction mode of the current video block.
11. The method of solution 10, wherein the current video block is represented in the coded representation using an affine prediction based coding.
12. The method of any of solutions 10-11, wherein the determining further includes determining that the coding tool is disabled for the current video block due to the current video block not satisfying the condition.
13. The method of any of solutions 10-12, wherein the current video block is represented in the coded representation using interweaved prediction or an affine prediction.
14. The method of any of solutions 10-13, wherein the condition is determined based on a bounding box for the current video block using one of the following rules: (a) the condition is considered satisfied only if a size of the bounding box is above a first threshold, (b) the condition is considered satisfied only if a size of the bounding box is below a second threshold.

15. The method of solution 14, wherein values of the first threshold or the second thresholds depend on whether a uni-prediction or a bi-prediction is used for representing the current video block in the coded representation.

The following solutions show example embodiments of techniques discussed in the previous section (e.g., item 5, 6).

16. A video processing method, comprising: determining, for a conversion between a video block of a video and a coded representation of the video, whether and how to use weighted prediction for calculating a prediction of a sub-block of the video block according to a rule; and performing the conversion based on the determining, wherein the rule is based on one or more of whether affine mode is enabled for the video block or a color component to which the video block belongs or a color format of the video.

17. The method of solution 16, wherein the rule relates to a size of the subblock for which the weighted prediction is performed.

18. The method of any of solutions 1-17, wherein the performing the conversion comprises encoding the video to generate the coded representation.

19. The method of any of solutions 1-17, wherein the performing the conversion comprises parsing and decoding the coded representation to generate the video.

20. A video decoding apparatus comprising a processor configured to implement a method recited in one or more of solutions 1 to 19.

21. A video encoding apparatus comprising a processor configured to implement a method recited in one or more of solutions 1 to 19.

22. A computer program product having computer code stored thereon, the code, when executed by a processor, causes the processor to implement a method recited in any of solutions 1 to 19.

23. A method, apparatus or system described in the present document.

Figure 48:
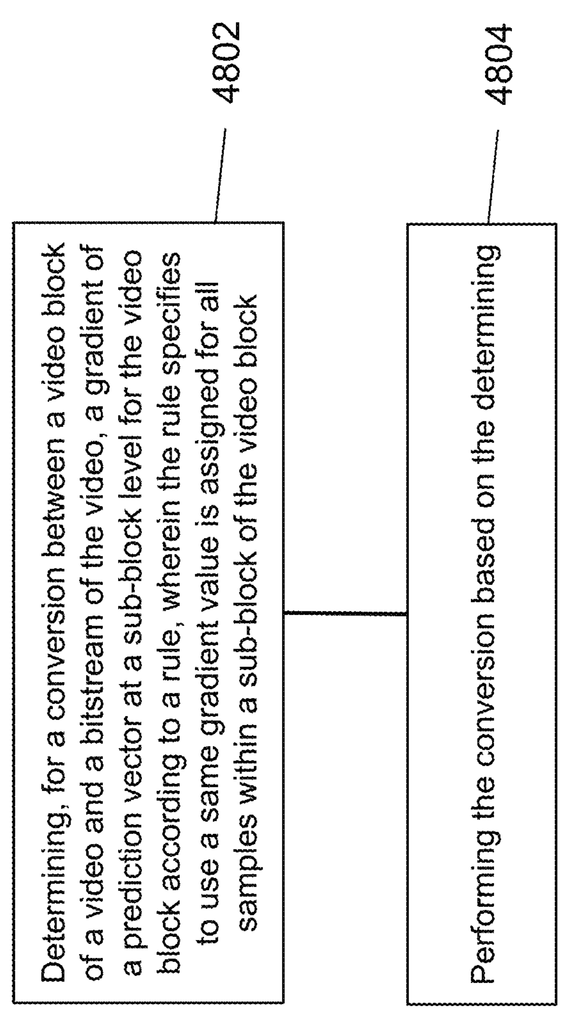
FIGS. 48 to 54 are flowcharts for example methods of video processing.

FIG. 48 is a flowchart for an example method 4800 of video processing. Operation 4802 includes determining, for a conversion between a video block of a video and a bitstream of the video, a gradient of a prediction vector at a sub-block level for the video block according to a rule, wherein the rule specifies to use a same gradient value is assigned for all samples within a sub-block of the video block. Operation 4804 includes performing the conversion based on the determining.

In some embodiments of method 4800, the rule specifies that all samples in the sub-block of the video block use a same motion displacement information and the same gradient value. In some embodiments of method 4800, a refinement operation performed at the sub-block level includes deriving one refinement ($Vx(x_s, y_s)$ x $Gx(x_s, y_s)+Vy(x_s, y_s)$ x $Gy(x_s, y_s)$) for the sub-block ($x_s$, $y_s$), wherein $Gx(x_s, y_s)$ and $Gy(x_s, y_s)$ are gradients of the sub-block, and wherein $Vx(x_s, y_s)$ and $Vy(x_s, y_s)$ are motion displacement vectors of the sub-block. In some embodiments of method 4800, a motion displacement vector V(x,y) of the video block is derived at the sub-block level. In some embodiments of method 4800, the video block is divided into sub-blocks, wherein at least some of the sub-blocks have a size of 2×2 pixels, 2×1 pixels, or 4×1 pixels. In some embodiments of method 4800, the same gradient value is determined by averaging sample values of a plurality of samples of the sub-block or by averaging sample values of some of the plurality of samples of the sub-block. In some embodiments of method 4800, the same gradient value is determined by averaging each gradient of a plurality of samples of the sub-block or by averaging gradients of some of the plurality of samples of the subblock.

In some embodiments of method 4800, the rule specifies that a size of the sub-block is pre-defined or is derived based on information included in the bitstream or is indicated in the bitstream. In some embodiments of method 4800, the rule specifies that the size of the sub-block is derived based on a dimension of the video block. In some embodiments of method 4800, a same size of the sub-block is used for determining the same gradient value and for determining motion vector or motion vector difference.

Figure 49:
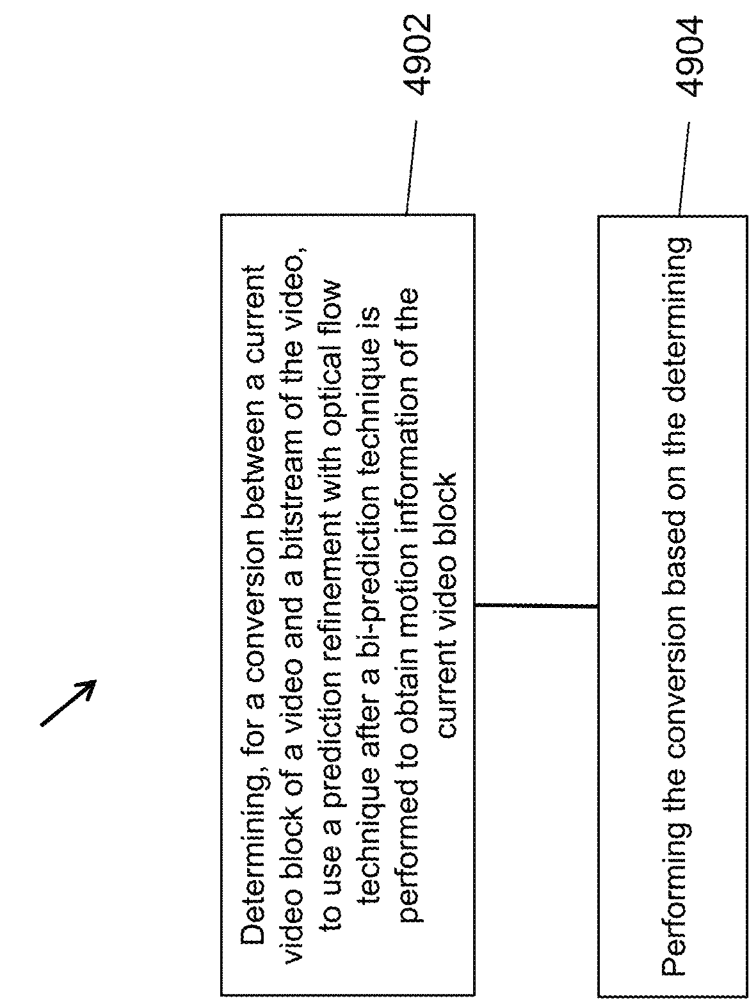

FIG. 49 is a flowchart for an example method 4900 of video processing. Operation 4902 includes determining, for a conversion between a current video block of a video and a bitstream of the video, to use a prediction refinement with optical flow technique after a bi-prediction technique is performed to obtain motion information of the current video block. Operation 4904 includes performing the conversion based on the determining.

In some embodiments of method 4900, the prediction refinement with optical flow technique is used by first determining a temporal prediction signal using at least two decoded motion information values and then refining the temporal prediction signal. In some embodiments of method 4900, a gradient of the current video block is derived from the temporal prediction signal. In some embodiments of method 4900, the prediction refinement with optical flow technique includes performing a sub-block based affine motion compensation to obtain a prediction sample and refining the prediction sample by adding a difference derived by an optical flow equation, and the bi-prediction technique includes using two reference picture lists to produce a prediction unit from a weighted average of two blocks of samples.

Figure 50:
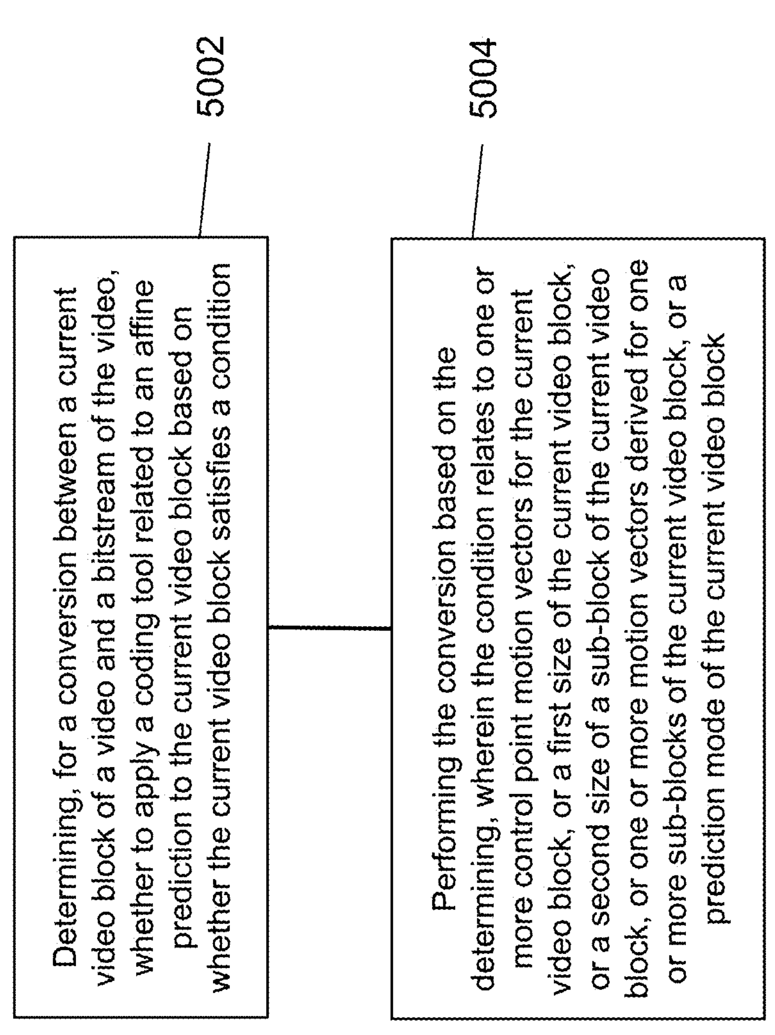

FIG. 50 is a flowchart for an example method 5000 of video processing. Operation 5002 includes determining, for a conversion between a current video block of a video and a bitstream of the video, whether to apply a coding tool related to an affine prediction to the current video block based on whether the current video block satisfies a condition. Operation 5004 includes performing the conversion based on the determining, wherein the condition relates to one or more control point motion vectors for the current video block, or a first size of the current video block, or a second size of a sub-block of the current video block, or one or more motion vectors derived for one or more sub-blocks of the current video block, or a prediction mode of the current video block.

In some embodiments of method 5000, the current video block is represented in the bitstream using an affine prediction based coding. In some embodiments of method 5000, the coding tool includes an affine prediction tool. In some embodiments of method 5000, the coding tool includes an interweaved prediction tool. In some embodiments of method 5000, the coding tool is determined not to be applied to the current video block in a conformance bitstream in response to the condition not being satisfied. In some embodiments of method 5000, the coding tool is replaced with another coding tool that is applied to the current video block in response to the condition not being satisfied. In some embodiments of method 5000, the coding tool is replaced with another coding tool that is applied to the current video block in response to the condition not being satisfied and in response to the current video block being coded with an affine merge mode. In some embodiments of method 5000, the coding tool is turned off or disabled for the current video block at an encoder and at a decoder in response to the condition not being satisfied.

In some embodiments of method 5000, the bitstream excludes a syntax element that indicates whether the coding tool is applied to the current video block in response to the condition not being satisfied. In some embodiments of method 5000, the coding tool is inferred to be turned off or disabled in response to the syntax element being absent from the bitstream. In some embodiments of method 5000, the coding tool is an affine prediction tool in response to the condition being satisfied, and wherein the coding tool is a prediction tool other than the affine prediction tool in response to the condition being not satisfied. In some embodiments of method 5000, the one or more control point motion vectors are used as motion vectors of the current video block without applying an affine motion model to the current video block. In some embodiments of method 5000, the coding tool is an interweaved prediction tool in response to the condition being satisfied, and wherein the coding tool is a prediction tool other than an affine prediction tool in response to the condition being not satisfied. In some embodiments of method 5000, prediction samples of a second dividing pattern in the interweaved prediction tool is set equal to prediction samples of a first dividing patterns at corresponding positions in response to the condition being not satisfied.

In some embodiments of method 5000, the condition is determined based on a size of a bounding box for the current video block. In some embodiments of method 5000, the condition is satisfied in response to the size of the bounding box being less or equal to a threshold, and wherein the condition is not satisfied in response to the size of the bounding box being greater than the threshold. In some embodiments of method 5000, the condition is based on a first motion vector in a horizontal direction of a plurality of sub-blocks of the current video block and a second motion vector in a vertical direction of the plurality of subblocks of the current video block. In some embodiments of method 5000, the condition is true in response to a result of a third motion vector in the horizontal direction of one sub-block of the current video in a first dividing pattern minus the first motion vector being greater than a threshold value. In some embodiments of method 5000, the condition is true in response to a result of the first motion vector minus a third motion vector in the horizontal direction of one sub-block of the current video in a first dividing pattern being greater than a threshold value. In some embodiments of method 5000, the condition is true in response to a result of a fourth motion vector in the vertical direction of one sub-block of the current video in a first dividing pattern minus the second motion vector being greater than a threshold value. In some embodiments of method 5000, the condition is true in response to a result of the second motion vector minus a fourth motion vector in the vertical direction of one sub-block of the current video in a first dividing pattern being greater than a threshold value.

Figure 51:
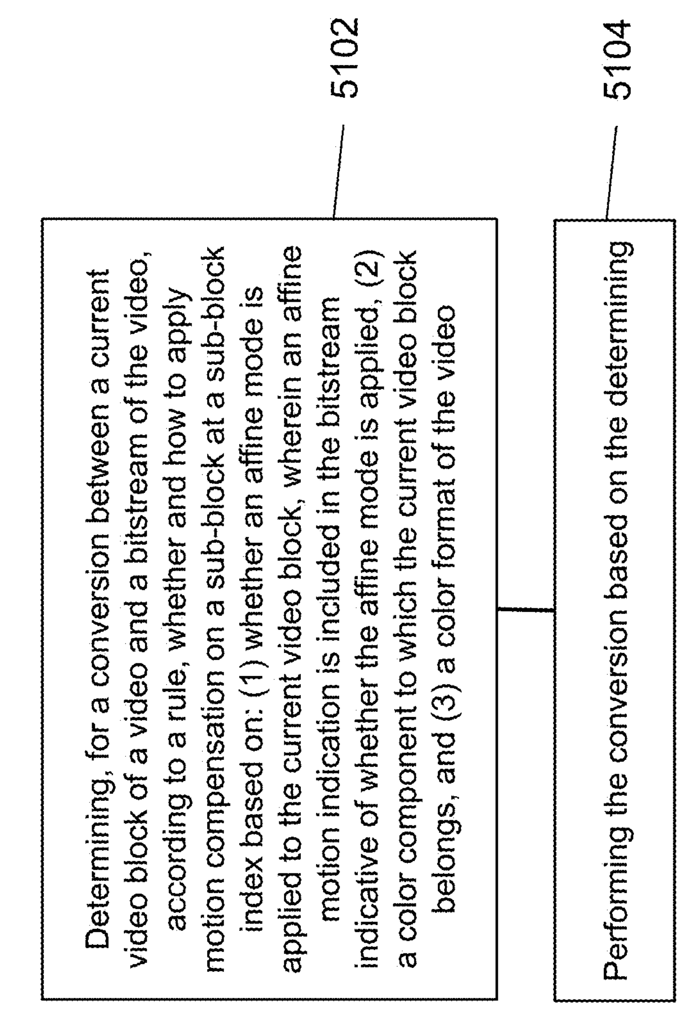

FIG. 51 is a flowchart for an example method 5100 of video processing. Operation 5102 includes determining, for a conversion between a current video block of a video and a bitstream of the video, according to a rule, whether and how to apply motion compensation on a sub-block at a sub-block index based on: (1) whether an affine mode is applied to the current video block, wherein an affine motion indication is included in the bitstream indicative of whether the affine mode is applied, (2) a color component to which the current video block belongs, and (3) a color format of the video. Operation 5104 includes performing the conversion based on the determining.

In some embodiments of method 5100, the rule specifies that the motion compensation on the sub-block at the sub-block index is applied individually in response to: (1) the color component being a luma component, or (2) the affine mode not being applied to the current video block, or (3) a remainder of a horizontal sub-block index divided by a width of the current video block being equal to 0 and a second remainder of a vertical sub-block index divided by a height of the current video block being equal to 0. In some embodiments of method 5100, the rule specifies that a first width or a first height of a chroma sub-block of the video for performing the motion compensation at the sub-block index of the chroma sub-block depends on the affine mode indication and the color format of the video. In some embodiments of method 5100, the rule specifies that the first width of the chroma sub-block is a second width of a luma sub-block in response to the affine mode indication indicating that the affine mode is applied to the current video block, and the rule specifies that the first width of the chroma sub-block is the second width of the luma sub-block divided by a third width of the current video block in response to the affine mode indication indicating that the affine mode is not applied to the current video block. In some embodiments of method 5100, the rule specifies that the first height of the chroma sub-block is a second height of a luma sub-block in response to the affine mode indication indicating that the affine mode is applied to the current video block, and the rule specifies that the first height of the chroma sub-block is the second height of the luma sub-block divided by a third height of the current video block in response to the affine mode indication indicating that the affine mode is not applied to the current video block.

Figure 52:
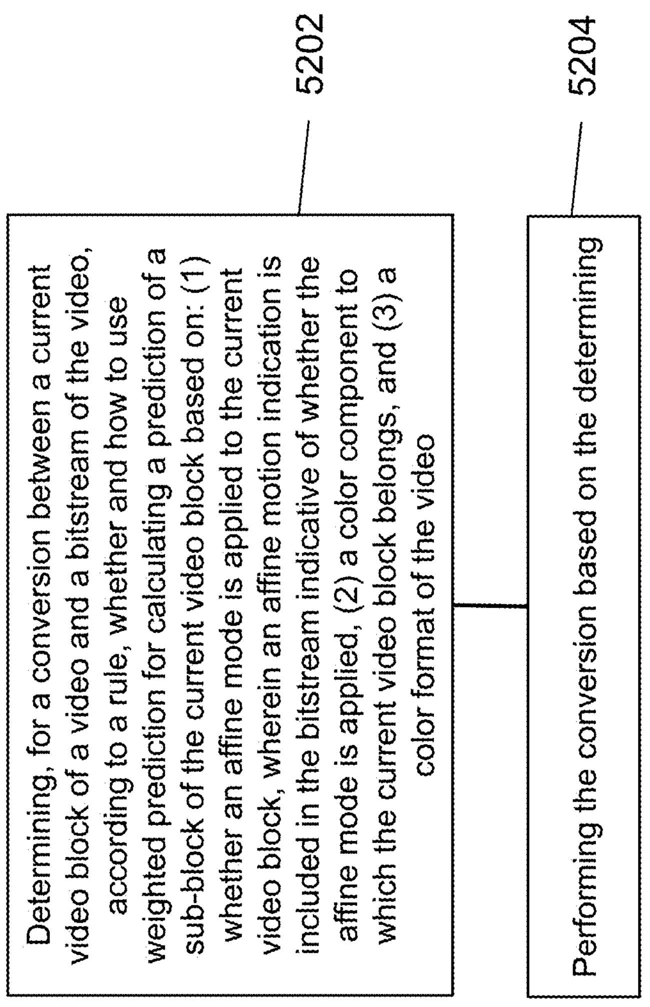

FIG. 52 is a flowchart for an example method 5200 of video processing. Operation 5202 includes determining, for a conversion between a current video block of a video and a bitstream of the video, according to a rule, whether and how to use weighted prediction for calculating a prediction of a sub-block of the current video block based on: (1) whether an affine mode is applied to the current video block, wherein an affine motion indication is included in the bitstream indicative of whether the affine mode is applied, (2) a color component to which the current video block belongs, and (3) a color format of the video. Operation 5204 includes performing the conversion based on the determining.

In some embodiments of method 5200, the rule specifies that the weighted prediction on the sub-block at a sub-block index is applied individually in response to: (1) the color component not being a luma component, or (2) the affine mode not being applied to the current video block, or (3) a remainder of a horizontal sub-block index divided by a width of the current video block being equal to 0 and a second remainder of a vertical sub-block index divided by a height of the current video block being equal to 0. In some embodiments of method 5200, the rule specifies that a first width or a first height of a chroma sub-block of the video for performing the weighted prediction at a sub-block index of the chroma sub-block depends on the affine mode indication and the color format of the video. In some embodiments of method 5200, the rule specifies that the first width of the chroma sub-block is a second width of a luma sub-block in response to the affine mode indication indicating that the affine mode is applied to the current video block, and the rule specifies that the first width of the chroma sub-block is the second width of the luma sub-block divided by a third width of the current video block in response to the affine mode indication indicating that the affine mode is not applied to the current video block.

In some embodiments of method 5200, the rule specifies that the first height of the chroma sub-block is a second height of a luma sub-block in response to the affine mode indication indicating that the affine mode is applied to the current video block, and the rule specifies that the first height of the chroma sub-block is the second height of the luma sub-block divided by a third height of the current video block in response to the affine mode indication indicating that the affine mode is not applied to the current video block.

Figure 53:
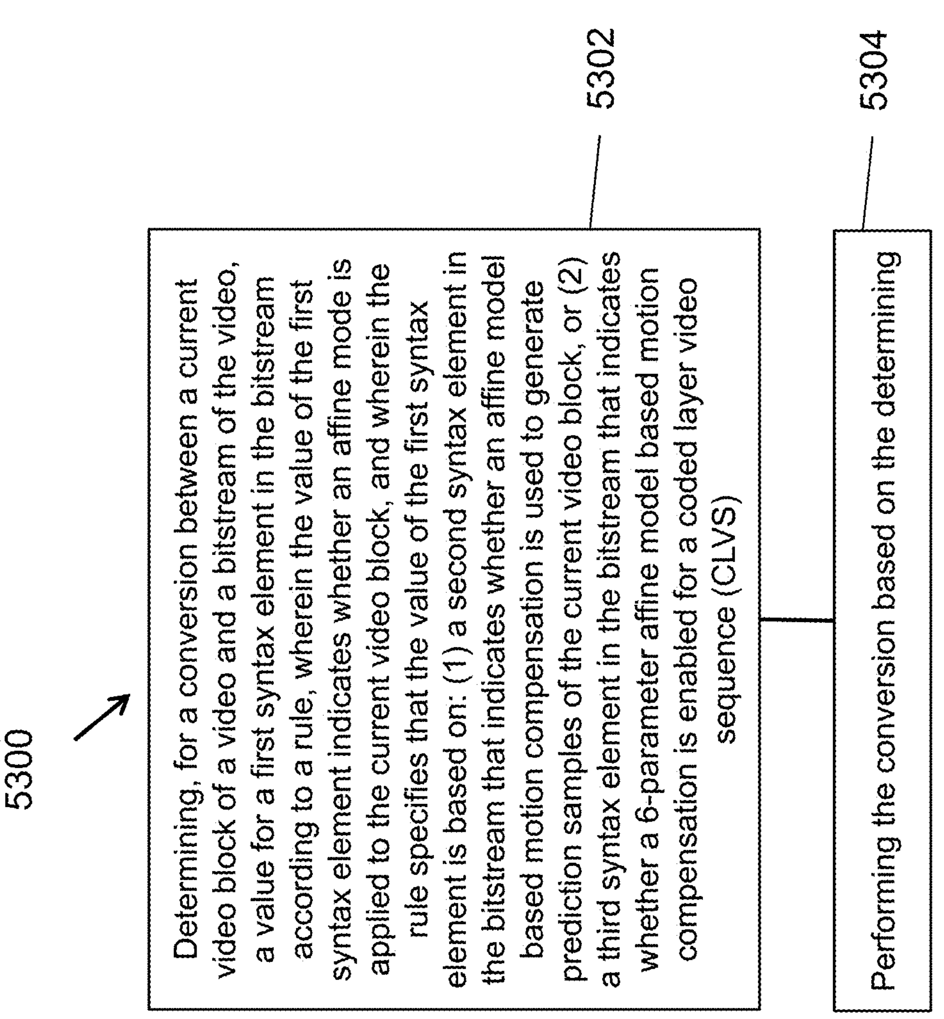

FIG. 53 is a flowchart for an example method 5300 of video processing. Operation 5302 includes determining, for a conversion between a current video block of a video and a bitstream of the video, a value for a first syntax element in the bitstream according to a rule, wherein the value of the first syntax element indicates whether an affine mode is applied to the current video block, and wherein the rule specifies that the value of the first syntax element is based on: (1) a second syntax element in the bitstream that indicates whether an affine model based motion compensation is used to generate prediction samples of the current video block, or (2) a third syntax element in the bitstream that indicates whether a 6-parameter affine model based motion compensation is enabled for a coded layer video sequence (CLVS). Operation 5304 includes performing the conversion based on the determining.

In some embodiments of method 5300, the rule specifies that the value of the first syntax element is set to zero in response to the second syntax element being equal to 0. In some embodiments of method 5300, the rule specifies that the value of the first syntax element is set to zero in response to the third syntax element being equal to 0.

Figure 54:
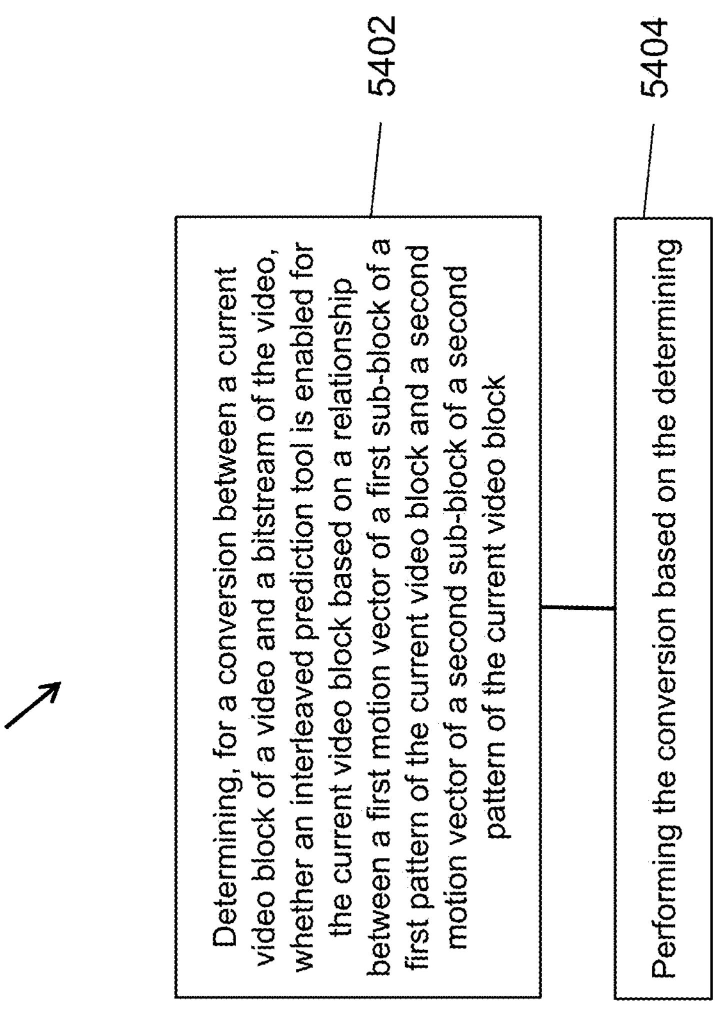

FIG. 54 is a flowchart for an example method 5400 of video processing. Operation 5402 includes determining, for a conversion between a current video block of a video and a bitstream of the video, whether an interleaved prediction tool is enabled for the current video block based on a relationship between a first motion vector of a first sub-block of a first pattern of the current video block and a second motion vector of a second sub-block of a second pattern of the current video block. Operation 5404 includes performing the conversion based on the determining.

In some embodiments of method 5400, the second sub-block is selected from one sub-block in the second pattern, wherein the one sub-block overlaps with the first sub-block. In some embodiments of method 5400, the second sub-block is selected from the one sub-block based on affine parameters. In some embodiments of method 5400, a second center of the second sub-block is above a first center of the first sub-block in response to a first condition being satisfied, and the second center of the second sub-block is below the first center of the first sub-block in response to a second condition being satisfied. In some embodiments of method 5400, the first condition is that the first sub-block is at a last row of the current video block. In some embodiments of method 5400, the second condition is that the first sub-block is at a first row of the current video block. In some embodiments of method 5400, the second condition is: $(mv0\_y>0$ and $mv1\_y>0)$, or $(mv0\_y>0$ and $mv1\_y<0$ and $|mv0\_y|>|mv1\_y|)$, or $(mv0\_y<0$ and $mv1\_y>0$ and $|mv0\_y|<|mv1\_y|)$, wherein $mv0\_y$ is the second motion vector in a vertical direction, and wherein $mv1\_y$ is the first motion vector in the vertical direction. In some embodiments of method 5400, the first condition is satisfied in response to the second condition not being satisfied.

In some embodiments of method 5400, a second center of the second sub-block is left to a first center of the first sub-block in response to a third condition being satisfied, and the second center of the second sub-block is right to the first center of the first sub-block in response to a fourth condition being satisfied. In some embodiments of method 5400, the third condition is that the first sub-block is at a right-most row of the current video block. In some embodiments of method 5400, the fourth condition is that the first sub-block is at a left-most row of the current video block. In some embodiments of method 5400, the interweaved prediction tool is disabled in response to the relationship between the first motion vector and the second motion vector satisfying a fifth condition. In some embodiments of method 5400, the fifth condition depends on a first syntax element and a second syntax element in the bitstream, the first syntax element indicates whether a center of the first sub-block is left to a center of the second sub-block, and the second syntax element indicates whether the center of the first sub-block is above the center of the second sub-block.

In some embodiments for method(s) 4800-5400, the performing the conversion comprising encoding the video into the bitstream. In some embodiments for method(s) 4800-5400, the performing the conversion comprises generating the bitstream from the video, and the method further comprises storing the bitstream in a non-transitory computer-readable recording medium. In some embodiments for method(s) 4800-5400, the performing the conversion comprises decoding the video from the bitstream. In some embodiments, a video decoding apparatus comprising a processor configured to implement method(s) recited for embodiments 4800-5400. In some embodiments, a video encoding apparatus comprising a processor configured to implement method(s) recited for embodiments 4800-5400. In some embodiments, a computer program product having computer instructions stored thereon, the instructions, when executed by a processor, causes the processor to implement method(s) recited for embodiments 4800-5400. In some embodiments, a non-transitory computer-readable storage medium that stores a bitstream generated according to the method(s) recited for embodiments 4800-5400. In some embodiments, a non-transitory computer-readable storage medium storing instructions that cause a processor to implement method(s) recited for embodiments 4800-5400. In some embodiments, a method of bitstream generation, comprising: generating a bitstream of a video according to method(s) recited for embodiments 4800-5400, and storing the bitstream on a computer-readable program medium. In some embodiments, a method, an apparatus, a bitstream generated according to a disclosed method or a system described in the present document.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, for a conversion between a current video block of a video and a bitstream of the video, that a fractional sample interpolation process is applied to a color component of a subblock of the current video block; and performing the conversion based on the determining, wherein when the current video block is not coded with an affine mode, a size of color component of the subblock used for the fractional sample interpolation process is sbWidth/SubWidthC and sbHeight/SubHeightC, wherein sbWidth and sbHeight specify a width of the subblock in luma samples and a height of the subblock in luma samples respectively, and SubWidthC and SubHeightC represent a color format of a current picture including the current video block.

2. The method of claim 1, wherein the color component is a chroma component.

3. The method of claim 1, wherein when the current video block is coded with the affine mode, the size of color component of the subblock used for the fractional sample interpolation process is sbWidth and sbHeight.

4. The method of claim 1, wherein the performing the conversion comprises encoding the video into the bitstream.

5. The method of claim 1, wherein the performing the conversion comprises decoding the video from the bit-stream.

6. An apparatus for processing video data comprising a processor and a non-transitory memory with instructions thereon, wherein the instructions upon execution by the processor, cause the processor to:

determine, for a conversion between a current video block of a video and a bitstream of the video, that a fractional sample interpolation process is applied to a color component of a subblock of the current video block; and perform the conversion based on the determining, wherein when the current video block is not coded with an affine mode, a size of color component of the subblock used for the fractional sample interpolation process is sbWidth/SubWidthC and sbHeight/SubHeightC, wherein sbWidth and sbHeight specify a width of the subblock in luma samples and a height of the subblock in luma samples respectively, and SubWidthC and SubHeightC represent a color format of a current picture including the current video block.

7. The apparatus of claim 6, wherein the color component is a chroma component.

8. The apparatus of claim 6, wherein when the current video block is coded with the affine mode, the size of color component of the subblock used for the coding tool is sb Width and sbHeight.

9. A non-transitory computer-readable storage medium storing instructions that cause a processor to:

determine, for a conversion between a current video block of a video and a bitstream of the video, that a fractional sample interpolation process is applied to a color component of a subblock of the current video block; and perform the conversion based on the determining, wherein when the current video block is not coded with an affine mode, a size of color component of the subblock used for the fractional sample interpolation process is sbWidth/SubWidthC and sbHeight/SubHeightC, wherein sbWidth and sbHeight specify a width of the subblock in luma samples and a height of the subblock in luma samples respectively, and SubWidthC and SubHeightC represent a color format of a current picture including the current video block.

10. A non-transitory computer-readable recording medium storing a bitstream of a video which is generated by a method performed by a video processing apparatus, wherein the method comprises:

determining, for a current video block of the video, that a fractional sample interpolation process is applied to a color component of a subblock of the current video block; and generating the bitstream based on the determining, wherein when the current video block is not coded with an affine mode, a size of color component of the subblock used for the fractional sample interpolation process is sbWidth/SubWidthC and sbHeight/SubHeightC, wherein sbWidth and sbHeight specify a width of the subblock in luma samples and a height of the subblock in luma samples respectively, and SubWidthC and SubHeightC represent a color format of a current picture including the current video block.

11. The apparatus of claim 6, wherein performing the conversion comprises encoding the video into the bitstream.

12. The apparatus of claim 6, wherein performing the conversion comprises decoding the video from the bit-stream.

13. The non-transitory computer-readable storage medium of claim 9, wherein the color component is a chroma component.

14. The non-transitory computer-readable storage medium of claim 9, wherein when the current video block is coded with the affine mode, the size of color component of the subblock used for the fractional sample interpolation process is sbWidth and sbHeight.

15. The non-transitory computer-readable recording medium of claim 10, wherein the color component is a chroma component.

16. The non-transitory computer-readable recording medium of claim 10, wherein when the current video block is coded with the affine mode, the size of color component of the subblock used for the fractional sample interpolation process is sbWidth and sbHeight.

17. The non-transitory computer-readable storage medium of claim 9, wherein performing the conversion comprises encoding the video into the bitstream.

18. The non-transitory computer-readable storage medium of claim 9, wherein performing the conversion comprises decoding the video from the bitstream.

19. The method of claim 4, further comprising:

storing the bitstream in a non-transitory computer-readable storage medium.

* * * * *